United States Patent [19]

Goto

[11] Patent Number: 5,832,323
[45] Date of Patent: Nov. 3, 1998

[54] INFORMATION SETTING APPARATUS

[75] Inventor: Tetsuro Goto, Funabashi, Japan

[73] Assignee: Nikon Corporation, Tokyo, Japan

[21] Appl. No.: 777,324

[22] Filed: Dec. 27, 1996

[30] Foreign Application Priority Data

| Jan. 5, 1996 | [JP] | Japan | 8-017159 |
| Jan. 5, 1996 | [JP] | Japan | 8-017161 |
| Jan. 22, 1996 | [JP] | Japan | 8-027279 |
| Sep. 4, 1996 | [JP] | Japan | 8-234054 |
| Sep. 5, 1996 | [JP] | Japan | 8-235376 |
| Sep. 12, 1996 | [JP] | Japan | 8-242272 |
| Sep. 19, 1996 | [JP] | Japan | 8-248111 |

[51] Int. Cl.$^6$ .................................................. G03B 17/00

[52] U.S. Cl. ........................... 396/297; 396/299; 345/167

[58] Field of Search ..................... 396/106, 121, 396/233, 234, 297, 296, 299; 345/167

[56] References Cited

U.S. PATENT DOCUMENTS

| 5,096,289 | 3/1992 | Mogamiya et al. | 396/106 |
| 5,121,152 | 6/1992 | Wagner | 396/121 |
| 5,237,311 | 8/1993 | Mailey et al. | 345/167 |
| 5,349,415 | 9/1994 | Nishida | 396/234 |
| 5,659,814 | 8/1997 | Matsukawa et al. | 396/296 |

*Primary Examiner*—Russell E. Adams

[57] ABSTRACT

An information setting apparatus includes a first operation mechanism reciprocally operatable in the first and second directions different from each other, first and second direction detection units respectively for detecting an operation in the first or second direction on the basis of the operation content of the first operation mechanism, a first information setting unit for sequentially setting first information in accordance with a detection output from the first direction detection unit, and a second information setting unit for sequentially setting second information in accordance with a detection output from the second direction detection unit.

55 Claims, 48 Drawing Sheets

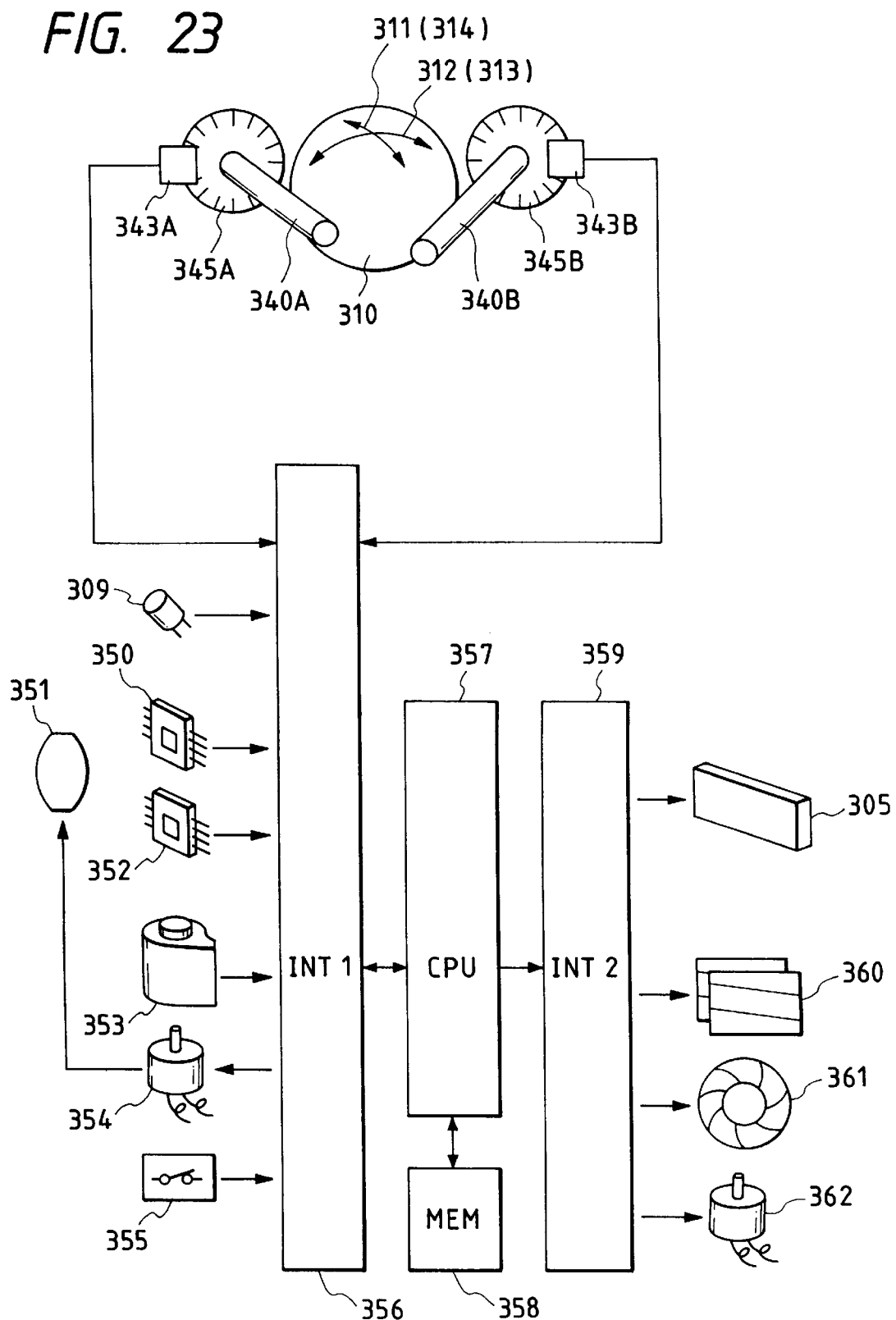

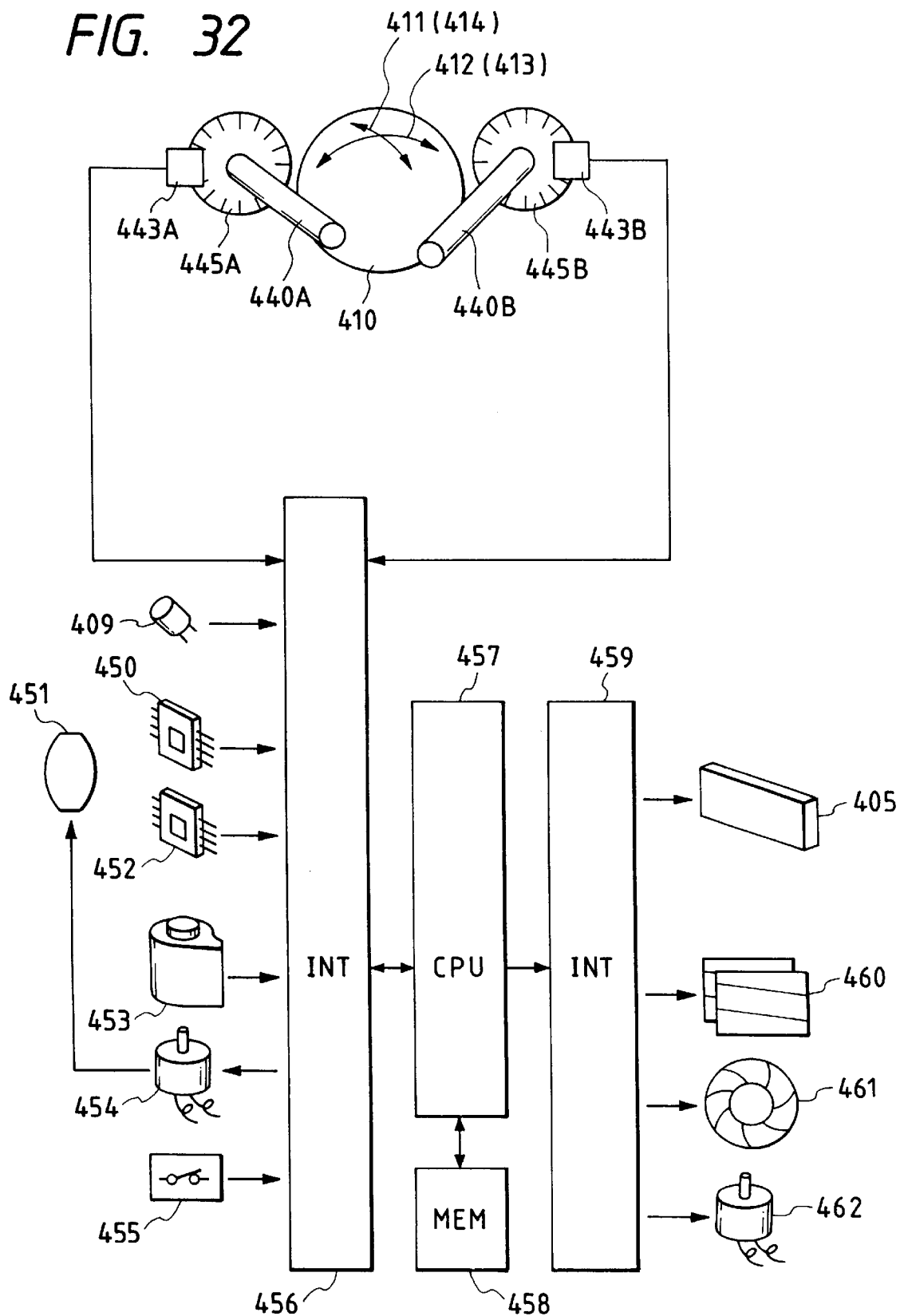

INFORMATION SETTING APPARATUS

BACKGROUND OF THE INVENTION

1. Field of the Invention

The present invention relates to an information setting apparatus for setting the contents of mode information such as the photometric, exposure, or distance measurement mode of a camera.

2. Related Background Art

Cameras having a function of allowing a photographer himself to set operation contents such as a photometric, exposure, or distance measurement mode are increasing in recent years. Operation forms of this function are mainly classified into an analog method of setting each mode using a dedicated selection dial and a digital method of setting a mode using both a mode selection button and an up/down button.

In either method, appropriate exposure must be achieved in accordance with abrupt changes in brightness, position, and the like of an object to be photographed. For this reason, the operation members must be quickly manipulated for a change or adjustment and must be used by all photographers regardless of various sizes of hands.

On the other hand, personal computers employ various types of pointing devices such as a mouse scheme for sliding a device called a mouse having a ball on the lower surface along the surface of a table to perform selection and designation in accordance with the rotational direction of the ball, a stick scheme for falling a stick with a finger in an arbitrary direction to designate a direction, and a touch panel scheme for allowing a user to touch the surface of a dedicated panel with a finger tip and move the finger along the surface, thereby detecting a designated direction.

The present inventor discloses a method of selecting and designating the distance measurement position of the object with a track ball in Japanese Patent Application Laid-Open No. 6-148714.

Japanese Patent Application Laid-Open No. 6-148714 discloses a method of designating the distance measurement position by arranging the track ball on the rear surface of a camera. FIG. 71A is a view showing a state in which a user holds a camera 801 at a normal position (horizontal position), and a track ball 810 arranged in the camera 801 is rotated with the tip of a thumb 815 of the right hand in a vertical direction 811, a horizontal direction 812, or a direction between the vertical and horizontal directions 811 and 812. The index finger of the right hand is located at a position where a shutter button 803 can be depressed.

FIG. 71B shows 25 distance measurement areas 820A to 820E, 821A to 821E, 822A to 822E, 823A to 823E, and 824A to 824E displayed on an LCD 805 arranged in the camera 801. An arbitrary area shown in FIG. 71B is selected with an operation of the track ball 810 in FIG. 71A. Assume that the central area 822C has already been selected. In this case, although not shown, the segment 822C as the selected area flickers to indicate the difference from other areas.

The following problem is posed by the camera 801 arranged as described above. The movement of the thumb in the horizontal direction is easier than that in the vertical direction due to the physical structure of the thumb. More specifically, in FIG. 71A, when the movable amounts of the thumb 815 in upward, downward, right, and left movement components are compared with each other, a horizontal arrow 812 indicates a larger movement amount than a vertical arrow 811. The width of each arrow expresses the movement amount. In other words, even if the track ball 810 is rotated equally in the horizontal and vertical directions, a designation amount in the vertical direction 811 is short, while a designation amount in the horizontal direction 812 is excessive.

For example, when the area 822E is to be selected from the current area 822C in FIG. 71B, the area 822E can be designated with one action to the track ball 810. However, when the area 820C is to be designated from the area 822C, only the area 821C is designated with one action to the track ball 810. The track ball 810 must be rotated again to designate the area 820C. If one action is set to select the area 820C from the area 822C in the vertical direction 811, selection of the area 822D from the area 822C is too sensitive, and the area 822E may be erroneously designated.

This problem is also posed in selection of an area in an oblique direction as well as selection of an area in the vertical direction. In addition, this is also true when the camera 801 is held at the vertical position, as shown in FIG. 72A. FIG. 72A is a view showing a state in which a user holds the camera 801 at the vertical position, and the track ball 810 arranged in the camera 801 is rotated with the tip of the thumb 815 of the right hand in a vertical direction 813, a horizontal direction 814, or a direction between the vertical and horizontal directions 813 and 814. The index finger of the right hand is located at a position where a separate shutter button 804 can be depressed.

FIG. 72B shows a display example as in FIG. 71B. When the movable amounts of the thumb 815 are compared in the left, right, upward, and downward movement components, a horizontal arrow 814 indicates a larger movement amount than a vertical arrow 813 in FIG. 72B. For example, when the area 824C is to be selected from the current area 822C in FIG. 72B, the area 824C can be designated with one action to the track ball 810. However, when the area 822E is to be designated from the area 822C, only the area 822D is designated with one action to the track ball 810. The track ball 810 must be rotated again to designate the area 822E. If one action is set to select the area 822E from the area 822C in the vertical direction 813, selection of the area 823C from the area 822C is too sensitive, and the area 824C may be erroneously designated.

The camera 801 arranged as described above also poses the following problem. That is, since the base of the thumb 815 is located at the lower right position with respect to the tip of the thumb 815, it is physically very painful to move the thumb 815 so as to conform to the outer shape of the camera 810 in the horizontal or vertical direction. More specifically, the movement direction of the thumb 815 in a horizontal direction 912 is inclined with respect to the tracking ball 810 in FIG. 73A. The movement direction in the vertical direction 911 is inclined accordingly.

More specifically, in FIG. 73B, for example, when the area 822E is to be selected from the current area 822C, the direction designated to the track ball 810 is the direction 912, and the area 821D or 821E may be undesirably selected in place of the area 822E. When the area 820C is to be selected from the area 822C, the erroneous area 820B is selected due to the same reason as described above. Therefore, it is expected that the track ball 810 must be operated again in a return direction, resulting in inconvenience.

The above problem is also posed in selection of an area in an oblique direction as well as selection of an area in the vertical and horizontal directions. In addition, this is also true when the camera 801 is held at the vertical position, as shown in FIG. 74A. FIG. 74A is a rear view showing a state in which a user holds the camera 801 at the vertical position, and the track ball 810 arranged in the camera 801 is rotated with the tip of the thumb 815 of the right hand in a vertical direction 913, a horizontal direction 914, or a direction between the vertical and horizontal directions 913 and 914. The index finger of the right hand is located at a position where a separate shutter button 804 can be depressed.

FIG. 74B shows a display example as in FIG. 73B. The natural movements of the thumb 815 in the horizontal and vertical directions in FIG. 74B also have an angular relationship with the outer shape of the camera 801. For example, when the area 824C is to be selected from the current area 822C in FIG. 74B, the area 824D is undesirably selected. When the area 822E is to be selected from the area 822C, the area 821D or 821E is undesirably selected. Therefore, an operation must be repeated, thus posing a problem.

Operability is taken into consideration from the viewpoint "the operation members must be quickly manipulated for a change or adjustment and must be used by all photographers regardless of various sizes of hands".

The track ball 810 is arranged on the rear surface of the camera 801 in FIG. 73A. The user can hold the camera 801 with his right hand at the normal position, and the track ball 810 can be rotated with the tip of the thumb 815 of the right hand in the vertical and horizontal directions 911 and 912, and a direction between the vertical and horizontal directions 911 and 912. At this time, the index finger of the right hand is located at a position where the shutter button 803 can be depressed.

Referring to FIG. 73B, the display 805 has the 25 distance measurement areas 820A to 820E, 821A to 821E, 822A to 822E, 823A to 823E, and 824A to 824E. An arbitrary distance measurement area is selected with an operation of the track ball 810. A segment for the selected distance measurement area flickers to indicate that this area has been selected, thereby distinguishing this area from other nonselected areas.

In the camera 801 having the above arrangement, as shown in FIG. 73A, since the base of the thumb 815 is located at the lower right position with respect to the tip of the thumb 815 of the right hand supporting the camera 801, it is difficult to move the tip of the thumb 815 so as to conform to the outer shape of the tracking ball 810 in the horizontal or vertical direction. If the tip of the thumb is forcibly moved, the user physically feels very painful.

That is, when the thumb 815 is naturally moved, the rotational direction 912 of the track ball 810 upon horizontal movement of the tip of the thumb 815 is inclined upward with respect to the horizontal direction of the camera 801, as shown in FIG. 73A. Similarly, the rotational direction 911 of the track ball 810 upon vertical movement of the tip of the thumb 815 is inclined in the horizontal direction with respect to the vertical direction of the camera 801.

Referring to FIG. 73B, when the current distance measurement area is, e.g., the distance measurement area 822C and the distance measurement area 822E is to be selected from the current distance measurement area, the rotational direction of the track ball 810 is the direction 912 shown in FIG. 73A. A distance measurement area to be selected is not the distance measurement area 822E, but the distance measurement area 821D or the distance measurement area 821E, thus posing a problem.

When the distance measurement area 820C is to be selected from the distance measurement area 822C, the erroneous distance measurement area 820B is selected due to the same reason as described above.

It is expected that the track ball 810 be operated again in the return direction, resulting in inconvenience and poor operability.

The above problems also occur in selection of a distance measurement area in an oblique direction as well as selection of distance measurement areas in the horizontal and vertical directions. This is also true when the camera 801 is held at the vertical position, as shown in FIG. 74A.

FIG. 74A shows a state in which the user holds the camera 801 with his right hand at the vertical position, and the track ball 810 is rotated with the tip of the thumb 815 of the right hand in the vertical and horizontal directions 913 and 914 and a direction between the vertical and horizontal directions 913 and 914. At this time, the index finger of the right hand is located at a position where the shutter button 804 can be depressed. FIG. 74B is the display example as in FIG. 73B.

As can be readily understood from the above description, the natural movements of the tip of the thumb 815 in the horizontal and vertical directions in FIG. 74B also have an angular relationship with the horizontal and vertical directions of the outer shape of the camera 801, thus posing the same problem as described above.

In addition, the significance of the above problems varies depending on photographers. That is, operability of the track ball 810 varies depending on the sizes of hands and skills of photographers, and a direction to be selected and designated varies.

More specifically, in the illustrated example, vertical and horizontal directions are indicated by straight lines perpendicular to each other. However, in practice, for example, the upper direction and the lower direction are not aligned on a line and cross each other. The upper and lower directions are slightly inclined from the vertical direction. In addition, for example, the upper and right directions often cross each other at an angle except a right angle.

The track ball 810 has a function of selecting a position in an arbitrary direction within the above-mentioned plane. A scheme for directly reading the motion of the track ball results in an error due to the ergonomic problem described above.

A camera operation example has been described above. Such a problem is also pointed out in operations with a mouse, a touch panel, or the like.

In a scheme employing a track ball according to a prior application, the operation contents of the track ball are sequentially read, and operation directions of the track ball are faithfully reflected. In the display examples of FIGS. 73B and 74B, objects to be actually designated are 25 discretely arranged distance measurement areas. For this application, rotation of the track ball need not be faithfully reflected.

When objects to be designated with the track ball are discrete, it is wasteful in processing time and constituent components to employ the scheme for faithfully reflecting the rotation of the track ball.

The above description is associated with an application to a camera. However, this also applies to a mouse operation in a so-called personal computer. More specifically, objects to be designated on a screen are contiguous in all directions in the personal computer. In an actual operation, continuous positions are rarely designated, but discrete positions are often designated.

In order to quickly perform an operation for a change or adjustment, a mode must be set while setting the index finger of the right hand on a release button for exposure due to the following reason. As is known well, the release button of a camera which designates the start of exposure is located at a position where the index finger of the right hand is naturally placed while holding the camera so as not to miss a shutter chance.

Demand has arisen for developing a release operation device capable of setting various modes while placing the index finger of the right hand on the release button for exposure. Japanese Patent Application Laid-Open No. 6-230892 discloses a track ball having a mechanism for detecting depression of a ball itself in addition to an original track ball mechanism for selecting an arbitrary position within a plane.

By using this to constitute the release operation device, i.e., by allowing rotation of a ball to correspond to a mode, the above problem can be solved. In the release operation device of the camera, however, operations in two stages are required as the release operations. This uniqueness poses a problem of how to arrange a release operation device.

The following combinations each consisting of an operation device for performing operations in each mode and a display device synchronized with this operation device are available.

In an application product such as a personal computer, a user can operate a mouse while observing a mark displayed on a CRT to move the mark in an arbitrary direction. This is a combination of operation and display devices having high resolutions. That is, since operation positions which are slightly different from each other can be displayed on the CRT to its limitation, these operation positions can be designated by high-precision sophisticated input operations with a mouse.

Japanese Patent Application Laid-Open No. 6-148714 discloses a device for selecting and designating part of an object displayed on an LCD with a button-like cross key. This is a combination of a high-resolution display device, and a discrete operation device. Although no structural disclosure is found in this prior-art invention, the cross key generally has switches below the four buttons, and depression of any one of the upper, lower, left, and right buttons is determined. Therefore, the resultant designation information is limited to the four discrete directions, and does not indicate a direction between the four discrete directions.

A fine state display is possible in the device disclosed in Japanese Patent Application Laid-Open No. 6-148714 because the LCD having a large number of pixels is used. For this reason, to shift a designated portion obliquely, two of the above buttons must be simultaneously depressed or alternately depressed to shift the portion stepwise.

The relationship between a display device and an operation device in a camera is exemplified by an auto-focus system.

The number of distance measurement areas will be considered first. A central distance measurement area is always required. Since the distance measurement areas must be symmetrical about the vertical and horizontal directions, the number of distance measurement areas around the central measurement area must be an even number. Therefore, the number of distance measurement areas is an odd number regardless of the arrangements of systems. At the same time, the distance measurement areas cannot be set at arbitrary positions on the screen due to the state-of-the-art technical standards such as an optical reason, and cannot help but be discrete. Assume that a total of five distance measurement areas, i.e., the central, upper, lower, left, and right distance measurement areas are set on the screen. Symbol marks on the display device must also be discrete segments having the layout similar to that of the distance measurement areas because a selected area must be displayed.

The operation device is appropriate to have four buttons as in the device disclosed in Japanese Laid-Open Patent Application No. 6-148714 due to the limitations of size and cost. The operation device is also a discrete designation device. That is, to depress a button is to shift a position from the currently selected distance measurement area to another area. The operation device has a function of indicating only a relative position, but does not have a function of directly selecting an absolute position.

The following drawback is caused when discrete elements are used in a combination. A case of readily understanding an operation will be considered. Details are given such that only a central segment 729C is ON on an LCD 729, and other segments 729U, 729R, 729D, and 729L are OFF on the LCD 729, as shown in FIG. 63. In this state, as shown in FIG. 64, when an upper side 736U of a selector 709 is depressed with a finger 737, the upper segment 729U is turned on on the LCD 729, as shown in FIG. 65. The central segment 729C which has been ON is turned off.

When a right side 736R of the selector 709 is depressed, as shown in FIG. 66, following the state shown in FIG. 65, depression with the finger 737 is meaningless because nothing is present to the right of the segment 729U. If the segment 729R is to be selected, the target segment 729U must be selected after the segment 729C is selected. This operation method results in the waste of time and disables a quick operation. In addition, when the display device is a device such as the LCD 729 which has a low response speed at low temperatures, operability is further degraded.

SUMMARY OF THE INVENTION

It is an object of the present invention to provide an information setting apparatus capable of easily setting the contents of various modes with a single operation mechanism.

It is another object of the present invention to provide an information setting apparatus in which operability degraded by different movable ranges of a thumb or the like in the vertical and horizontal directions can be improved.

It is still another object of the present invention to provide an information setting apparatus in which operability of an operation member such as a track ball used on the rear surface of a camera is improved.

It is still another object of the present invention to provide a manual operation correction device capable of correcting the operation contents of an operation member which depend on the operational habits, posture, and the like of an operator.

It is still another object of the present invention to provide a manual operation area designation device capable of designating discrete areas with respect to a continuous operation locus.

It is still another object of the present invention to provide a release operation device capable of easily setting various modes while the index finger of the right hand is placed on a release button for exposure.

It is still another object of the present invention to provide a measurement area selection device having improved operability free from an operation for selecting a measurement area again even if no measurement area is present in a selection direction.

To achieve the above objects, according to the first aspect of the present invention, there is provided an information setting apparatus comprising a first operation mechanism reciprocally operatable in first and second directions different from each other, first and second direction detection units respectively for detecting an operation in the first or second direction on the basis of an operation content of the first operation mechanism, a first information setting unit for sequentially setting first information in accordance with a detection output from the first direction detection unit, and a second information setting unit for sequentially setting second information in accordance with a detection output from the second direction detection unit.

Preferably, the first information includes mode information about exposure, photometry, distance measurement, and the like, and the second information includes detailed data of the various pieces of mode information.

According to the second aspect of the present invention, the information setting apparatus according to the first aspect is characterized by further comprising a second operation mechanism which is also operatable in a third direction different from the first and second directions, in place of the first operation mechanism, a third direction detection unit for detecting an operation in the third direction on the basis of an operation content of the second operation mechanism, and an information confirmation unit for confirming the first or second information corresponding to an operation content of a detection operation of one of the first and second direction detection units upon reception of a detection output from the third direction detection unit after the one detection unit performs the detection operation.

According to the third aspect, the information setting apparatus according to the first aspect is characterized by further comprising a second operation mechanism which is also operatable in a third direction different from the first and second directions, in place of the first operation mechanism, a third direction detection unit for detecting an operation in the third direction on the basis of an operation content of the second operation mechanism, and a reset unit for holding or invalidating a detection content of the first or second direction detection unit corresponding to a previous operation upon reception of a detection output from the third direction detection unit, and returning to an initial state.

Preferably, the second operation mechanism is constituted by a ball set rotatable, the first and second direction detection units respectively detect rotational directions corresponding to the first and second directions applied to the ball, and the third direction detection unit detects presence/absence of a depression force applied to the ball as the third direction.

The information setting apparatus according to the first aspect of the present invention is provided with a first operation mechanism 10 reciprocally operatable in the first and second directions different from each other, as shown in FIG. 1. The first information can be set in accordance with an output from a first direction detection unit 20 for detecting an operation in the first direction. The second information can be set in accordance with an output from a second direction detection unit 30 for detecting an operation in the second direction.

Note that the first information can be mode information about exposure, photometry, distance measurement, and the like, and the second information can be detailed data of various pieces of mode information.

A single operation mechanism therefore enables selection and change of various functions of a camera. As can be understood from the gist, the first operation mechanism is constituted using a ball, a joystick, or the like.

The information setting apparatus according to the second aspect of the present invention is provided with a second operation mechanism 60 which is reciprocally operatable in the first and second directions different from each other, and also operatable in the third direction different from the first and second directions, as shown in FIG. 2. The first information can be set in accordance with an output from the first direction detection unit 20 for detecting an operation in the first direction. The second information can be set in accordance with an output from the second direction detection unit 30 for detecting an operation in the second direction. In addition, when a third direction detection unit 70 detects an operation in the third direction in the operation process, an information confirmation unit 80 can confirm the first or second information in correspondence with the operation contents associated with either the first direction detection unit 20 or the second direction detection unit 30.

More specifically, the contents of the first information selected by the previous operation in the first direction can be confirmed by operating the second operation mechanism 60 in, e.g., the first direction and then the third direction. The contents of the confirmed first information can be changed by operating the second operation mechanism 60 in the second direction.

Targets of the information setting apparatus according to the first aspect are the first information and second information arranged one-dimensionally. However, the information setting apparatus according to the second aspect can further execute selection and change of the first information and second information two-dimensionally arranged in a matrix without any obstacle.

The information setting apparatus according to the third aspect of the present invention is provided with the second operation mechanism 60 which is reciprocally operatable in the first and second directions different from each other, and also operatable in the third direction different from the first and second directions, as shown in FIG. 3. The first information can be set in accordance with an output from the first direction detection unit 20 for detecting an operation in the first direction. The second information can be set in accordance with an output from the second direction detection unit 30 for detecting an operation in the second direction. In addition, when the third direction detection unit 70 detects an operation in the third direction in the operation process, a reset unit 90 holds or invalidates the detection contents of the first or second direction detection unit 20 or 30 in correspondence with a previous operation, and returns the current state to the initial state.

With this arrangement, an operation can be performed again from the initial position.

Note that the second operation mechanism 60 is constituted by a ball set rotatable. The first and second directions are made to correspond to two rotational directions different from each other which are applied to the ball, and the third direction is made to corresponds to the presence/absence of a depression force applied to the ball. Therefore, an information setting apparatus having high operability can be provided.

According to the fourth aspect of the present invention, there is provided an information setting apparatus characterized by comprising a manually operatable operation member, a first detection unit for detecting an operation amount of the operation member operated in a first direction, and a second detection unit for detecting an operation amount in a second direction different from the first direction, wherein the first detection unit has a detection resolution different from a detection resolution of the second detection unit.

The operation member is preferably a track ball which replaces a manual operation with rotation of the ball. Alternatively, the operation member is preferably a touch panel which detects a manually operated contact point.

Preferably, the first and second detection units are pulse generation units for generating pulses in accordance with the operation amounts, and have different detection resolutions by setting different numbers of pulses to be output.

An information setting apparatus also preferably further comprises a posture detection unit for detecting a posture of the information setting apparatus, so that the detection resolutions of the first and second detection units are changed by a detection output from the posture detection unit.

In the information setting apparatus according to the fourth aspect of the present invention, operability degraded by different vertical and horizontal movable ranges of a thumb or the like which operates the operation member is improved.

According to the fifth aspect of the present invention, there is provided an information setting apparatus comprising a manually operatable operation member, a first detection unit for detecting an operation amount of the operation member in a first direction, a second detection unit for detecting an operation amount of the operation member in a second direction different from the first direction, and a control unit for detecting the operation amount in the operation direction different from the operation direction detected by one of the detection units on the basis of an output from one detection unit.

The control unit preferably comprises a first control unit for detecting an operation amount in a third direction different from the first direction on the basis of an output from the first detection unit, and a second control unit for detecting an operation amount in a fourth direction different from the second direction on the basis of an output from the second detection unit.

The operation member is preferably a track ball which replaces a manual operation with rotation of the ball. Alternatively, the operation member is preferably a touch panel which detects a manually operated contact point.

Preferably, the third and fourth directions are orthogonal to each other along an outer shape of the information setting apparatus, and the first direction has a predetermined inclination angle with respect to the third direction while the second direction has a predetermined inclination angle with respect to the fourth direction.

The control unit preferably shifts a predetermined value on the basis of an output from the first or second detection unit.

Preferably, an information setting apparatus further comprises a posture detection unit for detecting a posture of the information setting apparatus, so that the control unit corrects the operation amounts in the different operation directions obtained by the control unit in accordance with a detection output from the posture detection unit.

At least one of the first and second detection units is preferably inclined with respect to an outer shape of the information setting apparatus.

According to the sixth aspect of the present invention, there is provided an information setting apparatus comprising a manually operatable operation member, a detection unit for detecting an operation amount of the operation member in a predetermined direction, and a control unit for detecting an operation amount in a direction different from the predetermined direction on the basis of an output from the detection unit.

In the information setting apparatus according to the fifth and sixth aspects of the present invention, a designated direction with an inclination angle with respect to the outer shape of the camera is corrected to coincide with the outer shape (vertical and horizontal directions) of the camera. The operation direction of the operation member (e.g., a track ball) coincides with an element selected and designated as the operation result, thereby improving operability.

According to the seventh aspect of the present invention, there is provided a manual operation correction device comprising an operation unit which allows designation and movement of an arbitrary position within a display screen by a manual operation, an operation locus acquisition unit for outputting an instruction for a movement operation direction of an input position by the operation unit on the display screen, and acquiring an operation locus of the operation unit operated in accordance with the instruction, and an area setting unit for setting an operation determination area between two operation loci having the same start point by using the acquired operation locus.

A manual operation correction device preferably comprises a direction specifying unit which has a first mode in which the operation locus acquisition unit and the area setting unit are started, and a second mode in which the operation unit is actually operated, and collates an operation locus indicated by the operation of the operation unit in the second mode with the operation determination area set by the area setting unit, thereby specifying an operator's intentional movement operation direction of the input position on the display screen.

Preferably, the operation locus acquisition unit outputs an instruction for the movement operation direction of the input position by the operation unit on the display screen by arbitrarily designating start and end positions, and changes the start and end positions to acquire a plurality of numbers of times operation loci of the operation unit operated in accordance with the instruction.

The operation unit preferably employs a scheme of replacing the manual operation with rotation of a ball and detecting the rotation. Alternatively, the operation unit preferably employs a scheme of detecting a manually operated contact point.

The area setting unit preferably sets operation determination areas having different contents in accordance with a posture of the manual operation correction device.

In the manual operation correction device according to the seventh aspect of the present invention, the operation locus acquisition unit outputs an instruction for the movement operation direction of an input position by the operation unit on the display screen to acquire the operation locus of the operation unit operated in accordance with the instruction. The area setting unit sets an operation determination area between two operation loci having the same start point by using the acquired operation locus.

The operation can therefore be corrected depending on whether the movement operation direction of an actual input position by the operation unit falls within the operation determination area.

More specifically, the first and second modes are set. In the second mode, the direction specifying unit collates the operation locus indicated by an operation of the operation unit with the operation determination area set by the area setting unit, thereby specifying an operator's intentional movement operation direction of the input position on the display screen.

The operation locus of the operation unit can be acquired only by arbitrarily designating the start and end points, and the structure is not complicated.

The operation unit may employ both a scheme of replacing a manual operation with rotation of the ball and detecting the rotation, and a scheme of detecting a manually operated contact point. Note that the operation unit having the ball includes a track ball, a mouse, and the like. The operation unit of the scheme of detecting a manually operated contact point includes a touch panel.

The area setting unit can set operation determination areas having different contents in accordance with the posture of this device in consideration of the use of the manual operation correction device in various postures depending on an operator's convenience.

According to the eighth aspect of the present invention, there is provided a manual operation area designation device comprising an operation unit which allows designation and movement of an arbitrary position within a display screen by a manual operation, a signal generation unit for generating a first signal representing an operation locus of the operated operation unit, a reference signal output unit for outputting second and third signals having different directions, the second and third signals being respectively constituted by discrete values, and each direction being constituted by the consecutive discrete values, and a direction signal output unit for comparing the first signal with the second and third signals, and uniformly outputting a fourth signal between the second and third signals when the first signal exists between the second and third signals.

The operation unit preferably employs a scheme of replacing the manual operation with rotation of a ball and detecting the rotation. Alternatively, the operation unit preferably employs a scheme of detecting a manually operated contact point.

The reference signal output unit preferably varies and outputs the second and third signals according to a posture of the device.

In the manual operation area designation device according to the eighth aspect of the present invention, when the first signal representing the operation locus of the operation unit is present between the second and third signals, the fourth signal present between the second and third signals is uniformly output as a direction signal.

That is, even if the operation locus continuously changes within an area defined by the second and third signals, this locus is converted into a signal indicating a uniformly determined direction. Areas are defined by a plurality of pairs of second and third signals, and a direction signal is discretely generated in each area. That is, the operation locus is a continuous direction signal, which is converted into a discrete signal indicating the uniformly determined direction.

The operation unit forming a continuous operation locus may employ the scheme of replacing a manual operation with rotation of the ball and detecting the rotation, or the scheme of detecting a manually operated contact point.

Since the manual operation area designation device is used in various postures, the reference signal output unit can vary and output the second and third signals in accordance with a posture of the device.

According to the ninth aspect of the present invention, there is provided a release operation device for a camera, comprising a ball set in the camera to be rotatable, a rotation detection mechanism for detecting rotation applied to the ball, a rotational direction detection unit for calculating and detecting a rotational direction of the ball upon reception of an output from the rotation detection mechanism, a depression detection mechanism for detecting depression applied to the ball, and a camera operation control unit for starting an operation upon reception of an output from the depression detection mechanism.

Preferably, the release operation device further comprises a distance measurement position setting unit for setting as a distance measurement position an operation position in the rotational direction detected by the rotational direction detection unit.

Preferably, the release operation device for a camera further comprises a mode switch arranged on the camera, and a mode setting unit for changing and setting a mode content of the operated mode switch in accordance with the direction detected by the rotational direction detection unit upon reception of outputs from the mode switch and the rotational direction detection unit.

The depression detection mechanism detects at least depression in two stages, outputs a power supply start signal in response to detection of depression to a first stage, and outputs an exposure start signal in response to detection of depression to a second stage.

In the release operation device of the camera according to the ninth aspect of the present invention, the ball is arranged on the camera to be rotatable, and the depression detection mechanism detects depression applied to this ball to cause the camera operation control means to perform a predetermined operation on the basis of the detected depression. The rotation detection mechanism detects rotation applied to the ball, and the rotational direction detection means calculates and detects the rotational direction of the ball.

That is, the ball can be set at a position where the rotation operation of the ball can be easily performed by the same finger as that for a release operation. The rotational direction of the ball is arbitrary within the same plane. This direction can be divided into components in a back and forth direction and a lateral direction. The rotational direction can be determined as the "back and forth direction" or the "lateral direction" depending on which component is larger.

A finger for a release operation can always be placed at a start position for an exposure operation by assigning a desired mode to the rotation operation of the ball. In addition, this mode can be quickly set while the finger is kept placed at the same position. Therefore, desired photography can be performed without missing a shutter chance.

As a typical example, a distance measurement mode is assigned to the rotation operation of the ball. In the distance measurement mode, an operator often wants to set a distance measurement position to not only the central position of an object to be photographed but also an arbitrary position of the object in the horizontal or vertical directions.

For this reason, by setting an operation position in the rotational direction detected by the rotational direction detection means as a distance measurement position, the distance measurement position can be quickly set to an arbitrary position of the object with a finger which performs a release operation, while the finger which performs the release operation is kept placed at the start position for the exposure operation.

As described above, the camera mode includes various modes such as an exposure mode and a photometric mode, in addition to the distance measurement mode. A mode switch is arranged on the camera, and the mode setting means changes and sets the contents of a mode by the operated mode switch in accordance with a direction detected by the rotational direction detection means.

With this arrangement, a change/adjustment operation for various modes can be quickly performed with a finger which performs a release operation, while the finger which performs the release operation is kept placed at the start position for the exposure operation.

The depression detection mechanism can output at least a power supply start signal and an exposure start signal. Therefore, the rotation operation of the ball can also serve as a release operation.

According to the tenth aspect of the present invention, there is provided a measurement area selection device characterized by comprising a plurality of measurement areas arranged at a central portion and radial portions, a selection unit to which a selection operation for a desired position is performed in order to select one of the plurality of measurement areas, and a control unit for selecting one of the measurement areas in accordance with a selection operation state of the selection unit, wherein the control unit selects a measurement area nearest to the desired position when no measurement area is present at the desired position.

Preferably, the measurement area selection device further comprises a display unit, so that the measurement area selected by the control unit is displayed on the display unit.

The number of measurement areas arranged at the radial portions is preferably four, and more preferably eight.

According to the eleventh aspect of the present invention, there is provided a distance area selection device comprising a plurality of measurement areas arranged at a central portion and radial portions, a selection unit for selecting and operating one of the measurement areas, and a control unit for selecting one of the measurement areas in accordance with a selection operation state of the selection unit, wherein the control unit selects a measurement area nearest to the selected position when no measurement area is present at the selected position in selecting the measurement areas arranged at the radial portions.

In the measurement area selection device according to the tenth and eleventh aspects of the present invention, if no measurement area is present at a desired position, a measurement area nearest to the desired position is selected, and another measurement area need not be selected again, thereby improving operability.

The above and other objects, features and advantages of the present invention will be explained hereinafter and may be better understood by reference to the drawings and the descriptive matter which follows.

BRIEF DESCRIPTION OF THE DRAWINGS

FIGS. 8A and 8B are views showing an example of exposure-associated mode selection, in which FIG. 8A is a view for explaining a change operation, and FIG. 8B is a view showing a display example;

FIGS. 9A and 9B are views showing an example of mode selection confirmation, in which FIG. 9A is a view for explaining a confirmation operation, and FIG. 9B is a view showing a display example;

FIGS. 10A and 10B are views showing an example of a change in selection mode contents, in which FIG. 10A is a view for explaining a change operation, and FIG. 10B is a view showing a display example;

FIGS. 11A, 11B, and 11C are views showing an example of distance measurement position selection, in which FIG. 11A is a view for explaining a distance measurement position change operation, and FIGS. 11B and 11C are views showing display examples;

FIGS. 12A and 12B are views showing an example for setting a distance measurement position to the initial position, in which FIG. 12A is a view for explaining a reset operation, and FIG. 12B is a view showing a display example;

FIG. 23 shows a perspective view and a block diagram of the fifth embodiment of the present invention;

FIG. 32 is a view showing the arrangement of the camera according to the eighth embodiment of the present invention;

DETAILED DESCRIPTION OF THE PREFERRED EMBODIMENTS

Figure 1:
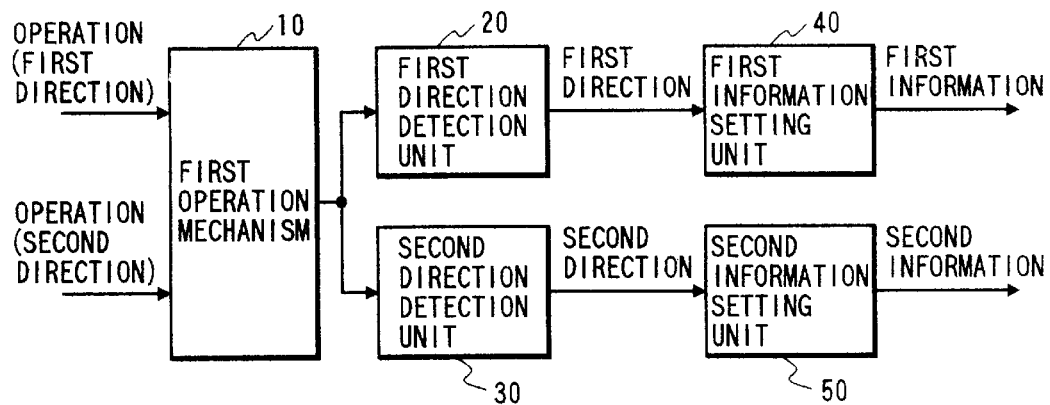
FIG. 1 is a block diagram of a principle according to the first aspect of the present invention.
Figure 2:
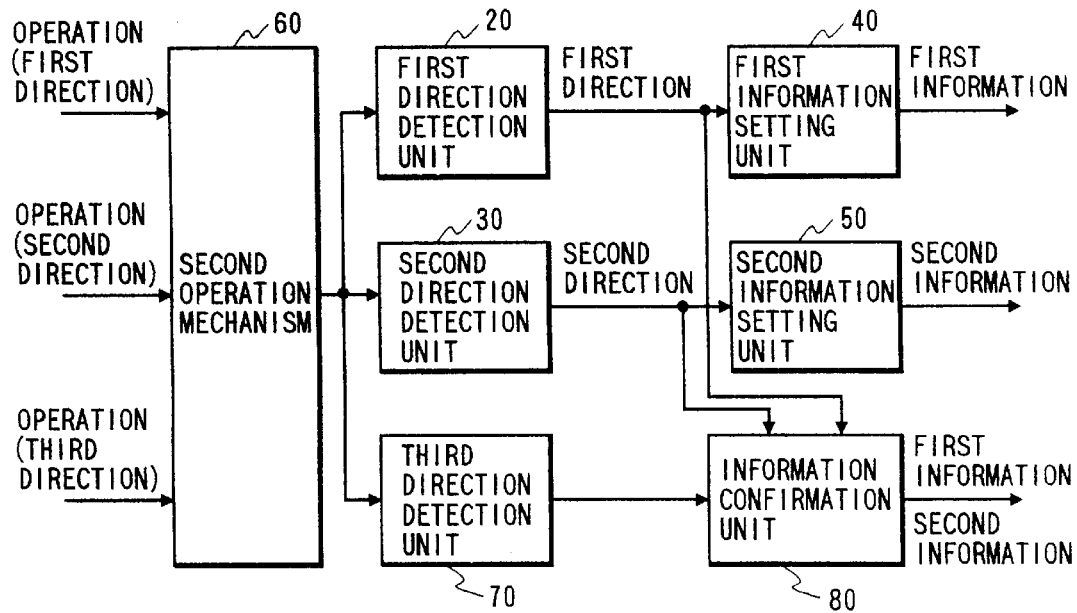
FIG. 2 is a block diagram of a principle according to the second aspect of the present invention.
Figure 3:
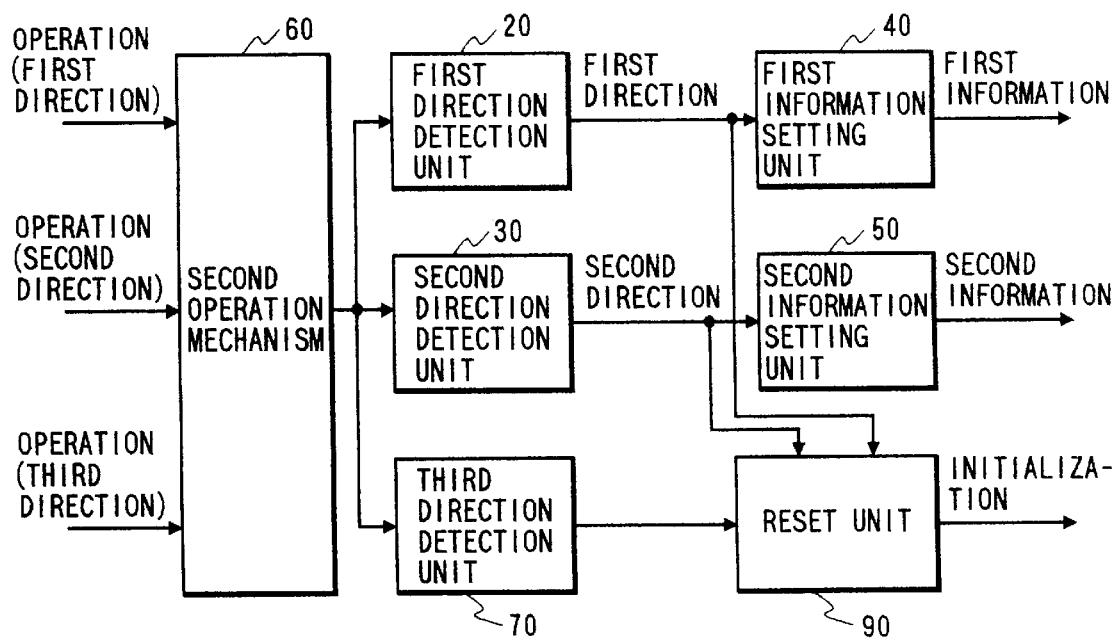
FIG. 3 is a block diagram of a principle according to the third aspect of the present invention.
Figure 4:
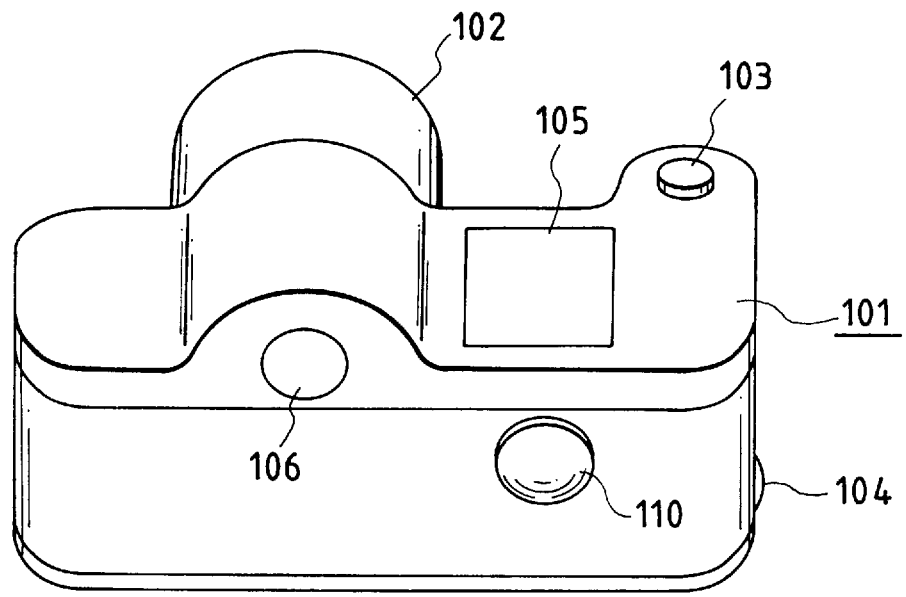
FIG. 4 is a perspective view showing the outer appearance of a camera according to the first embodiment of the present invention.

FIG. 4 is a perspective view showing the outer appearance of a camera according to the first embodiment of the present invention. Referring to FIG. 4, a lens 102 is mounted on the front surface (rear side in FIG. 4) of a camera 101. A finder 106 is arranged on the rear surface (front side in FIG. 4) of the camera 101. A user can visually check through the finder 106 an object image passing through the lens 102.

A display 105 comprising, e.g., an LCD (Liquid Crystal Display) is arranged on the right side of the illustrated upper surface when viewed from the rear side when the camera 101 is held at a horizontal position. This display 105 may be arranged in the finder 106. The set contents of various modes of exposure, photometry, distance measurement, and the like can be visually checked on the display 105.

A shutter button 103 is disposed at a portion extending toward the lower sheet surface in FIG. 4 and located on the right side of the upper surface when viewed from the rear side when the camera 101 is held at the horizontal position. Another shutter button 104 is disposed on the side portion of the extended portion. This shutter button is used when the camera 101 is held at the vertical position.

As is known well, in the operations of the shutter buttons 103 and 104, the internal circuit is powered on upon half depression to the first stage and exposure to a loaded film is performed upon full depression to the second stage.

Figure 5:
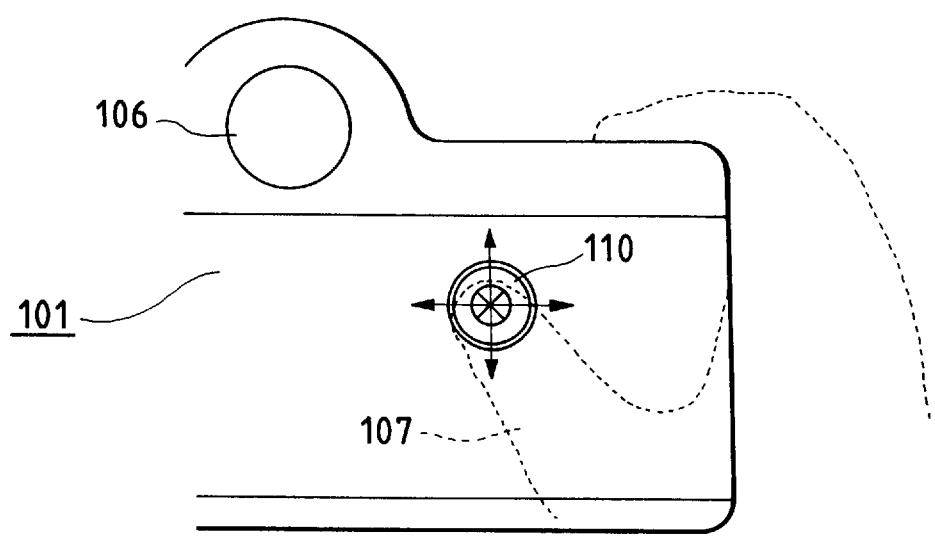
FIG. 5 is an enlarged view showing a portion near an operation mechanism.

A ball 110 serving as an operation mechanism of the present invention is disposed on the rear surface (front side in FIG. 4) of the camera 101. As shown in FIG. 5, the ball 110 is disposed such that a thumb 107 of the right hand is naturally placed when the camera 101 is held with the right hand.

Although the detailed structure around the ball 110 will be described later (FIG. 7), the ball 110 is rotated in a back and forth direction (vertical direction in FIG. 5) and a lateral direction (horizontal direction in FIG. 5), as shown in FIG. 5. The ball 110 is depressed from the front surface of the drawing to the rear surface of the drawing in FIG. 5, as indicated by a cross.

Figure 6:
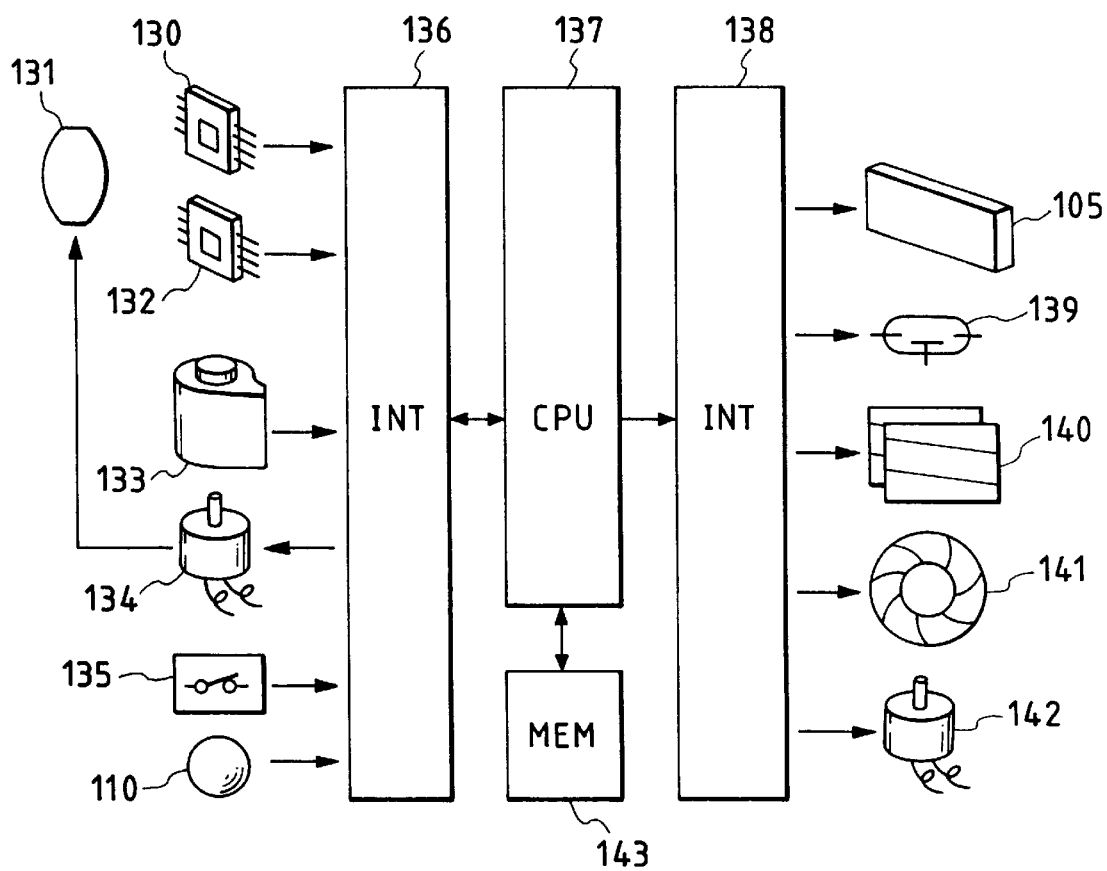
FIG. 6 is a view showing the electrical arrangement of the camera according to the first embodiment of the present invention.

FIG. 6 is a view showing the electrical arrangement of the camera of the first embodiment. Referring to FIG. 6, a central processing unit (to be referred to as a CPU hereinafter) 137 is the main component for camera operation control. The CPU 137 executes input and control of information through interface circuits (to be referred to as INTs hereinafter) 136 and 138.

More specifically, the film speed of the loaded film is received from a film speed detector 133 through the INT 136. An object image input to a photometric sensor 130 and a distance measuring sensor 132 through an optical system 131 including the lens 102 is received from the photometric sensor 130 and the distance measuring sensor 132. A signal representing an in-focus state of the object is received from the distance measuring sensor 132 to drive a focus motor 134, thereby realizing an in-focus state.

Various signals representing the sequence states in the camera 101 are received from various switches of a switch group 135 through the INT 136.

A signal (to be described later in FIG. 7) associated with the ball 110 is received to detect the rotational direction of the ball 110, and a depression operation, and mode information is set in correspondence with the rotational direction and the depression operation, and operations are performed on the basis of the set mode.

The display 105 is driven through the INT 138 to display an exposure condition, a distance measurement condition, and the like. An electronic flash device 139 is operated, and a shutter 140 is opened/closed to control the exposure time of the film. An opening amount of a stop 141 is controlled to control the object light amount reaching the film. A film feed motor 142 is driven to control winding and rewinding of the film.

Figure 7:
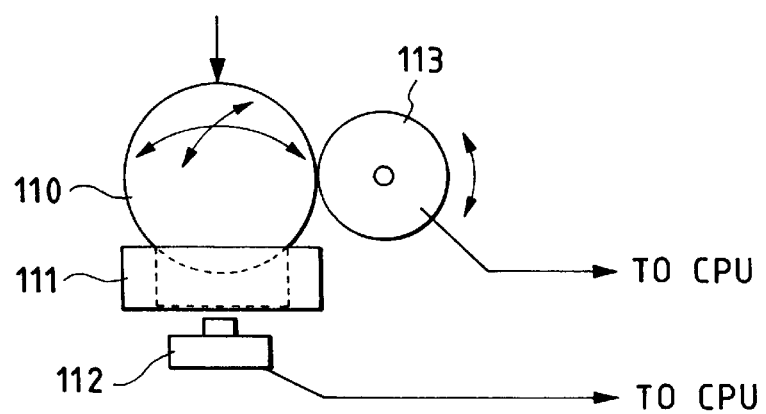
FIG. 7 is a view showing the detailed structure of the operation mechanism.

FIG. 7 is a view showing the detailed structure of the operation mechanism. Referring to FIG. 7, the ball 110 is rotatably placed in an annular opening of a cylindrical elastic packing 111 with a bottom. When the ball 110 is depressed, the elastic packing 111 is moved downward. When depression of the ball 110 is stopped, the packing 111 is moved upward and returns the ball 110 to the original position.

A switch 112 is arranged below the bottom portion of the elastic packing 111. When the switch 112 is urged by the bottom portion of the elastic packing 111, the switch 112 is turned on. An ON/OFF operation signal from the switch 112 is received by the CPU 137.

A depression detection unit detects the presence/absence of depression in the third direction in accordance with this ON/OFF operation signal and forms a depression signal. The CPU 137 confirms setting information and resets the set information in accordance with the formed depression signal.

A rotation detection roller 113 is disposed in contact with the side portion of the ball 110. For illustrative convenience, only one rotation detection roller 113 is illustrated. However, in practice, the two rotation detection rollers 113 are disposed to be spaced apart from each other by about 90° in contact with the side surface portions of the ball 110.

More specifically, when the ball 110 is rotated, one or both of the rotation detection rollers 113 are rotated together with the ball 110 to detect rotation of the ball 110. Rotation detection outputs from the two rotation detection rollers 113 are converted into electrical signals which are then input to the CPU 137.

The rotational direction detection unit in the CPU 137 calculates the vectors of the rotation detection contents of the two rotation detection rollers 113 to determine a rotational direction, i.e., the "vertical direction", or "lateral direction (horizontal direction)", and a rotation amount. The CPU 137 determines the contents of a mode change/adjustment operation on the basis of the detected rotational direction and the detected rotation amount. One of the "vertical direction" and the "horizontal direction" corresponds to the first direction, and the other corresponds to the second direction.

Note that the elastic packing 111 has an elasticity free from deformation against a force for rotating the ball 110. That is, the switch 112 is not operated in the change/adjustment operation for various modes.

The operation of the first embodiment will be described with reference to FIGS. 8A, 8B, 9A, 9B, 10A, 10B, 11A, 11B, 11C, 12A, 12B, and 13.

Figure 8A:
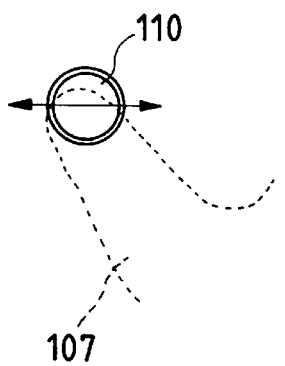
Figure 8B:
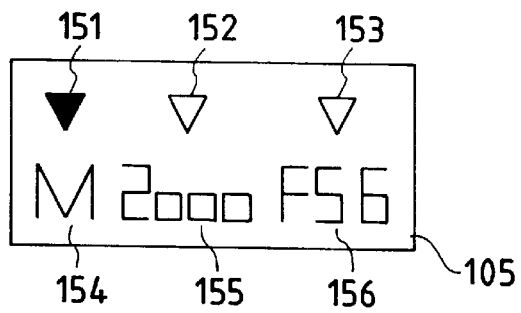

FIGS. 8A and 8B are views showing an example of exposure-associated mode selection. A mode is selected by rotating the ball 110 with the thumb 107 of the right hand in the horizontal direction, as shown in, FIG. 8A.

Three triangular segments 151, 152, and 153 are formed on the display 105 in the lateral direction, as shown in, e.g., FIG. 8B. Three segments 154, 155, and 156 are formed to vertically correspond to the segments 151, 152, and 153 in FIG. 8B.

The segments 151, 152, and 153 are used for mode selection. As shown in FIG. 8A, when the ball 110 is rotated in the horizontal direction, the three segments 151, 152, and 153 are sequentially turned on/off to allow the user to visually check the selection contents.

FIG. 8B shows a state in which the segment 151 is ON, while the segments 152 and 153 are OFF. In this case, the mode designated by the segment 151 has been selected. According to the first embodiment, the display state in FIG. 8B is an initial display state.

The segment 154 corresponding to the segment 151 indicates four exposure modes P, S, A, and M. The mode P represents a program priority exposure mode; S, a shutter priority exposure mode; A, an aperture priority exposure mode; and M, a manual exposure mode. In the illustrated example, the segment 154 represents the manual exposure mode M.

In the auto-exposure modes P, S, and A, the segment 155 corresponding to the segment 152 represents an automatically calculated shutter time. The segment 155 represents a manually selected shutter time in the manual mode M. In the illustrated example, 1/2000 is displayed, but 1/2000, 1/1000, . . . , 1/2, and 1/1 can be displayed.

In the auto-exposure modes P, S, and A, the segment 156 corresponding to the segment 153 represents an automatically calculated F-number. The segment 156 represents a manually selected F-number in the manual mode M. In the illustrated example, F5.6 is displayed, but F1.4, F2, . . . , F22, and F32 can be displayed.

Figure 9A:
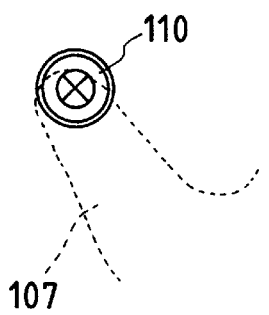
Figure 9B:
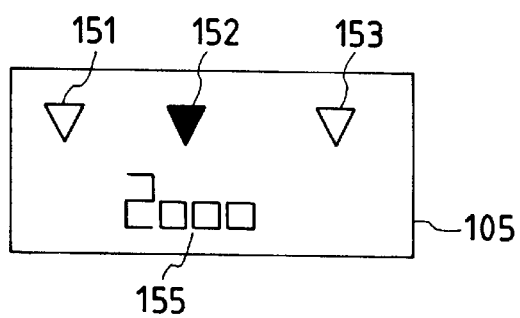

FIGS. 9A and 9B show an example of mode selection confirmation. Mode selection can be confirmed by depressing the ball 110 with the thumb 107 of the right hand, as shown in FIG. 9A. FIG. 9B shows a state in which the ball 110 is rotated in the horizontal direction with the thumb 107 of the right hand in FIG. 8B to turn on the segment 152 and select a shutter time, and the ball 110 is depressed with the thumb 107 of the right hand. Only the segment 155 is turned on to indicate that shutter time selection is confirmed. The segments 154 and 156 are kept off.

Figure 10A:
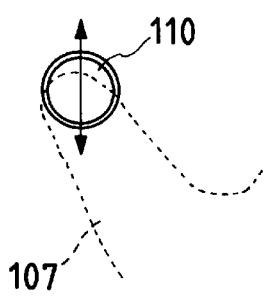
Figure 10B:
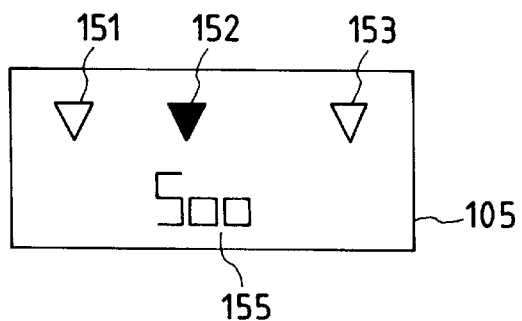

FIGS. 10A and 10B are views showing an example of a change in selection mode contents. The selection mode contents can be changed by rotating the ball 110 with the thumb 107 of the right hand in the vertical direction, as shown in FIG. 10A.

When the ball 110 is rotated with the thumb 107 of the right hand in the vertical direction in the state of FIG. 9B, the value of the shutter time on the segment 155 sequentially changes in accordance with rotation amounts.

FIG. 10B shows a state in which a shutter time of 1/500 is displayed.

If this shutter time is correct, the user simply depresses the shutter button 103. When exposure is completed, the display 105 displays all the conditions again, as shown in FIG. 8B. The segment 155, of course, represents 1/500.

If the user wants to check other segments in the state of FIG. 10B, the user depresses the ball 110 again. The display state of the display 105 returns to the initial display state shown in FIG. 8B while maintaining the condition that 1/500 is displayed on the segment 155. That is, the operation of a reset unit is performed.

For example, to select an aperture priority mode other than the manual mode, the ball 110 is rotated in the horizontal direction to turn on the segment 151, the ball 110 is depressed in this state, and the ball 110 is rotated in the vertical direction to display "A" on the segment 154, as shown in the display example of FIG. 8B.

The ball 110 is depressed to set the initial display state. The ball 110 is then rotated in the horizontal direction to turn on the segment 153, and the ball 110 is depressed for confirmation. The ball 110 is then rotated in the vertical direction to display a desired F-number on the segment 156.

In this case, since the shutter time can be automatically set, the segment 152 cannot be turned on, and this setting operation is skipped.

As described above, horizontal rotation of the ball 110 allows a change in mode selection segments (151, 152, and 153), vertical rotation of the ball 110 allows a change in detailed contents of the selected mode, and depression of the ball 110 allows confirmation or resetting. All these operations can be performed with only the thumb 107 of the right hand.

The exposure-associated modes have been described above. However, other modes such as a distance measurement/photometry-associated mode, and a date mode can be set in the same manner as described above. For example, in the distance measurement/photometry-associated modes, distance measurement modes (AF: autofocus, MF: manual focus) can be assigned to a combination of the segments 151 and 154, AF modes (C: continuous, S: single) can be assigned to a combination of the segments 152 and 155, photometric modes (AMP: auto-multi-pattern, C/W: center weight, SPOT: spot exposure) can be assigned to a combination of the segments 153 and 156.

In the date mode (year, month, day), similarly, "year" (1, 2, . . . , 99 and 00) can be assigned to a combination of the segments 151 and 154, "month" (1, 2, . . . , 11, and 12) can be assigned to a combination of the segments 152 and 155, and "day" (1, 2, . . . , 30, and 31) can be assigned to a combination of the segments 153 and 156.

In the above description, processing has three steps, i.e., mode selection, mode confirmation, and a change in detailed contents of the mode. However, one of the segments 151 to 153 which is selected upon rotation of the ball 110 in the horizontal direction can be detected by the CPU 137. Therefore, a confirmation operation need not be performed in the display example of FIG. 8B.

That is, the ball 110 is rotated in the horizontal direction to select and turn on, e.g., the segment 152, and then the ball 110 is rotated in the vertical direction, so that the display example of FIG.10B can be obtained.

In a combination of zooming and focusing, only one segment is formed in place of the segments 151 to 156 on the display 105. Horizontal rotation of the ball 110 allows to display a zooming value, and vertical rotation of the ball 110 allows to display a focusing value.

An operation mechanism which allows horizontal movement and vertical movement, such as a joystick can be used in place of the ball 110, as a matter of course.

A confirmation operation effect can be enhanced in the presence of a plurality of sets of the segments 151 to 153 and the segments 154 to 156. This can be readily understood by the following example. Assume that as the segments 151 to 153 and the segments 154 to 156, three sets, i.e., a set of (151*a*, 152*a*, 153*a*) and (154*a*, 155*a*, 156*a*), a set of (151*b*, 152*b*, 153*b*) and (154*b*, 155*b*, 156*b*), and a set of (151*c*, 152*c*, 153*c*) and (154*c*, 155*c*, 156*c*) are available. The exposure-associated modes are assigned to the set of (151*a*, 152*a*, 153*a*) and (154*a*, 155*a*, 156*a*), the distance measurement/photometric modes are assigned to the set of (151*b*, 152*b*, 153*b*) and (154*b*, 155*b*, 156*b*), and the date mode is assigned to the set of (151*c*, 152*c*, 153*c*) and (154*c*, 155*c*, 156*c*).

Figure 11A:
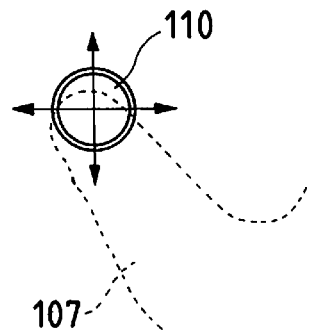
Figure 11B:
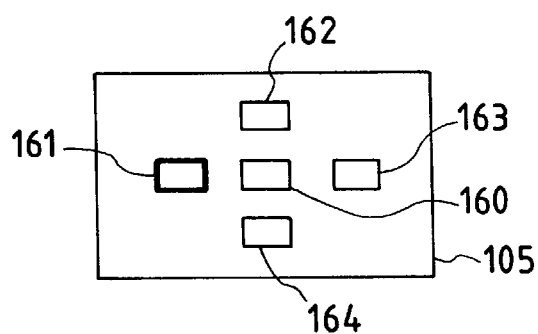
Figure 11C:
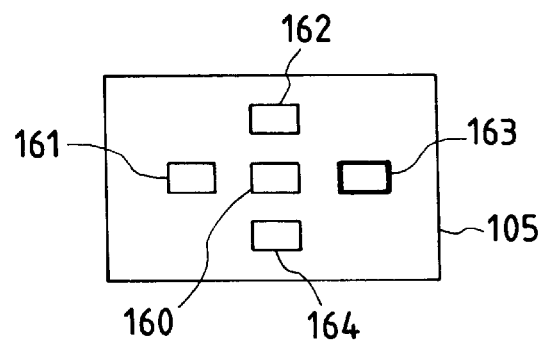

FIGS. 11A, 11B, and 11C are views showing an example of distance measurement position selection. As shown in FIG. 11A, the ball 110 is rotated with the thumb 107 of the right hand in the vertical and horizontal directions, as indicated by arrows.

As shown in FIGS. 11B and 11C, if five distance measurement positions including a central frame segment 160, a left frame segment 161, an upper frame segment 162, a right frame segment 163, and a lower frame segment 164 are set within the rectangular screen of the display 105 arranged outside the camera 101 or within the finder 106, these five distance measurement positions can be set with rotation of the ball 110. Note that the distance measuring sensor 132 can detect the focus state of an object in correspondence with these five distance measurement positions.

FIG. 11B shows a state in which the left frame segment 161 is selected. The selected "left frame segment 161" is displayed at a higher density and can be distinguished from the remaining "nonselected frame segments 160 and 162 to 164". The photographer selects a photographic angle so that the object to be focused is placed at the portion of the left frame segment 161. To change an area subjected to distance measurement to another position, the ball 110 is rotated in the vertical or horizontal direction to display a desired frame segment at a higher density, as shown in FIG. 11A.

For example, when the ball 110 is rotated in the horizontal direction by a predetermined amount, the central frame segment 160 is temporarily displayed at a higher density, and then the right frame segment 163 is displayed at a higher density, as shown in FIG. 11C, thereby determining that the distance measurement position has changed.

After one of the frame segments 161 to 164 as peripheral frame segments representing the limits in the corresponding directions is selected, the display state does not change even if the ball 110 is rotated in the left, upper, right, or lower direction.

Assume various photographic situations. When another distance measurement position is to be selected in the state shown in FIG. 11B or 11C, a state in which the user does not have enough time to keep rotating the ball 110 the number of times, or a state in which the user forgets the selected distance measurement position can be assumed.

Figure 12A:
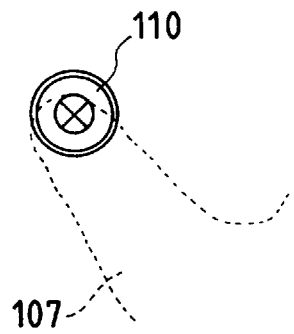
Figure 12B:
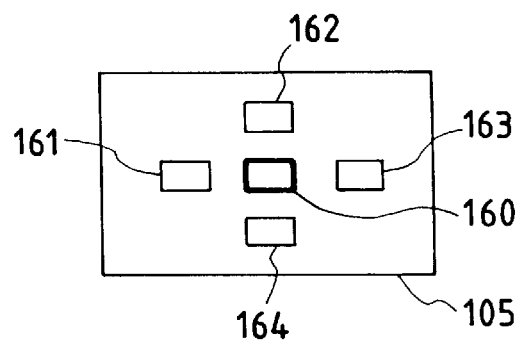

In this case, the operation shown in FIGS. 12A and 12B becomes effective. FIGS. 12A and 12B are views showing an example for setting the distance measurement position to the initial position. As shown in FIG. 12A, when the ball 110 is depressed to turn on the switch 112, the selected areas of the left and right frame segments 161 and 163 shown in the display examples of FIGS. 11B and 11C are reset, and the distance measurement position returns to the central frame segment 160 as the initial position, as shown in FIG. 12B.

To change the distance measurement position again, the ball 110 is rotated, as shown in FIG. 11A.

As can be readily understood, the function of resetting the distance measurement area to the initial state is useful in a camera having a larger number of distance measurement positions than the illustrated five distance measurement positions.

Figure 13:
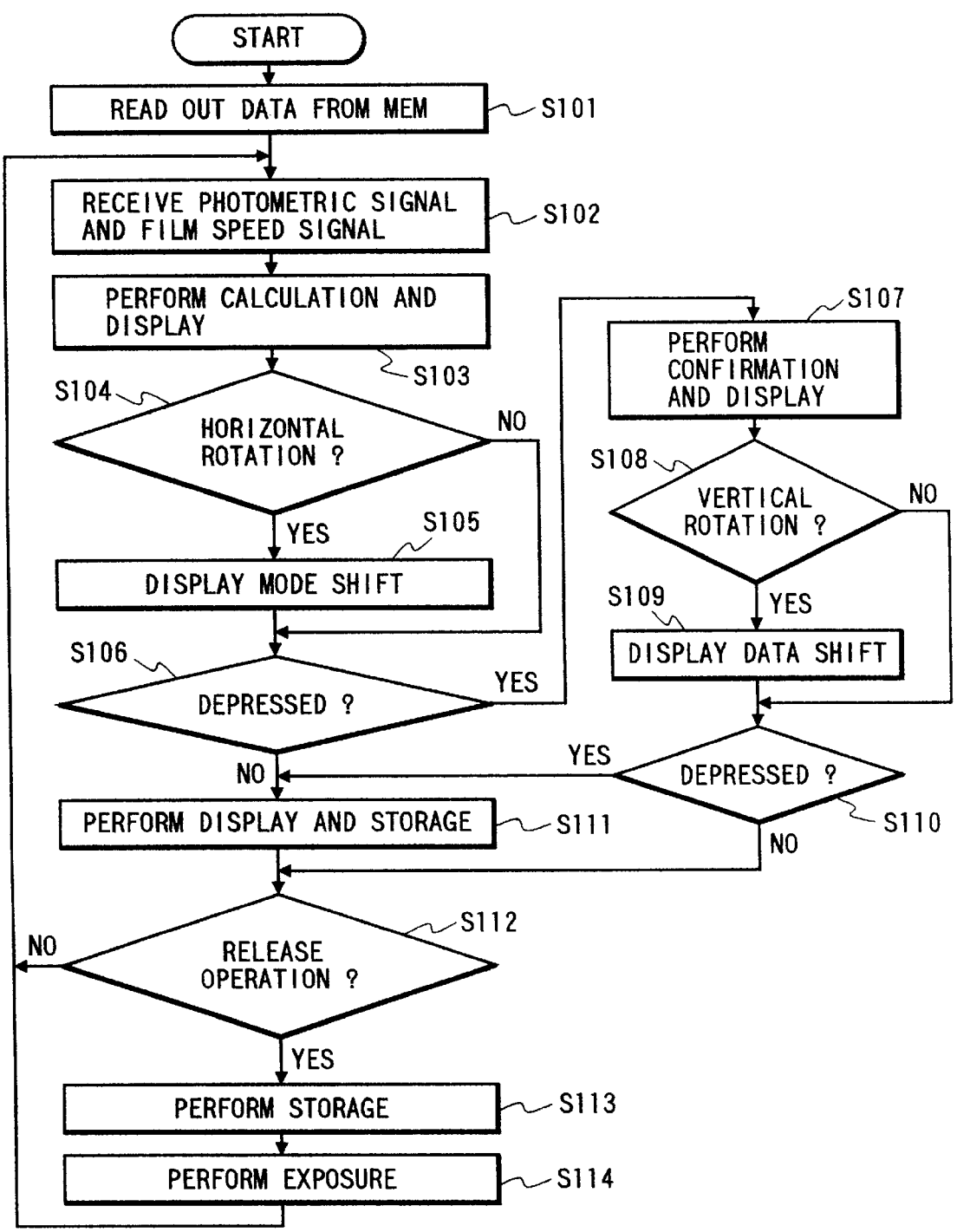
FIG. 13 is a flow chart showing an information setting operation.

FIG. 13 is a flow chart showing an information setting operation performed by the CPU 137. This sequence is started when a battery is connected and the power switch is turned on upon-depression of the shutter button 103 to the first stage. This sequence is repeatedly executed until power supply continues by a power supply timer or the like.

This sequence is associated with a change in selection of the exposure conditions described with reference to FIGS. 8A, 8B, 9A, 9B, 10A, and 10B. Since distance measurement selection processing with reference to FIGS. 11A, 11B, 11C, 12A, and 12B can be similarly performed, and a description thereof will be omitted.

Referring to FIG. 13, the previously set conditions are read out from a memory circuit (MEM) 143 in step S101.

In step S102, an object brightness signal from the photometric sensor 130 and a film speed signal from the film speed detector 133 are received.

In step S103, the received signals are calculated on the basis of the various conditions read out in step S101, thereby calculating an optimal exposure condition. A shutter time and an F-number are then determined. The results are displayed on the display 105.

In step S104, outputs from the two rotation detection rollers 113 are received, and the rotational direction detection unit (see FIG. 7) calculates the vectors to determine whether the ball 110 is rotated in the horizontal direction. If so, a rotation amount is also calculated. If the ball 110 is rotated in the horizontal direction, determination becomes affirmative (YES), and the flow advances to step S105. If the ball 110 is not rotated in the horizontal direction, determination becomes negative (NO), and the flow advances to step S106.

Since the ball 110 is rotated in the horizontal direction, one of the segments 151 to 153 on the display 105 is turned on in step S105. This processing corresponds to the display example in FIG. 8B.

In step S106, the depression detection unit (see FIG. 7) detects the presence/absence of depression in accordance with the output signal from the switch 112 to determine whether the ball 110 is depressed. As a result of determination, if the ball 110 is depressed, determination becomes affirmative (YES), and the flow advances to step S107. If the ball 110 is not depressed, determination becomes negative (NO), and the flow advances to step S111.

In step S107, of all the segments 151 to 153, segments except one segment selected in step S105 are turned off. This processing corresponds to the display example in FIG. 9B.

In step S108, outputs from the two rotation detection rollers 113 are received, and the rotational direction detection unit (see FIG. 7) calculates vectors to detect whether the ball 110 is rotated in the vertical direction. If YES in step S108, a rotation amount is also calculated.

In step S109, since the ball 110 is rotated in the vertical direction, the value of the ON segment is changed. This processing corresponds to the display example in FIG. 10B.

In step S110, the depression detection unit (see FIG. 7) detects the presence/absence of depression in accordance with the output signal from the switch 112 to determine whether the ball 110 is depressed. As a result of determination, if the ball 110 is depressed, determination becomes affirmative (YES), and the flow advances to step S111. If the ball 110 is not depressed, determination becomes negative (NO), and the flow advances to step S112.

In step S111, the latest settings are displayed on the display 105 on the basis of the conditions selected or changed as described above. The latest settings are stored in the memory circuit (MEM) 143 as new data.

Even if it is determined in step S104 or S106 that no operation is performed, information is stored again.

It is determined in step S112 whether the shutter button 103 is depressed to the second stage and an exposure start instruction is generated. As a result of determination, if the shutter button 103 is depressed, determination becomes affirmative (YES), and the flow advances to step S113. If the shutter button 103 is not depressed, determination becomes negative (NO). In this case, an exposure operation is unnecessary, and the flow returns to step S102. The above processing operations are repeatedly performed.

Latest data is stored in the memory circuit (MEM) 143 in step S113 in order to cope with generation of an exposure instruction in step S112 while the ball 110 is not depressed in step S110.

In step S114, a predetermined exposure sequence is executed. More specifically, the stop 141 is controlled to a predetermined value calculated in step S103, the shutter 140 is kept open for a predetermined period of time in accordance with the value obtained in step S103, and then the film feed motor 142 is driven to wind the film by one frame. The flow returns to step S102 to prepare for the next exposure.

As described above, according to the present invention, since various pieces of information of the camera can be selected and changed with a single operation mechanism, the photographer concentrates himself on photography while a specific finger for operating the operation mechanism is kept placed at the same position. Therefore, the photographer will not miss a shutter chance.

Figure 14A:
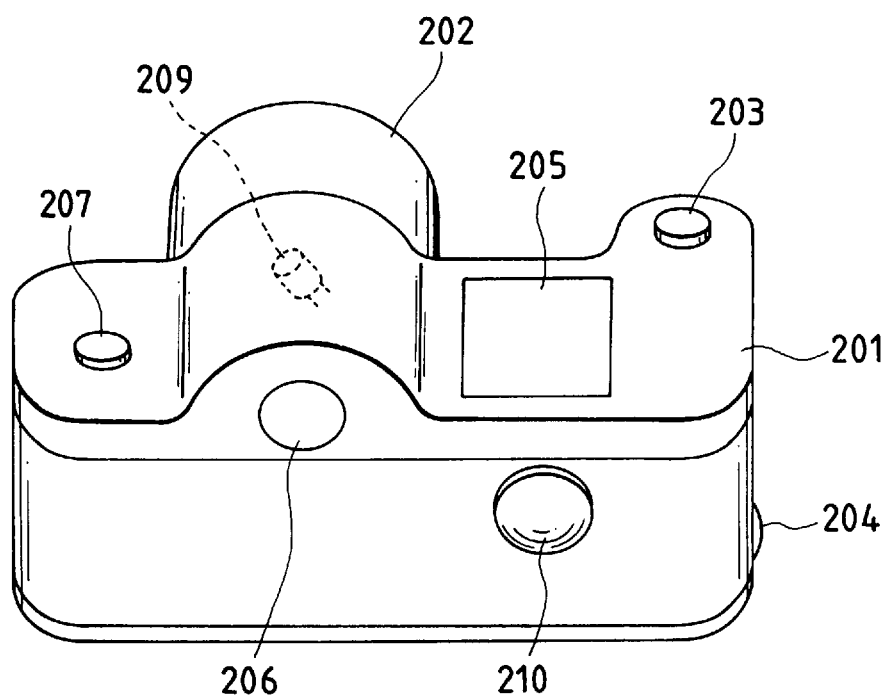
FIG. 14A is a perspective view showing the outer appearance of a camera according to the second embodiment of the present invention.

FIG. 14A is a perspective view showing a camera according to the second embodiment of the present invention. Referring to FIG. 14A, an object image passing through a lens 202 mounted on a camera 201 can be visually checked through a finder 206. Various exposure conditions can be visually checked on a display 205. The display 205 may be arranged inside the finder 206.

Figure 14B:
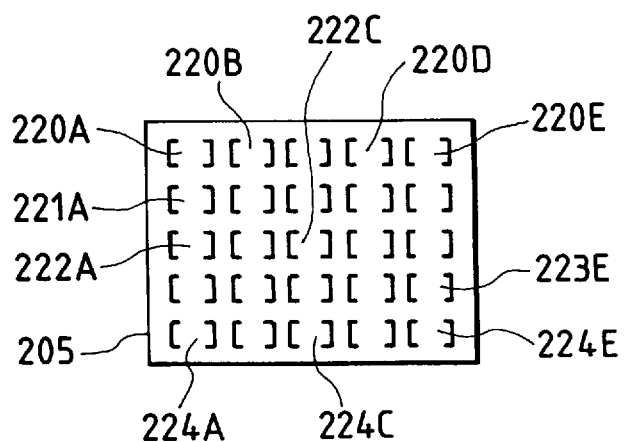
FIG. 14B is a view showing a display example of distance measurement areas of a display.

FIG. 14B shows 25 distance measurement areas 220A to 220E, 221A to 221E, 222A to 222E, 223A to 223E, and 224A to 224E displayed on the display 205.

Power supply to a circuit in the camera 201 and exposure to a loaded film are started upon depression of a shutter button 203 to the first and second stages, respectively. Another shutter button 204 is used when the camera 201 is held at the vertical position, and its function is identical to that of the shutter button 203. A track ball 210 according to the present invention is disposed on the rear surface of the camera 201.

When a user holds the camera 201, the thumb of the right hand (not shown) is naturally placed on the track ball 210. As will be described later, when the user applies a rotation force to the track ball 210 in the upper, lower, left, or right direction while observing the display 205, he can perform various selection and change operations. The track ball 210 is normally used to select a distance measurement area. When a mode button 207 on the left side of the camera 201 is depressed, the track ball 210 is used to select and set elements associated with other modes. A posture sensor 209 is arranged inside the camera 201. The posture of the camera 201 held by the user can be detected. Note that posture detection using the posture sensor 209 is disclosed in Japanese Utility Model Application Laid-Open No. 64-9229.

Figure 15:
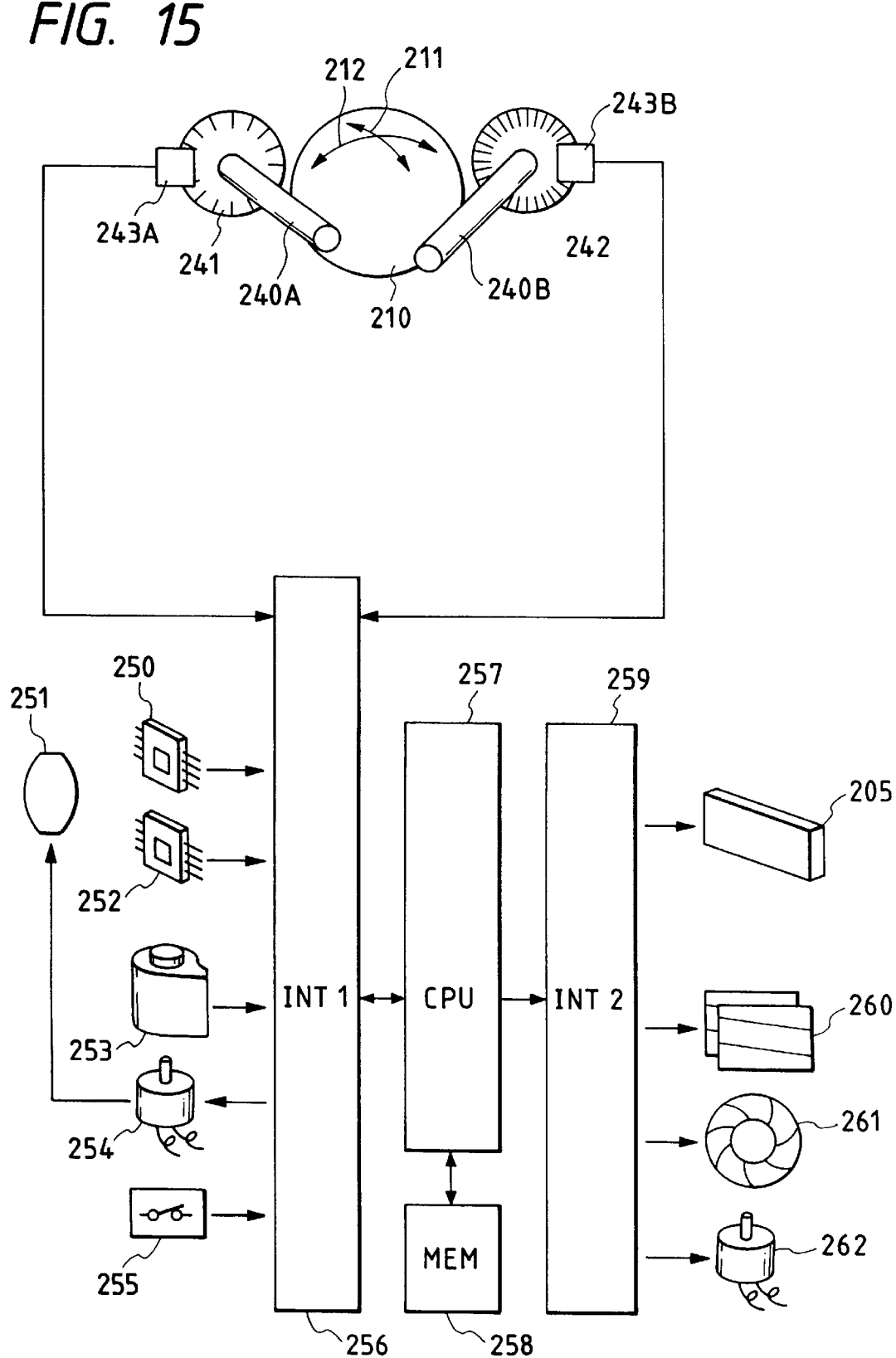
FIG. 15 shows a perspective view and a block diagram of the second embodiment of the present invention.

FIG. 15 shows the peripheral mechanism and the electrical circuit block of the track ball 210. Assume that the camera 201 of this embodiment does not have the shutter button 204. In any posture, the relationship between the track ball 210 and the thumb 215 of the right hand is kept in the posture shown in, e.g., FIG. 71A, and is not changed in photography at the vertical position. The vertical and horizontal rotational directions of the track ball 210 rotated with the thumb 215 are predetermined. The posture detection switch 209 can also be omitted due to the same reason described above.

Two rollers 240A and 240B are in contact with the side surfaces of the track ball 210. The rollers 240A and 240B are interlocked with rotation of the track ball 210 in a vertical direction 211 and rotation of the track ball 210 in a horizontal direction 212, respectively. Needless to say, rotation in an oblique direction (a direction between the directions 211 and 212) is shared and transmitted to the rollers 240A and 240B. Sectors 241 and 242 are fixed to one-side portions of the rollers 240A and 240B and are rotated interlocked with the track ball 210 together with the rollers 240A and 240B.

Illustrated slits are formed on the peripheral portions of the sectors 241 and 242. The pitches of the slits of the sectors 241 and 242 are different from each other. The pitch of the slits of the sector 242 is smaller than that of the sector 241.

This makes it possible to generate a larger number of pulses with a small rotation amount in the vertical direction 211 in which a rotation amount is small. Photocouplers 243A and 243B arranged near the sectors 241 and 242 detect light passing through the slits.

The photocouplers 243A and 243B generate pulses representing the number of slits through which light passes, i.e., the rotation amount of the track ball 210, and a slit passing direction, i.e., the rotational direction of the track ball 210. These pulses are input to a CPU 257 (to be described later) and are detected as the rotational direction and rotation amount of the track ball 210.

In the electrical circuit block located in the lower portion of FIG. 15, control operations are performed by the CPU 257. Signals input to and output from the CPU 257 perform the following information input and control operations through interface circuits 256 and 259.

The CPU 257 receives signals associated with the rotational direction and rotation amount of the track ball 210 through the photocouplers 243A and 243B. The CPU 257 directly exchanges data with a memory circuit 258. The memory circuit 258 electrically stores various conditions previously selected and changed by the track ball 210. The CPU 257 receives an object brightness signal from a photometric sensor 250 through the interface circuit 256. Similarly, the CPU 257 also receives a signal associated with the in-focus state of an object from a distance measuring sensor 252. The CPU 257 also receives the film speed of a loaded film from a film speed detector 253. The object image is input to the photometric element 250 and the distance measuring element 252 through a lens optical system 251. The in-focus state of the lens optical system 251 is controlled by a focus motor 254. The CPU 257 receives signals from a plurality of switches of a switch group 255 which represent the sequence states of the camera 201 The display 205 is driven through the interface circuit 259 to display distance measurement areas (to be described later) and exposure conditions. A shutter 260 is opened/closed to control the exposure time of the film. The opening amount of a stop 261 is controlled to control the object light amount reaching the film. A film feed motor 262 is driven to control winding or rewinding of the film.

Figure 16:
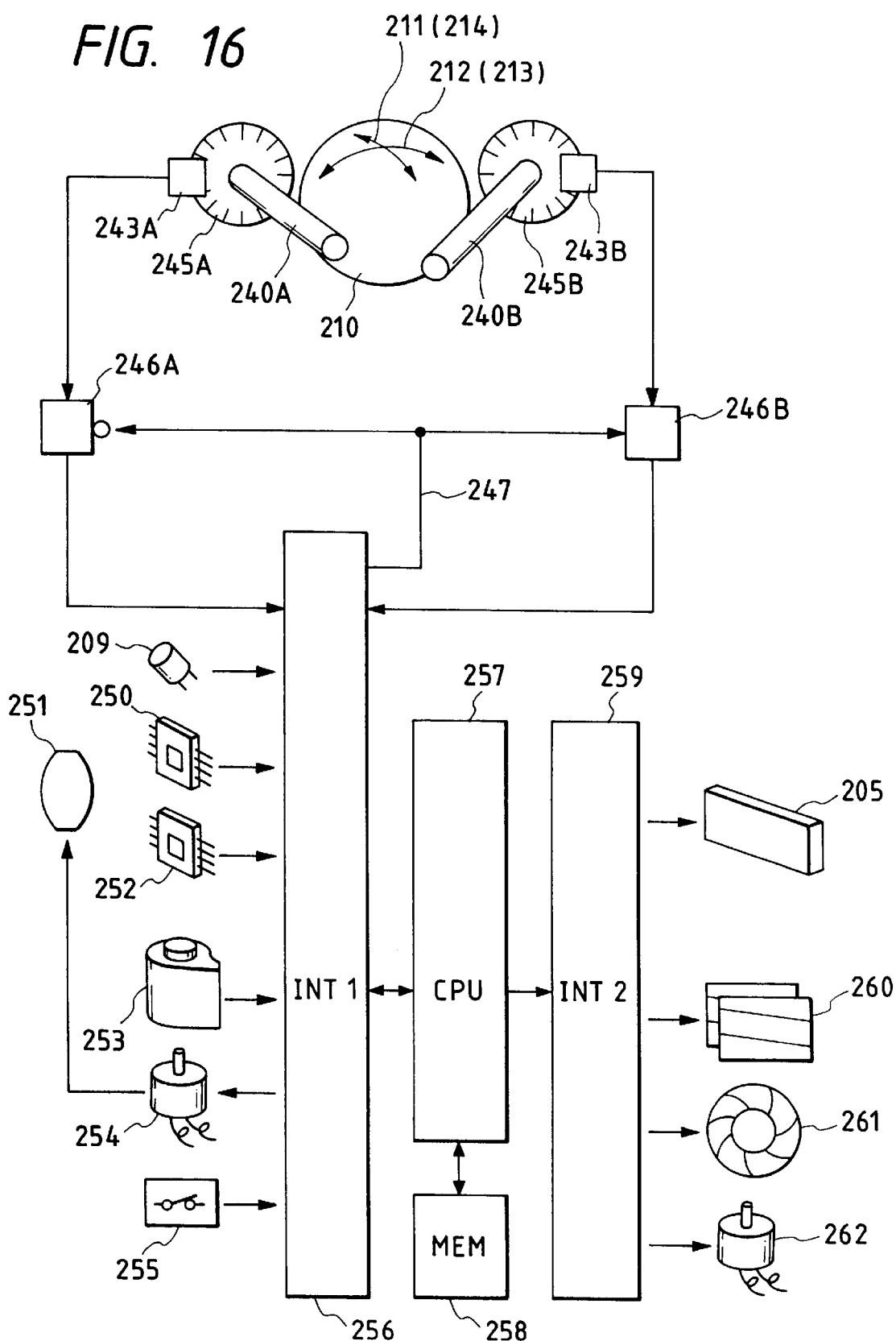
FIG. 16 shows a perspective view and a block diagram of the third embodiment of the present invention.

FIG. 16 shows the third embodiment as an expanded embodiment of FIG. 15. The third embodiment in FIG. 16 is different from the second embodiment in FIG. 15 in that the present invention is applied to a camera having a shutter button 204 and a posture sensor 209. Optimal operability can be provided for both horizontal and vertical photographic postures, respectively, shown in FIGS. 71A and 72A. As will be described in detail later, for this purpose, identical sectors 245A and 245B are used, processing of output pulses from the sectors 245A and 245B is properly selected in accordance with the posture of a camera 201 to determine the rotation amount of a track ball 210.

Two rollers 240A and 240B are in contact with the side surfaces of the track ball 210. The rollers 240A and 240B are interlocked with rotation of the track ball 210 in a vertical direction 211 (corresponding to the vertical methods 811 and 813 in FIGS. 71A and 72A) and rotation of the track ball 210 in a horizontal direction 212 (corresponding to the horizontal directions 812 and 814 in FIGS. 71A and 72A), respectively. Needless to say, rotation in an oblique direction is shared and transmitted to the rollers 240A and 240B. The sectors 245A and 245B are fixed to one-side portions of the rollers 240A and 240B and are rotated interlocked with the track ball 210 together with the rollers 240A and 240B.

Unlike the sectors 241 and 242 in FIG. 15, the sectors 245A and 245B of this embodiment have the same shape and the numbers of slits equal to each other. Photocouplers 243A and 243B arranged near the sectors 245A and 245B detect light passing through the slits. The photocouplers 243A and 243B generate pulses representing the number of slits through which light passes, i.e., the rotation amount of the track ball 210, and a slit passing direction, i.e., the rotational direction of the track ball 210. These pulses are transmitted to multipliers 246A and 246B. The multipliers 246A and 246B multiply the input pulses with a predetermined multiple and output the multiplied pulses.

Figure 71A:
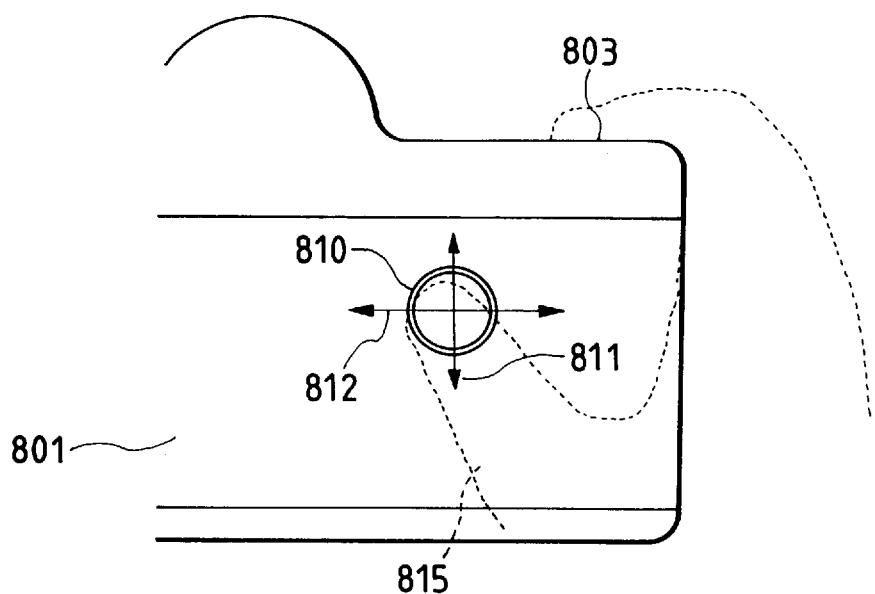
FIG. 71A is a rear view showing a conventional camera.
Figure 71B:
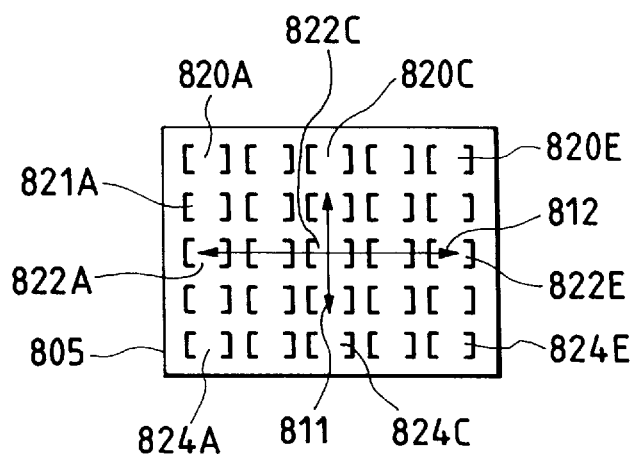
FIG. 71B is a view showing a display example of the distance measurement areas on the display.
Figure 72A:
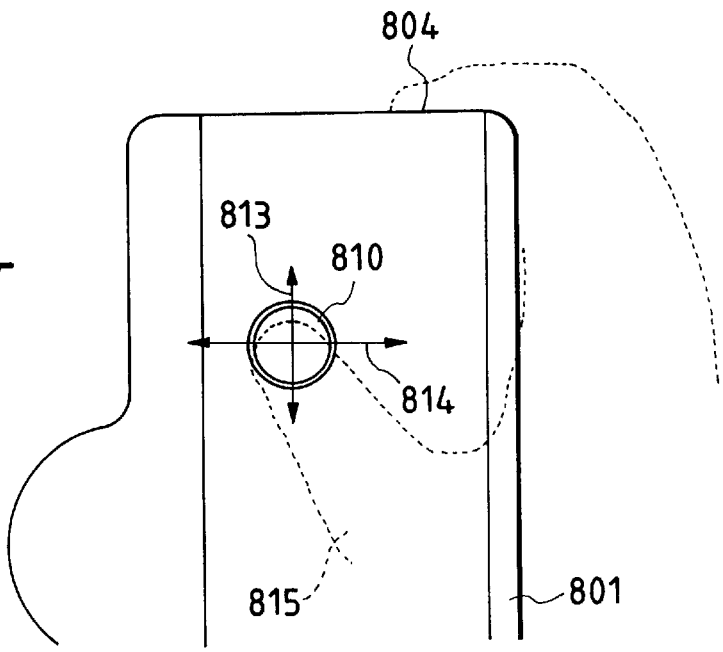
FIG. 72A is a rear view showing the conventional camera.
Figure 72B:
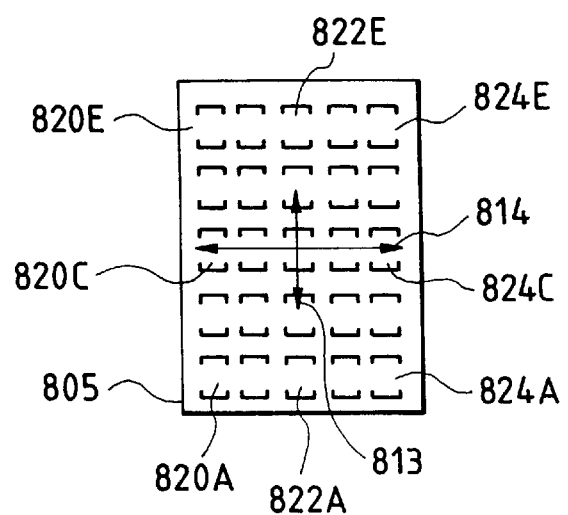
FIG. 72B is a view showing a display example of the distance measurement areas on the display.
Figure 73A:
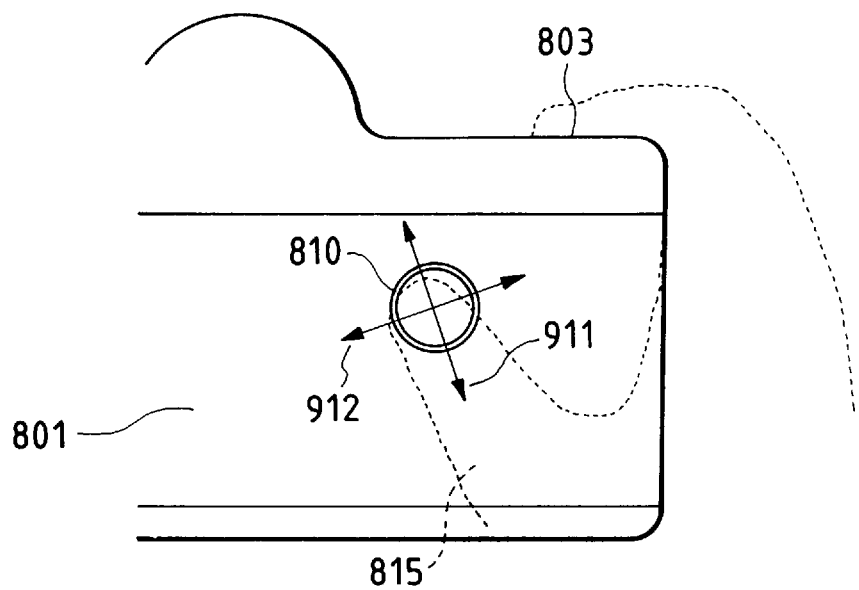
FIG. 73A is a rear view showing the conventional camera.
Figure 73B:
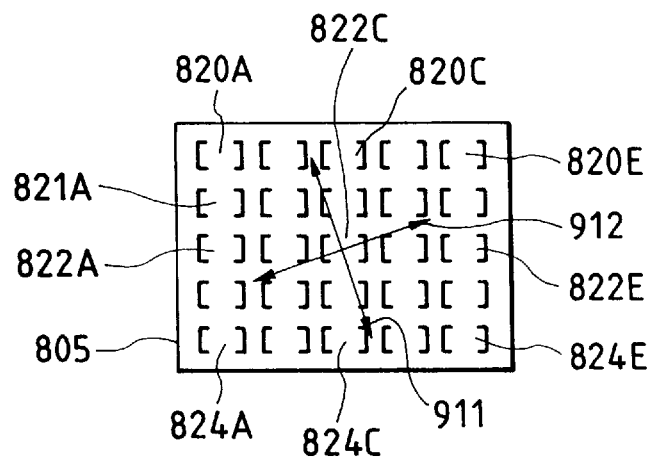
FIG. 73B is a view showing a display example of the distance measurement areas on the display.
Figure 74A:
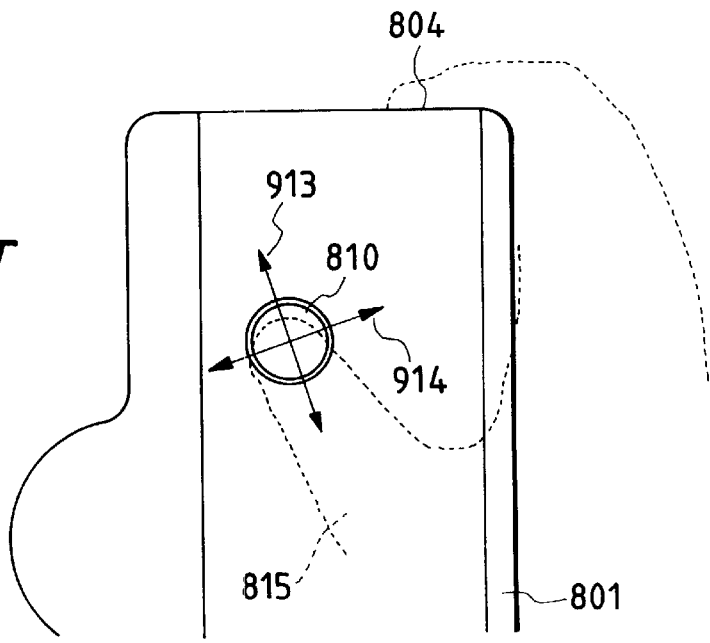
FIG. 74A is a rear view showing the conventional camera.
Figure 74B:
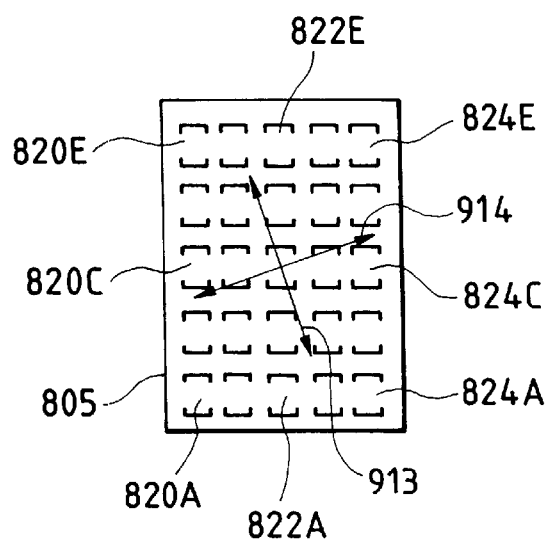
FIG. 74B is a view showing a display example of the distance measurement areas on the display.

As will be described later, the multipliers 246A and 246B perform the multiplication function in accordance with a control signal 247 from a CPU 257 or directly output the input pulses without any processing. Only the multiplication function of one of the multipliers 246A and 246B is selected. That is, while one multiplier performs the multiplication function, the other multiplier simply serves as a follower. More specifically, in photography at the normal position, as shown in FIG. 71A, the rotation amount of the track ball 210 in a vertical direction 211 is small. To compensate for this small rotation amount, the multiplier 246B is turned on. At this time, the multiplication function of the multiplier 246A corresponding to a horizontal direction 212 is disabled. To the contrary, when the camera is held at the vertical position, as shown in FIG. 72A, the multiplier 246A is turned on to compensate for the rotation amount in a vertical direction 213. At this time, the multiplication function of the multiplier 246B corresponding to a horizontal direction 214 is disabled. Control of the multipliers 246A and 246B is determined by the CPU 257 in accordance with an output from the posture detection switch 209 which is transmitted through an interface circuit 256.

The electrical circuit shown in the lower portion of FIG. 16 is the same as that of FIG. 15, and a repetitive description will be omitted. Note the multiplication factor is 2×. However, a multiplication function of 3 × or more may be provided in accordance with the degree of necessity for operation amount compensation in the vertical and horizontal directions. Alternatively, eight multipliers may be prepared. A method of selecting one of the eight multipliers in accordance with the posture of the camera 201 may be used to provide a method of obtaining better comfort in use. The above multiplication function can also be obtained by a method of executing software in the CPU 257 in place of hardware such as the multipliers 246A and 246B, thereby obtaining the same effect as described above. The same effect as described above can also be obtained by a frequency dividing function opposite to the multiplication function in such a manner that the frequency-divided pulses are thinned by hardware or software. In this case, a larger number of slits are prepared for the sectors 245A and 245B, and frequency dividers are used in place of the multipliers 246A and 246B, thereby obtaining the same effect as described above.

Figure 17:
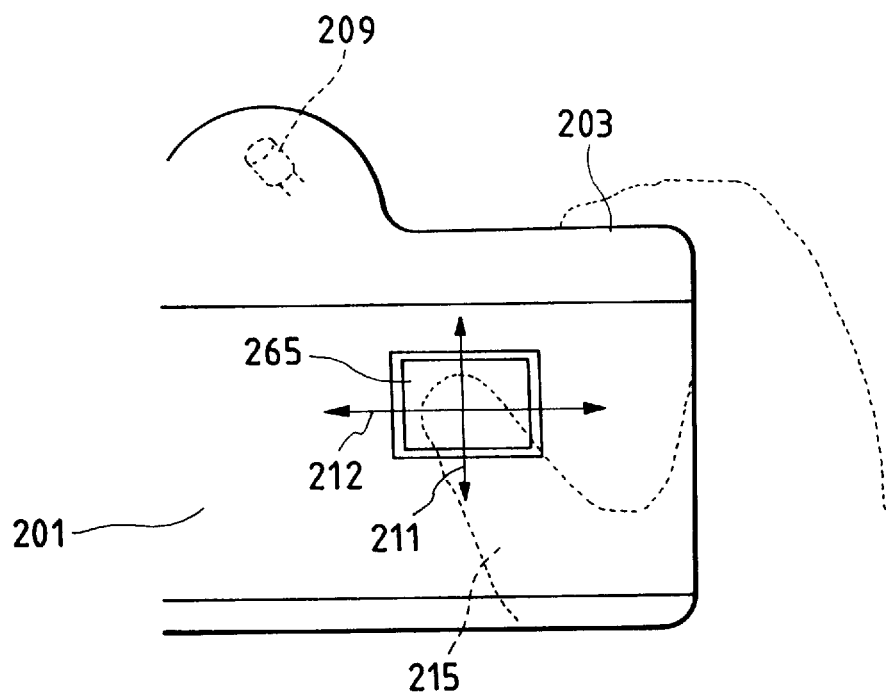
FIG. 17 is a rear view showing a camera according to the fourth embodiment of the present invention.

FIG. 17 is a rear view showing a camera 201 according to the fourth embodiment of the present invention using a scheme for detecting a designated direction by bringing the tip of a finger into contact with the surface of a touch panel 265 in place of the use of a track ball 210. The touch panel 265 can employ a switch scheme for mechanically detecting depression of a finger and a scheme for detecting the touch of a finger by electrostatic induction. In either case, as illustrated in FIG. 17, an operation range in a vertical direction 211 is narrower than that in a horizontal direction 212. The technique described with reference to FIGS. 15 and 16 can be used in the camera 201 employing the touch panel 265. For example, as an embodiment corresponding to FIG. 15, there can be provided a method in which the array pitch of mechanical switches in the vertical direction 211 is set smaller than that in the horizontal detection 212.

Figure 18:
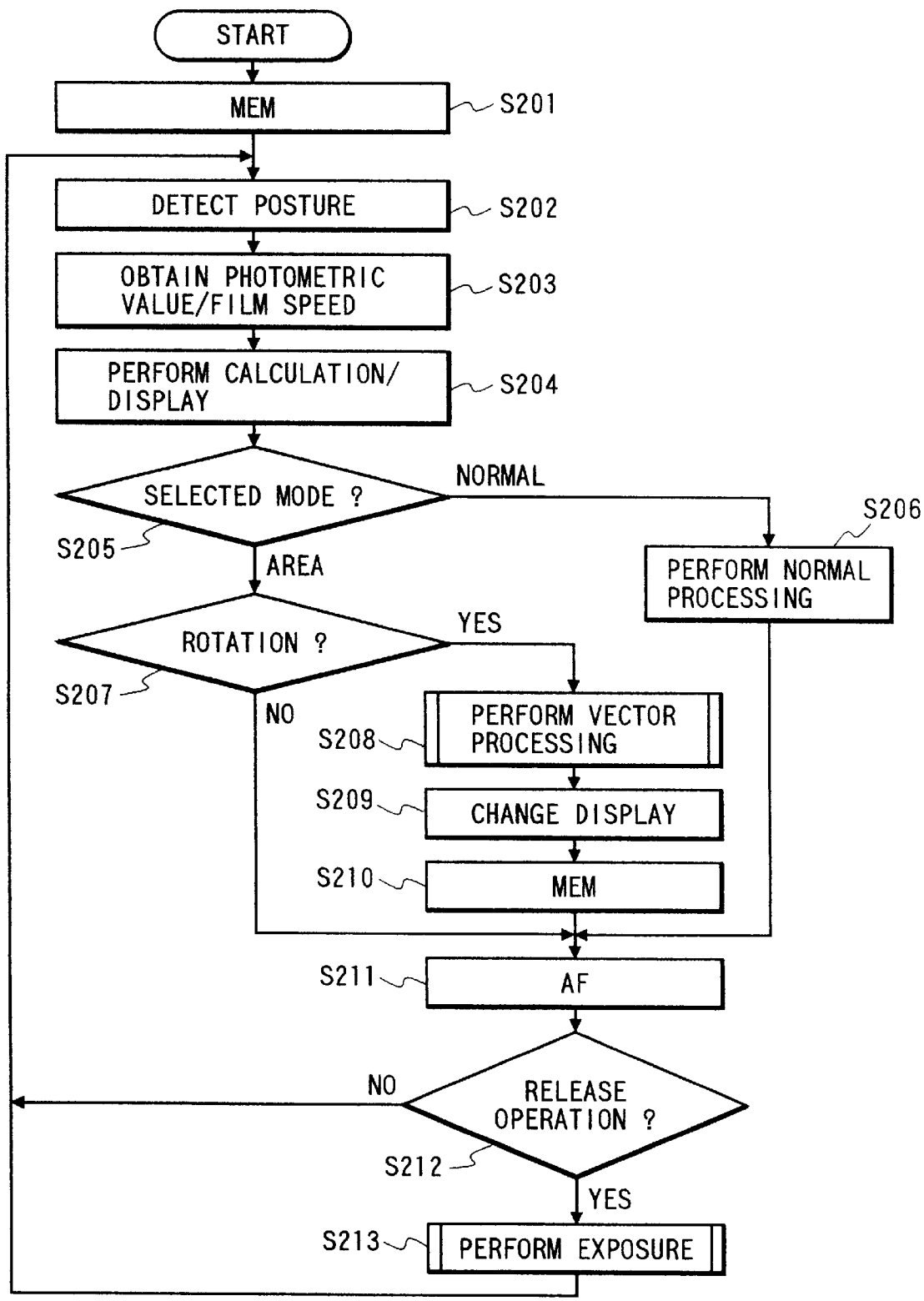
FIG. 18 is a flow chart showing an information setting operation.

FIG. 18 is a processing program mainly executed by the CPU 257 in the camera 201. This processing is started when a battery (not shown) is connected and a power switch is turned on upon depression of a shutter button 203 to the first stage. This processing is repeated until power supply continues by a power supply timer (not shown) or the like.

In step S201, previously set conditions are read out from a memory circuit 258. The set conditions are mainly those displayed on a display 205. In step S202, the posture of the camera 201 is determined through a posture detection switch 209. In step S203, an object brightness signal from a photometric sensor 250 and a film speed signal from a film speed detector 253 are received. In step S204, the received signals are calculated on the basis of the various conditions read out in step S203, thereby calculating an optimal exposure condition. A shutter time and an F-number are then determined. The results are displayed on the display 205. An element corresponding to the posture of the camera 201 read through the posture switch 209 in step S202 is also added in this calculation.

In step S205, it is determined whether a mode button 207 is depressed. If the mode button 207 is not depressed, the track ball 210 is used for selection of a distance measurement area, and the flow advances to step S207. If the mode button 207 is depressed, the track ball 210 is used in another mode, and the flow advances to step S206. In step S206, the operation of the track ball 210 is detected in another mode except the distance area selection mode. The mode candidate is a photometric mode or an exposure mode, but a detailed description thereof will be omitted.

In step S207, rotation of the track ball 210 is determined by determining the presence/absence of outputs from the photocouplers 243A and 243B. In step S208 (this processing will be described later with reference to FIGS. 20 and 21), the rotational direction and rotation amount of the track ball 210 are calculated from horizontal and vertical vector components obtained by the photocouplers 243A and 243B described with reference to FIGS. 15 and 16. In step S209, a display of a new distance measurement area on the display 205, i.e., an ON segment in FIG. 14B is updated in accordance with the calculated direction and amount. In step S210, information about the selected distance measurement area is stored as new data in the memory circuit 258.

In step S211, a distance measurement signal from a distance measuring element 252 is received in the new distance measurement area, and a focus motor 254 is driven to focus an object. It is determined in step S212 whether the shutter button 203 or 204 is deeply depressed to the second stage and an exposure start instruction is generated. If the shutter button is not depressed, it is determined that an exposure operation is unnecessary, and the flow returns to step S202 to repeatedly execute the above processing. If the shutter button is depressed, the flow shifts to step S213 to execute a predetermined exposure sequence. In the exposure sequence, a stop 261 is first controlled to a predetermined value calculated in step S204, a shutter 260 is opened for a predetermined period of time in accordance with the value obtained in step S204, and then a film feed motor 262 is driven to wind the film by one frame. Thereafter, the flow returns to step S202 to prepare for the next exposure.

Figure 19:
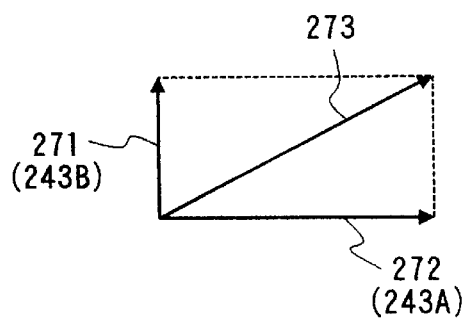
FIG. 19 is a view showing vectors.

FIG. 19 is a flow chart for explaining a vector processing routine (step S208) in FIG. 18 in detail.

A vector 272 representing a direction and an amount is obtained by the photocoupler 243A for detecting a horizontal direction, and a vector 271 is obtained by the photocoupler 243B for detecting a vertical direction. A vector 273 corresponding to a diagonal can be obtained by a simple equation based on these vectors. This vector 273 represents the rotational direction and amount of the track ball 210.

Figure 20:
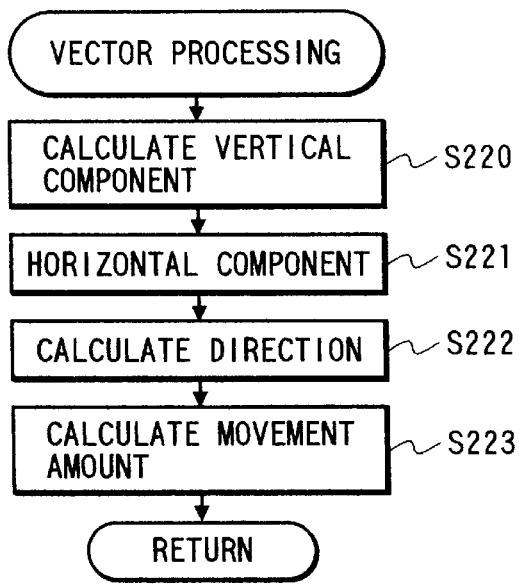
FIG. 20 is a flow chart showing vector processing.

FIG. 20 is a flow chart for explaining in detail a vector processing routine (step S208 in FIG. 18) in the second embodiment (FIG. 15). In step S220, a vertical component from the photocoupler 243B is obtained. In step S221, a horizontal component from the photocoupler 243A is obtained. In step S222, the designated direction of the track ball 210 is calculated from the two components. In step S223, a designated amount is calculated in the same manner.

Figure 21:
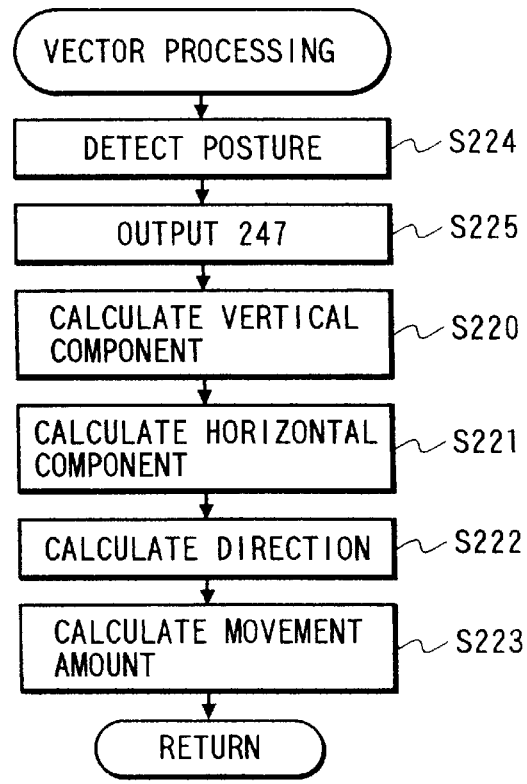
FIG. 21 is a flow chart showing vector processing.

FIG. 21 is a flow chart for explaining in detail a vector processing routine (step S208 in FIG. 18) in the third embodiment (FIG. 16). In step S224, the posture of the camera 201 is determined through the posture detection switch 209. In step S225, the control output 247 is output on the basis of the posture of the camera to determine the operations of the multipliers 246A and 246B. In step S220, a vertical component from the photocoupler 243B is obtained. In step S221, a horizontal component from the photocoupler 248A is obtained. In step S222, the designated direction of the track ball 210 is calculated from the two components. In step S223, a designated amount is calculated in the same manner.

According to the second to fourth embodiments described above, there can be provided an operation member, free from any obstacle, for selection or designation within the movable range of the tip of a finger with an operation member such as a track ball. More specifically, these embodiments solve the problem of performing an operation again due to a narrow vertical movable range of the thumb, or the problem of carefully performing an operation because the horizontal movable range is wide and the operation becomes oversensitive. Further, there can be provided an operation member capable of freely coping with changes in the relationship of the camera with the track ball in the horizontal and vertical directions when the photographic posture of the camera is changed.

Note that in the second to fourth embodiments, the thumb has been exemplified. According to the technical idea of the present invention, the present invention can be applied to an operation member (information setting apparatus) which can be operated with another finger such as the index finger or the palm.

Figure 22A:
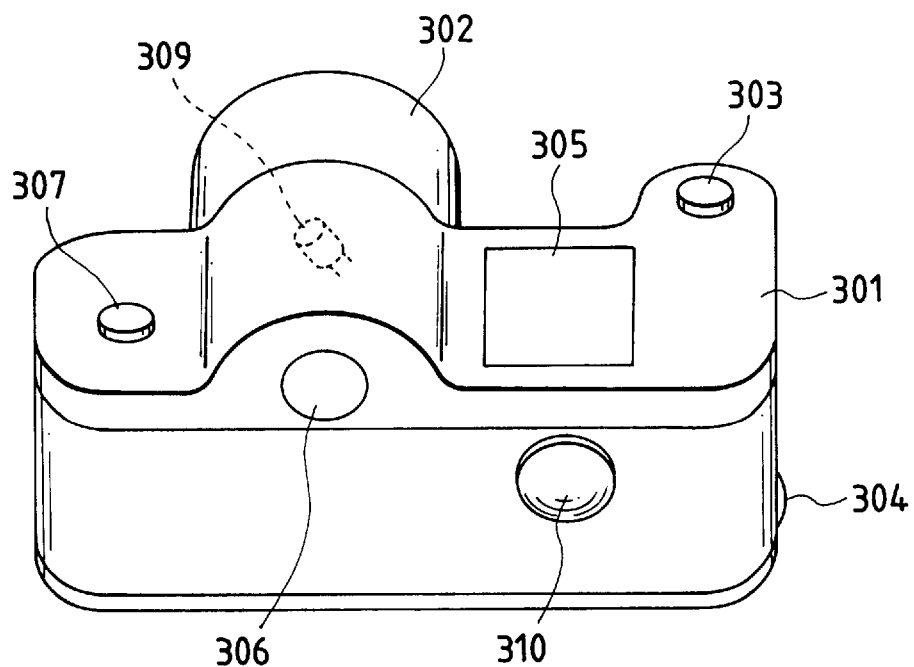
FIG. 22A is a perspective view showing the outer appearance of a camera according to the fifth embodiment of the present invention.

FIG. 22A is a perspective view showing a camera according to the fifth embodiment of the present invention. Referring to FIG. 22A, an object image passing through a lens 302 mounted on a camera 301 can be visually checked through a finder 306. Various exposure conditions can be visually checked on a display 305. The display 305 may be arranged inside the finder 306.

Figure 22B:
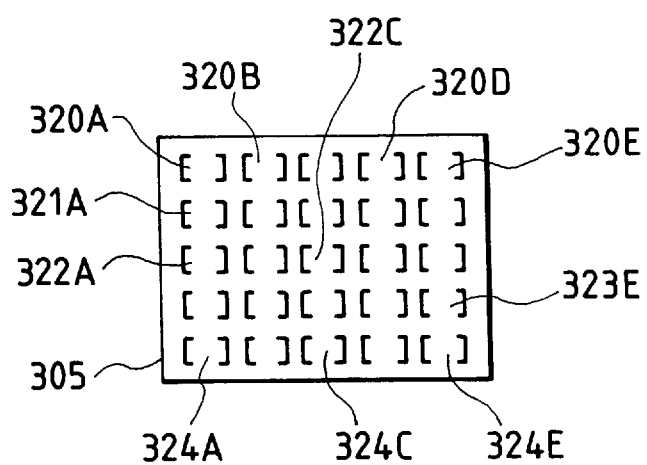
FIG. 22B is a view showing a display example of the distance measurement areas of the display.

FIG. 22B shows 25 distance measurement areas 320A to 320E, 321A to 321E, 322A to 322E, 323A to 323E, and 324A to 324E displayed on the display 305.

Power supply to a circuit in the camera 301 and exposure to a loaded film are started upon depression of a shutter button 303 to the first and second stages, respectively. Another shutter button 304 is used when the camera 301 is held at the vertical position, and its function is identical to that of the shutter button 303. A track ball 310 according to the present invention is disposed on the rear surface of the camera 301.

When a user holds the camera 301, the thumb of the right hand (not shown) is naturally placed on the track ball 310. As will be described later, when the user applies a rotation force to the track ball 310 in the upper, lower, left, or right direction while observing the display 305, he can perform various selection and change operations. The track ball 310 is normally used to select a distance measurement area. When a mode button 307 on the left side of the camera 301 is depressed, the track ball 310 is used to select and set elements associated with other modes. A posture sensor 309 is arranged inside the camera 301. The posture of the camera 301 held by the user can be detected.

FIG. 23 shows the peripheral mechanism and the electrical circuit block of the track ball 310. Two rollers 340A and 340B are in contact with the side surfaces of the track ball 310. The rollers 340A and 340B are interlocked with rotation of the track ball 310 in a vertical direction 311 and rotation of the track ball 310 in a horizontal direction 312 (in directions 314 and 313 in photography at a vertical position), respectively. Needless to say, rotation in an oblique direction (a direction between the directions 311 (314) and 312 (313)) is shared and transmitted to the rollers 340A and 340B. Sectors 345A and 345B are fixed to one-side portions of the rollers 340A and 340B and are rotated interlocked with the track ball 310 together with the rollers 340A and 340B. Slits are formed at the same pitch on the peripheral portions of the sectors 345A and 345B. Photocouplers 343A and 343B arranged near the sectors 343A and 343B detect light passing through the slits.

The photocouplers 343A and 343B generate pulses representing the number of slits through which light passes, i.e., the rotation amount of the track ball 310, and a slit passing direction, i.e., the rotational direction of the track ball 310. These pulses are input to a CPU 357 (to be described later) and are detected as the rotational direction and rotation amount of the track ball 310.

In the electrical circuit block located in the lower portion of FIG. 23, control operations are performed by the CPU 357. The CPU 357 performs input and control of information (to be described later) through interface circuits 356 and 359. In addition to this, the CPU 357 performs the following control operation.

The CPU 357 reads a posture signal from the posture detection switch 309 through the interface circuit 356. The CPU 357 receives an object brightness signal from a photometric sensor 350. The CPU 357 receives a signal associated with the in-focus state of an object from a distance measuring sensor 352. The CPU 357 also receives the film speed of a loaded film from a film speed detector 353. The object image is input to the photometric element 350 and the distance measuring element 352 through a lens optical system 351. The in-focus state of the lens optical system 351 is controlled by a focus motor 354. The CPU 357 receives signals from a plurality of switches of a switch group 355 which represent the sequence states of the camera 301. The display 305 is driven through the interface circuit 359 to display distance measurement areas (to be described later) and exposure conditions. A shutter 360 is opened/closed to control the exposure time of the film. The opening amount of a stop 361 is controlled to control the object light amount reaching the film. A film feed motor 362 is driven to control winding or rewinding of the film.

Figure 24:
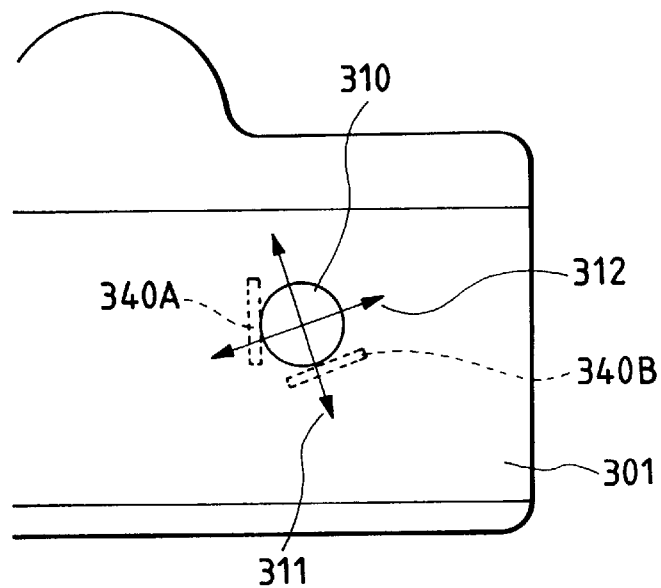
FIG. 24 is a rear view showing a modification of the fifth embodiment of the present invention.

FIG. 24 shows the fifth embodiment in which some of the above-described problems are solved by a mechanical structure and some are electrically corrected. The arrangement of the roller 340A (roller for detecting an operation in the horizontal direction with respect to a camera) described with reference to FIG. 23 is not changed, and only the roller 340B (roller for detecting an operation in the horizontal direction with respect to the camera) is inclined to come into contact with a track ball 310.

In this case, information about movement in a horizontal direction 312 detected by the roller 340B is directly used for processing of a CPU. However, information about movement in the vertical direction detected by the roller 340A is not directly used but is electrically processed.

In this electrical processing, the inclination amount of the roller 340B with respect to the outer shape of the camera is stored in advance in the memory of the CPU, and information obtained from the roller 340A is corrected on the basis of the stored inclination amount in processing information.

With this processing, even when the two rollers cannot be mechanically inclined due to a limitation of the internal structure/arrangement of the camera, the same effect as that obtained by inclining the two rollers can be attained by mechanically inclining only one roller.

For some operators, it is easy to operate the track ball 310 in a horizontal direction along an arrow 312 but it is difficult to operate the track ball 310 in a vertical direction along an arrow 311 depending on operator's habits and the like. The operator may easily operate the track ball 310 in the longitudinal arrangement direction of the roller 340A. In such a case, it is desirable that no electrical processing described above (i.e., the inclination amount of the roller 340B is used as a correction amount in processing information from the roller 340A) be performed and information about movement in the vertical direction detected by the roller 340A be directly used, so the electrical correction processing is not performed. In this case, a correction switch or the like is provided to select whether the electrical correction processing is performed. Note that the inclination angle of the roller 340B is set to an angle which solves the above-described problems most effectively from the statistical viewpoint.

As described above, according to this embodiment, when the rollers 340A and 340B are arranged, they need not be arranged perpendicularly to each other. The position can be corrected by electrical processing regardless of the arrangement, as needed.

Figure 25:
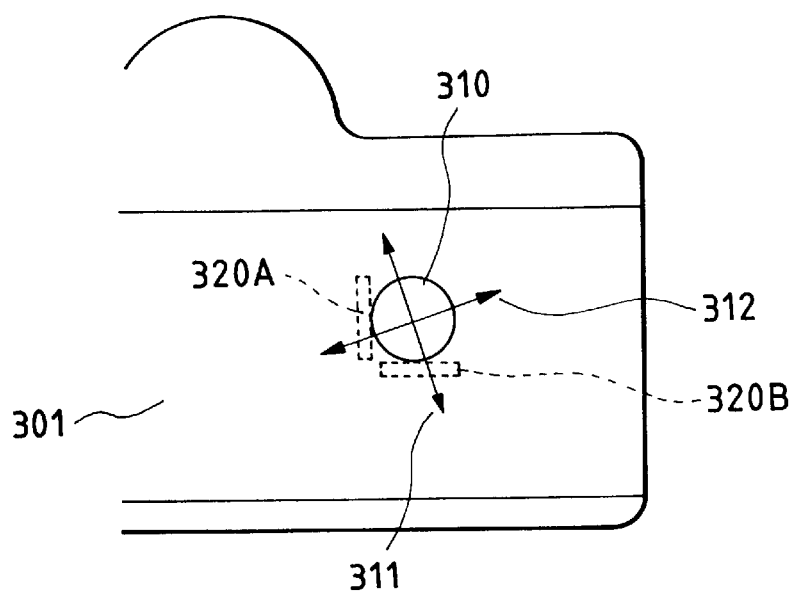
FIG. 25 is a rear view showing the sixth embodiment of the present invention.
Figure 26:
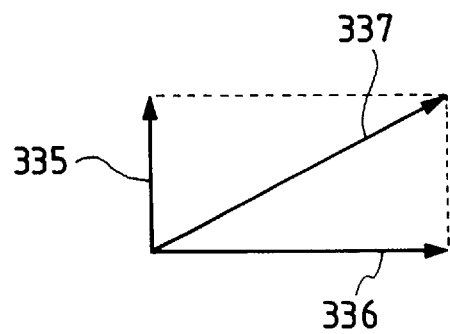
FIG. 26 is a view showing vectors.

FIGS. 25 and 26 are a rear view and a view showing vectors for explaining the sixth embodiment which electrically solves the above-described problems. In this embodiment, an inclination relationship between the operation direction and a camera is also electrically corrected with respect to a photographic posture. As shown in FIG. 25, rollers 320A and 320B may be set along the outer shape of a camera 301 because the camera 301 is implemented to correct an angle defined by vertical and horizontal rotational directions 311 and 312 of a track ball 310, as will be described later.

FIG. 26 is a conceptual view in which the rotational direction of the track ball 310 and the rotational directions of the rollers 320A and 320B are represented as vectors when the track ball 310 is operated in a right direction. As shown in FIG. 26, a vector 337 representing the rotational direction and rotation amount of the track ball 310 is divided into a horizontal vector component 336 by the roller 320B and a vertical vector component 335 by the roller 320A, which are input to a CPU 357. The CPU 357 calculates backward the vector 337 on the basis of these vectors 335 and 336. The vector 337 is assumed to have the same angle as that in the horizontal direction 312 in FIG. 25. In processing of the CPU 357, of the input horizontal and vertical components 336 and 335, only the horizontal vector component 336 is extracted, thereby correcting the vector 337 in the horizontal direction with respect to the camera 301. This calculation is almost equivalent to rotation of the vector 337 clockwise.

As a result, vertical and horizontal directions 311 and 312 are transmitted to the CPU 357 as the operation amount of the outer shape of the camera 301 in the vertical and horizontal directions. Therefore, the above-mentioned problems can be solved.

Figure 27:
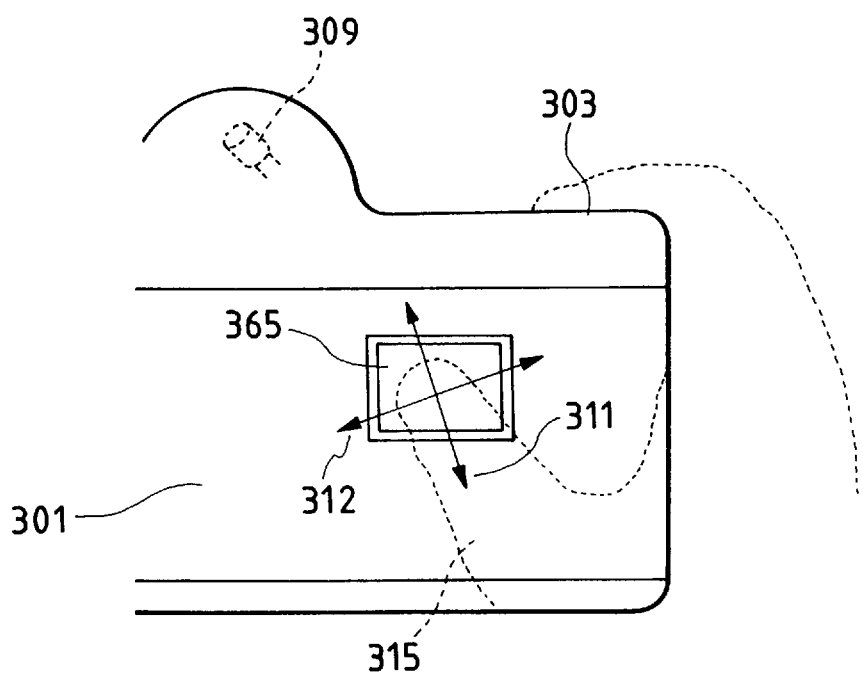
FIG. 27 is a rear view showing the seventh embodiment of the present invention.

FIG. 27 is a rear view showing a camera 301 (seventh embodiment) using a scheme for detecting a designated direction by bringing the tip of a finger into contact with the surface of a touch panel 365, in place of the use of a track ball 310. The touch panel 365 can employ a switch scheme for mechanically detecting depression of a finger and a scheme for detecting the touch of a finger by electrostatic induction. In either case, the operation direction of a user is inclined with respect to the outer shape of the camera 301, as indicated by arrows 311 and 312 in FIG. 27. For this reason, the same problems may occur as those in the above-mentioned case using the track ball as an operation member. However, also in the camera 301 employing the touch panel 365, vertical and horizontal directions 311 and 312 are transmitted to a CPU 357 as the operation amount of the outer shape of the camera 301 in the vertical and horizontal directions by executing the calculation described with reference to FIGS. 25 and 26. Therefore, the above-mentioned problems can be solved.

Figure 28:
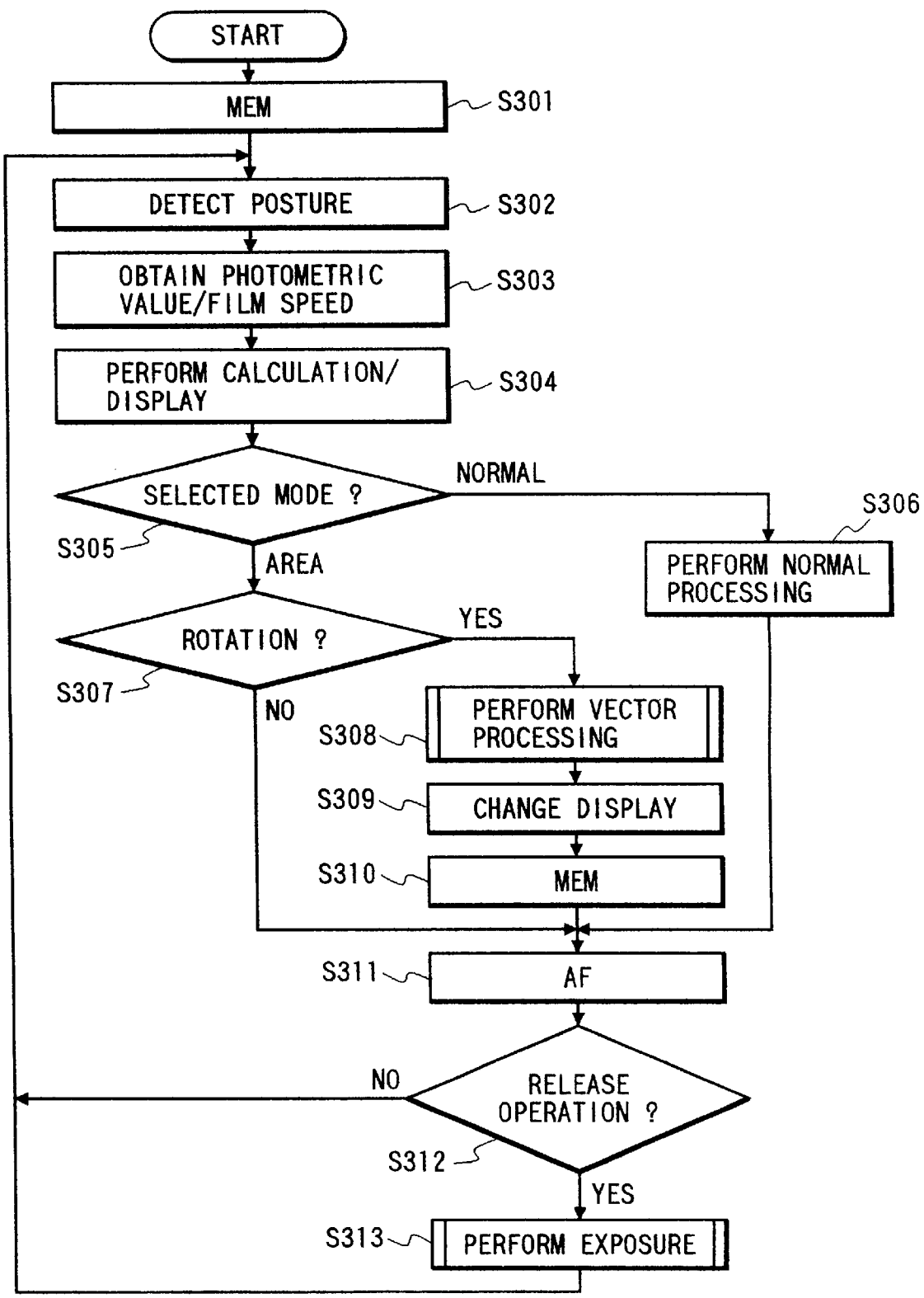
FIG. 28 is a flow chart showing an information setting operation.

FIG. 28 is a processing program mainly executed by the CPU 357 in the camera 301. This processing is started when a battery (not shown) is connected and a power switch is turned on upon depression of a shutter button 303 to the first stage. This processing is repeated until power supply continues by a power supply timer (not shown) or the like.

In step S301, previously set conditions are read out from a memory circuit 358. The set conditions are mainly those displayed on a display 305. In step S302, the posture of the camera 301 is determined through a posture detection switch 309. In step S303, an object brightness signal and a film speed signal are received from a photometric sensor 350 and a film speed detector 353. In step S304, the received signals are calculated on the basis of the various conditions read out in step S303, thereby calculating an optimal exposure condition. A shutter time and an F-number are then determined. The results are displayed on the display 305. An element corresponding to the posture of the camera 301 read through the posture switch 309 in step S302 is also added in this calculation.

In step S305, it is determined whether a mode button 307 is depressed. If the mode button 307 is not depressed, the track ball 310 is used for selection of a distance measurement area, and the flow advances to step S307. If the mode button 307 is depressed, the track ball 310 is used in another mode, and the flow advances to step S306. In step S306, the operation of the track ball 310 is detected in another mode except the distance area selection mode. The mode candidate is a photometric mode or an exposure mode, but a detailed description thereof will be omitted.

In step S307, rotation of the track ball 310 is determined by determining the presence/absence of outputs from photocouplers 343A and 343B. In step S308 (this processing will be described later with reference to FIG. 26), the rotational direction and rotation amount of the track ball 310 are calculated from horizontal and vertical vector components obtained by the photocouplers 343A and 343B described with reference to FIGS. 23 and 24. In step S309, a display of a new distance measurement area on the display 305, i.e., an ON segment in FIG. 14B is updated in accordance with the calculated direction and amount. In step S310, information about the selected distance measurement area is stored as new data in the memory circuit 358.

In step S311, a distance measurement signal from a distance measuring element 352 is received in the new distance measurement area, and a focus motor 354 is driven to focus an object. It is determined in step S312 whether the shutter button 303 or 304 is deeply depressed to the second stage and an exposure start instruction is generated. If the shutter button is not depressed, it is determined that an exposure operation is unnecessary, and the flow returns to step S302 to repeatedly execute the above processing. If the shutter button is depressed, the flow shifts to step S313 to execute a predetermined exposure sequence. In the exposure sequence, a stop 361 is first controlled to a predetermined value calculated in step S304, a shutter 360 is opened for a predetermined period of time in accordance with the value obtained in step S304, and then a film feed motor 362 is driven to wind the film by one frame. Thereafter, the flow returns to step S302 to prepare for the next exposure.

Figure 29:
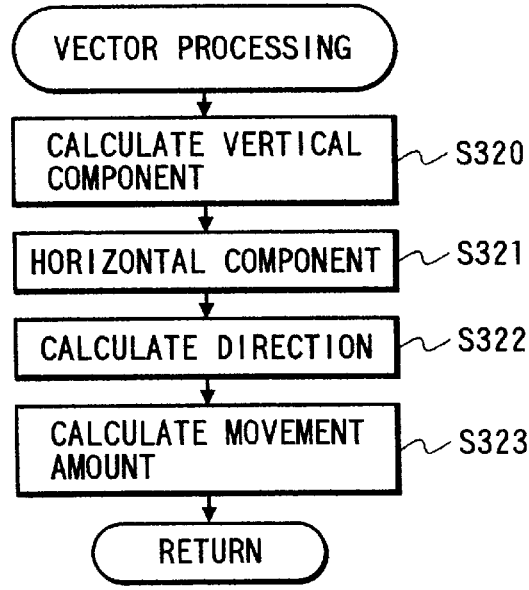
FIG. 29 is a flow chart showing vector processing.

FIG. 29 is a flow chart for explaining in detail a vector processing routine (step S308 in FIG. 28) in the fifth embodiment shown in FIG. 24. In the above embodiment, since part of the inclination is mechanically corrected and part thereof is electrically corrected, processing is relatively simple as follows.

In step S320, a horizontal component from the photocoupler 343B is obtained. In step S321, an output from the photocoupler 343A is obtained. The output from the photocoupler 343A is corrected on the basis of the inclination amount of the roller 340B stored in a memory (not shown), thereby obtaining a vertical component. Note that when a correction switch (not shown) is OFF, this correction is not performed, and the output from the photocoupler 343A is used as a vertical component. In step S322, the designated direction of the track ball 310 is calculated from the two components. In step S323, a designated amount is calculated in the same manner.

Figure 30:
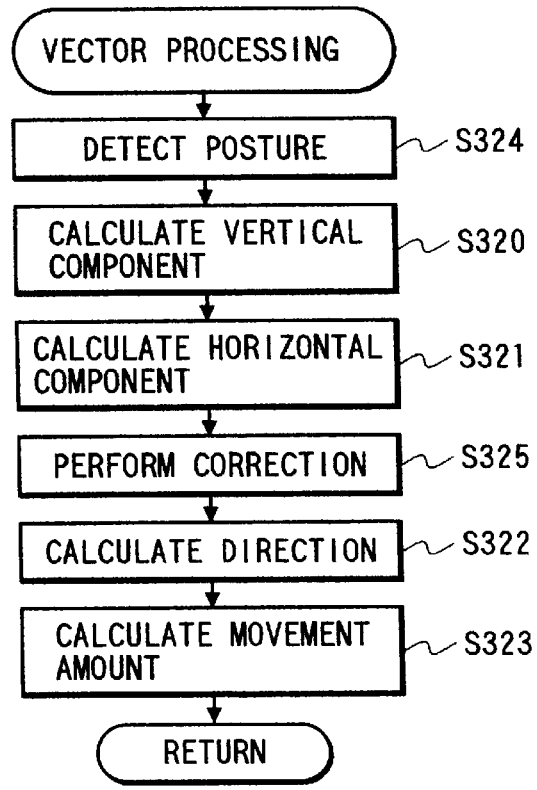
FIG. 30 is a flow chart showing vector processing.

FIG. 30 is a flow chart for explaining in detail a vector processing routine (step S308 in FIG. 28) in the sixth embodiment shown in FIG. 25.

As described above with reference to FIG. 26, the posture of the camera 301 is determined through the posture detection switch 309 in step S324. In step S320, a vertical component from the photocoupler 343B is obtained. In step S321, a horizontal component from the photocoupler 343A is obtained. In step S325, a predetermined value is subtracted from the vertical and horizontal components obtained in steps S320 and S321 on the basis of the posture of the camera 301 determined in step S324. In step S322, the designated direction of the track ball 310 is calculated from the two components obtained in step S325. In step S323, a designated amount is calculated in the same manner.

Figure 31A:
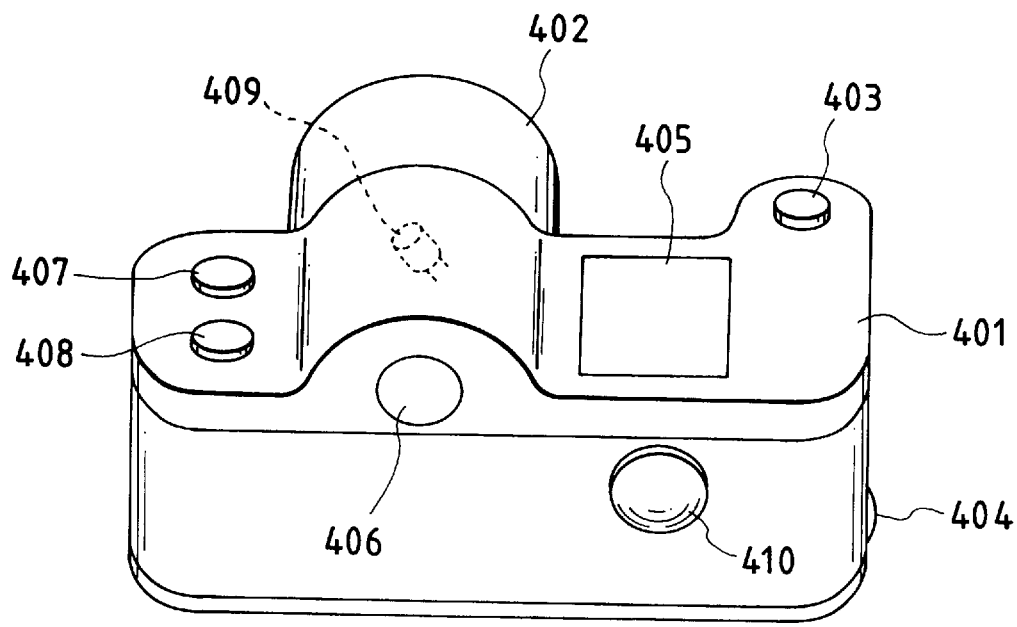
FIG. 31A is a perspective view showing the outer appearance of a camera according to the eighth embodiment of the present invention.

FIG. 31A is a perspective view showing the outer appearance of a camera according to the eighth embodiment of the present invention. Referring to FIG. 31A, a lens 402 is mounted on the front surface (rear side in FIG. 31A) of a camera 401 at the normal horizontal position. A finder 406 is arranged on the rear surface (front side in FIG. 31A) of the camera 401. A user can visually check through the finder 406 an object image passing through the lens 402.

Figure 31B:
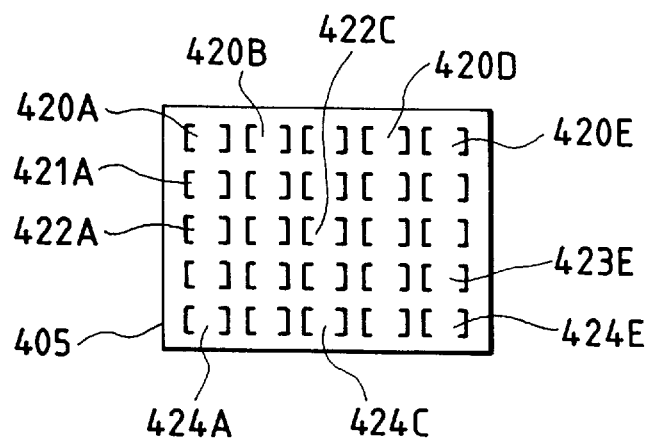
FIG. 31B is a view showing a display example of the distance measurement areas of the display.

A display 405 is arranged on the right side of the upper surface of the camera 401 when viewed from the rear side. This display 405 may be arranged in the finder 406. The set contents of various modes of exposure, photometry, distance measurement, and the like can be visually checked on the display 405. FIG. 31B shows 25 distance measurement areas 420A to 420E, 421A to 421E, 422A to 422E, 423A to 423E, and 424A to 424E displayed on the display 405 in the distance measurement mode.

A shutter button 403 is disposed at a portion extending toward the lower sheet surface in FIG. 31A and located on the right side of the upper surface of the camera 401 when viewed from the rear side. Another shutter button 404 is disposed on the side portion of the extended portion. This shutter button is used when the camera 401 is held at the vertical position.

As is known well, in the operations of the shutter buttons 403 and 404, the internal circuit is powered on upon half depression to the first stage and exposure to a loaded film is performed upon full depression to the second stage.

A track ball 410 serving as one operation unit of the present invention is disposed on the rear surface (front side in FIG. 31A) of the camera 401. The track ball 410 is disposed such that the tip of the thumb of the right hand is naturally placed when the camera 401 is supported and held with the right hand. In the eighth embodiment, the track ball 410 is used to select a distance measurement area, obtain an operation locus in a calibration mode, and select and set elements such as a shutter time and an F-number for the exposure mode.

A mode switch 407 and a calibration button 408 are disposed on the left side of the upper surface of the camera 401 when viewed from the rear side. Although not shown, a change button is also disposed. In this embodiment, the mode switch 407 is used for switching the current mode between the distance measurement mode and the exposure mode. The change button is used for changing a shutter time value, an F-number, or the like in the exposure mode.

The calibration button 408 is used to set the camera in the calibration mode. In the calibration mode, the operational habits of a photographer with respect to the track ball 410 are read, and various data are stored to allow correction of the habits in an actual operation.

A posture sensor 409 is arranged in the camera body to detect the posture of the camera 401 when the camera 401 is held. The posture sensor 409 is provided to reflect the posture of the camera 401 on data obtained in the calibration mode because its posture influences correction of the operational habits of the photographer.

FIG. 32 is a view showing the arrangement of the camera according to the eighth embodiment of the present invention. Referring to the upper portion of FIG. 32, two rollers 440A and 440B are arranged around the track ball 410 with their one-end portions being in contact with the side surfaces of the track ball 410.

That is, when the track ball 410 is rotated in vertical and horizontal directions 411 and 412 (in directions 413 and 414 in photography at a vertical position), the two rollers 440A and 440B are rotated together with the track ball 410. Needless to say, rotation in an oblique direction is shared and transmitted to the two rollers 440A and 440B.

Disk-like sectors 445A and 445B are fixed to the other-end portions of the rollers 440A and 440B, respectively. Slits are formed on the outer surfaces of the sectors 445A and 445B in the radial direction at the same pitch, as shown in FIG. 32.

Photocouplers 443A and 443B are arranged at the peripheral edge portions of the disk-like sectors 445A and 445B, respectively. The photocouplers 443A and 443B generate pulses representing the number of slits through which light passes, i.e., the rotation amount of the track ball 410, and a slit passing direction, i.e., the rotational direction of the track ball 410.

These pulses are input to a central processing unit (to be referred to a CPU hereinafter) 457 through an interface circuit (to referred to as an INT hereinafter) 456 shown in the lower portion of FIG. 32, and are detected as the rotation amount and rotational direction of the track ball 410.

The CPU 457 in the lower portion of FIG. 32 is the main component for camera operation control, and executes input and control of information through the INT 456 and an INT 459. The CPU 457 directly exchanges data with a memory circuit (to be referred to as a MEM hereinafter) 458.

More specifically, the MEM 458 stores various data about the operation of the track ball 410 in the calibration mode and an actual operation.

As for the INTS 456 and 459, the output pulse signals from the above-described photocouplers 443A and 443B, and a posture signal from the posture sensor 409 are received through the INT 456.

An object image input to a photometric sensor 450 and a distance measuring sensor 452 through an optical system 451 including the lens 402 is received from the photometric sensor 450 and the distance measuring sensor 452 through the INT 456. A signal representing an in-focus state of the object is received from the distance measuring sensor 452. The film speed of the loaded film is received from a film speed detector 453 to drive a focus motor 454, thereby realizing an in-focus state.

Various signals representing the sequence states in the camera 401 are received from various switches of a switch group 455 through the INT 456.

The display 405 is driven through the INT 459 to display an exposure condition, a distance measurement condition, and the like. A shutter 460 is opened/closed to control the exposure time of the film. An opening amount of a stop 461 is controlled to control the object light amount reaching the film. A film feed motor 462 is driven to control winding and rewinding of the film.

FIGS. 33A, 33B, 33C, 33D, 33E, and 33F are views for explaining display examples and operation sequences in the calibration mode. The calibration mode according to the present invention is realized as follows. The calibration button 408 is depressed, the CPU 457 inhibits all the operations associated with exposure, and a calibration mode program is executed.

Figure 33A:
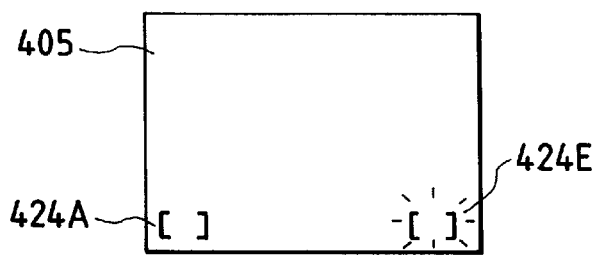
FIGS. 33A, 33B, 33C, 33D, 33E, and 33F are views for explaining display examples and operation sequences in a calibration mode.
Figure 33B:
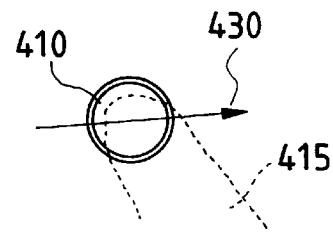
Figure 33C:
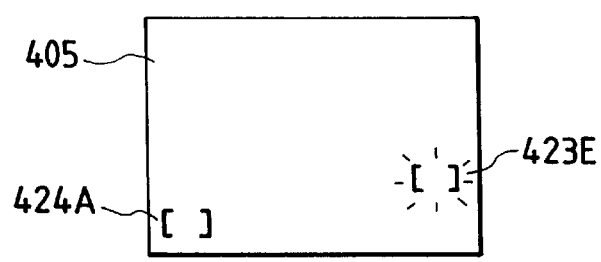
Figure 33D:
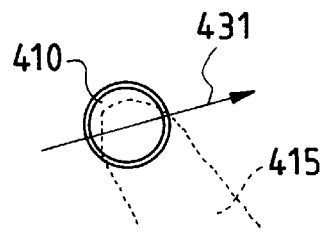
Figure 33E:
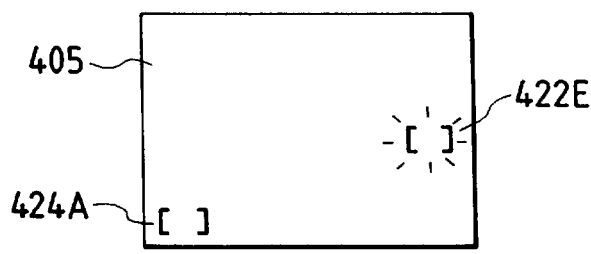
Figure 33F:
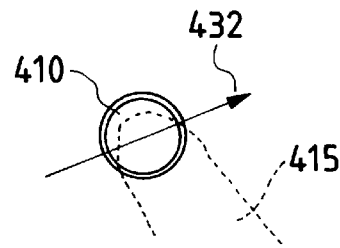

More specifically, the CPU 457 displays operation direction instructions on the display screen of the display 405, as shown in FIGS. 33A, 33C, and 33E, to cause the photographer to perform operations shown in FIGS. 33B, 33D, and 33F in accordance with the instruction display. The CPU 457 obtains the relationship between the "operation direction instructions" and the "rotation operation locus of the track ball 410" in accordance with the operational habits of the photographer and the posture of the camera 401. The CPU 457 then generates determination area data and stores it in the MEM 458. An operation in actual photography is corrected on the basis of the storage contents.

A method of obtaining detailed data will be described with reference to FIGS. 33A, 33B, 33C, 33D, 33E, and 33F. For the descriptive convenience, as the calibration mode display screen of the present invention, FIGS. 33A, 33B, 33C, 33D, 33E, and 33F show a case using the display screen of the distance measurement areas shown in FIG. 31B. Therefore, a description will be made using the same names as the distance measurement area 424A and the like.

FIG. 33A shows a case in which a distance measurement area 424A at the lower left corner is kept on as a start point, a distance measurement area 424E at the lower right corner is flickered as an end point, and an instruction is made for horizontal movement from the left to the right.

FIG. 33B shows a state in which the photographer rotates the track ball 410 with the tip of a thumb 415 in a right direction 430 in accordance with the operation instruction shown in FIG. 33A. The photographer rotates the track ball 410 to change the distance measurement area 424A to the distance measurement area 424E while observing the display on the display 405. This rotation operation is stored in the MEM 458 in association with the operation instruction in the form of an operation locus defined by horizontal and vertical vector components.

FIG. 33C shows the following case. The storage operation of the MEM 458 is completed. In order to obtain the next data, the distance measurement area 424A at the lower left corner is kept on as the start point, and a distance measurement area 423E immediately above the distance measurement area 424E at the lower right corner is flickered as the end point, and an instruction is made for left-to-right movement from the horizontal direction to a slightly upper right direction.

FIG. 33D shows a state in which the photographer rotates the track ball 410 with the tip of the thumb 415 in an upper right direction 431 in accordance with the operation instruction shown in FIG. 33C. The photographer rotates the track ball 410 to change the distance measurement area 424A to the distance measurement area 423E while observing the display on the display 405. This rotation operation is stored in the MEM 458 in association with the operation instruction in the form of an operation locus defined by horizontal and vertical vector components.

FIG. 33E shows the following case. The storage operation of the MEM 458 is completed. In order to obtain the next data, the distance measurement area 424A at the lower left corner is kept on as the start point, and the distance measurement area 422E at the lower right corner is flickered as the end point, and an instruction is made for left-to-right movement from the horizontal direction to a slightly upper right direction.

FIG. 33F shows a state in which the photographer rotates the track ball 410 with the tip of the thumb 415 in an upper right direction 432 in accordance with the operation instruction shown in FIG. 33E. The photographer rotates the track ball 410 to change the distance measurement area 424A to the distance measurement area 422E while observing the display on the display 405. This rotation operation is stored in the MEM 458 in association with the operation instruction in the form of an operation locus defined by horizontal and vertical vector components.

In the same manner as described above, the distance measurement area 424A at the lower left corner is kept on as the start point, operation loci in nine directions towards distance measurement areas 421E, 420E, 420D, 420C, 420B, and 420A as the end points are stored in the MEM 458, and all operation loci are obtained using a distance measurement area 424D and the distance measurement areas 420D and 420A as the start points. A total of 36 locus data are obtained. Note that locus data in the horizontal and vertical directions overlap, and the overlapping locus data are eliminated from the 36 locus data, thereby finally obtaining 32 locus data.

In addition, the camera 401 is held at the vertical position, and the same operations as described above are performed. The data at the vertical position and the data at the horizontal position are separately stored.

When the CPU 457 stores the locus data directly expressing the rotation operation directions including the photographer's habits as described above, processing shown in FIG. 34 is performed to obtain a boundary line for distinguishing originally required rotation operation directions from each other.

Figure 34:
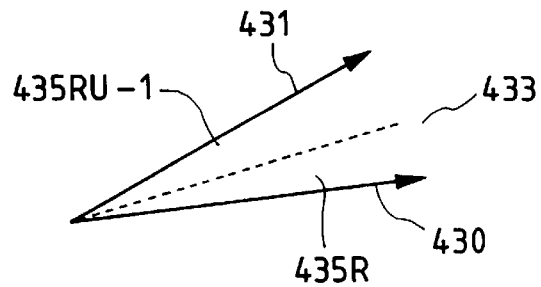
FIG. 34 is a conceptual view for boundary line calculation.

FIG. 34 is a conceptual view for boundary line calculation. In this case, a boundary line 433 is calculated on the basis of the operation loci in the rotation operation directions 430 and 431, which are obtained in the sequences in FIGS. 33A, 33B, 33C, 33D, 33E, and 33F.

The operation loci of the rotation operation directions 430 and 431 which are stored in the MEM 458 are separated into the horizontal and vertical components by the photocouplers 443A and 443B. The CPU 457 obtains the boundary line 433 by arithmetically averaging the center values of the horizontal and vertical components. In this manner, the adjacent operation loci are halved to obtain each boundary line.

In this case, the CPU 457 corrects the overlapping locus data in the horizontal and vertical directions. That is, as described above, a total of 36 locus data are obtained, but two locus data overlap in each of the horizontal and vertical directions.

More specifically, locus data of the distance measurement area 420A→420E and locus data of the distance measurement area 424A→424E, locus data of the distance measurement area 424A→420A and locus data of the distance measurement area 424E→420E, locus data of the distance measurement area 420E→420A and locus data of the distance measurement area 424E→424A, and locus data of the distance measurement area 420A→424A and locus data of the distance measurement area 420E→424E represent the same directions. Therefore, the CPU 457 averages these values to obtain average values.

By the above boundary line calculation processing, 32 boundary lines, i.e., boundary lines for dividing the total area into 32 areas are obtained. As shown in FIG. 34, a counterclockwise area of the boundary line 433 is defined as an area 435RU-1 and a clockwise area is defined as an area 435R, the relationship between the boundary lines and an area interposed therebetween is shown in FIG. 35.

Figure 35:
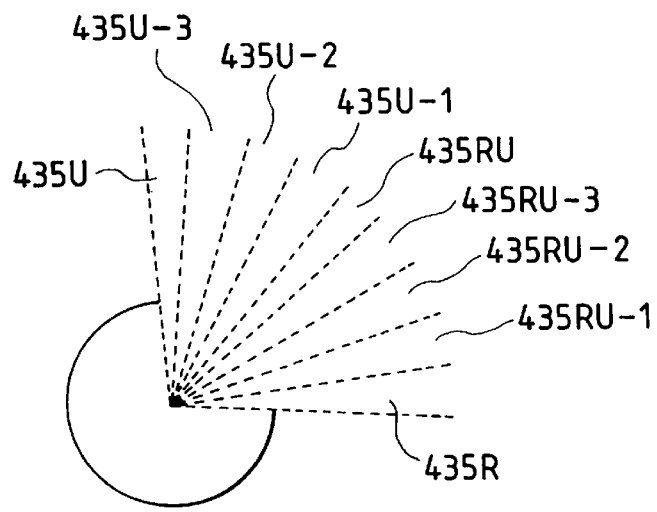
FIG. 35 is a view showing the relationship between boundary lines and areas therebetween.

FIG. 35 partially shows the boundary lines obtained as described above and areas interposed therebetween. When an actual rotational direction of the track ball 410 enters, e.g., the area 435R, the rotational direction is determined as the horizontal right direction. When the actual rotational direction enters an area 435U, this direction is determined as the vertical upper direction. When the actual rotational direction enters an area 435RU, this direction is determined as an upper right direction as the intermediate direction between the right and upper directions.

It should be noted that an upper right half area is divided into small areas having different sizes in FIG. 35 because the area division reflects the photographer's habits so as to follow signals input in accordance with the operation instructions described with reference to FIGS. 33A, 33B, 33C, 33D, 33E, and 33F.

An area division different from that in FIG. 35 is employed in photography at the vertical position of the camera. The area divisions are switched in accordance with a signal from a posture sensor 409.

Figure 36:
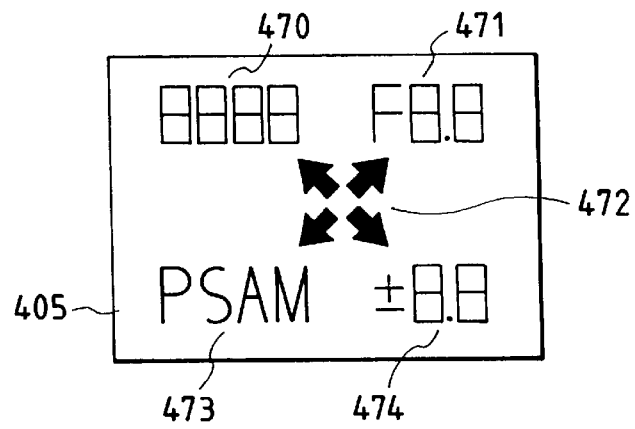
FIG. 36 is a view showing a display example of exposure conditions on the display.

An example for changing the exposure conditions with the operations of the track ball 410 will be described with reference to FIG. 36 and FIGS. 37A, 37B, 37C, and 37D. FIG. 36 shows a display example associated with exposure conditions on a display. FIG. 36 is a view for explaining a display example and an operation sequence in a change mode.

Referring to FIG. 36, a shutter time segment 470, an F-number segment 471, an exposure mode segment 473, and an exposure correction value segment 474 are arranged in the peripheral portion on the display screen of the display 405. An instruction segment 472 for designating one of the four peripheral segments which serves as a change target is arranged at the center of the display screen.

The exposure mode segment 473 displays one of P, S, A, and M. P represents a program priority exposure mode; S, a shutter priority exposure mode; A, an aperture priority exposure mode; and M, a manual exposure mode.

Figure 37A:
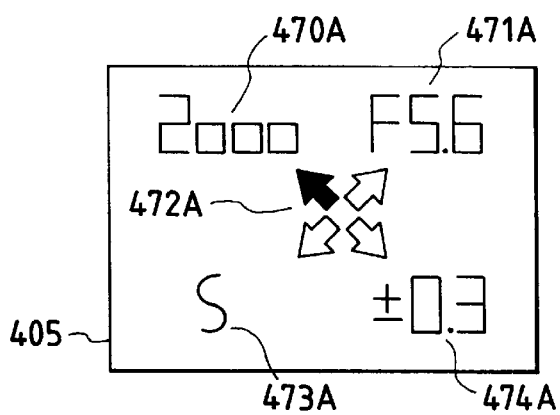
FIGS. 37A, 37B, 37C, and 37D are views for explaining display examples and operation sequences in a change mode.

FIG. 37A shows a state display example in which the contents of the shutter priority mode S can be changed. The segment 470 represents a shutter time of 1/2000 as a segment 470A, the segment 471 represents an F-number of F5.6 as a segment 471A, the segment 473 represents the shutter priority mode S as a segment 473A, the segment 474 represents an exposure correction value of ±0.3 as a segment 474A, and the segment 472 represents a segment 470A as a segment 472A, indicating that a shutter time can be changed.

Figure 37B:
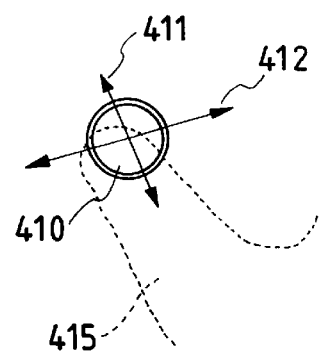

FIG. 37B is a view for explaining a mode change operation. When the track ball 410 is rotated in the illustrated vertical direction 411 and the illustrated horizontal direction 412, the designation direction of the segment 472 is changed to four directions accordingly. The value of an element designated by the segment 472 can be changed. The rotation operation direction of the track ball 410 perceptually coincides with the changed designation direction of the segment 472, which is an effect of the above-mentioned calibration processing. FIG. 37A shows a state in which the shutter time value can be changed, as described above. As shown in FIG. 37A, in the shutter priority mode S, the F-number is automatically decided. To prevent contradiction, the display for causing the segment 472A to designate the segment 471A should be disabled. Therefore, designation of the segment 471A upon rotation of the track ball 410 is disabled, and this operation is automatically skipped.

Figure 37C:
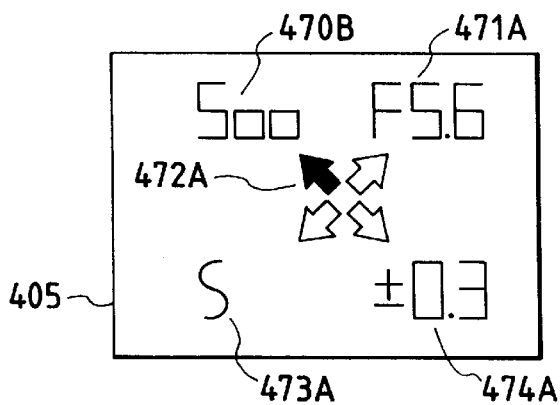
Figure 37D:
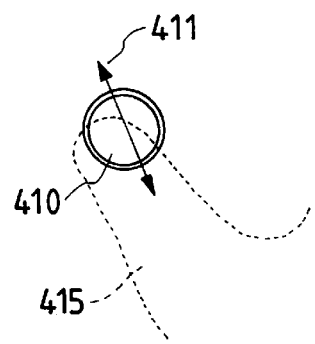

FIG. 37C shows a display example in which the contents of the shutter priority mode S are changed. FIG. 37D is a view for explaining an operation for changing the contents of the shutter time S. As described above, if the segment 472A designates the segment 470B serving as the segment 470 representing the shutter time to change a shutter time, the track ball 410 is rotated in the vertical direction 411, as shown in FIG. 37D while depressing a change button (not shown), thereby changing the shutter time value. FIG. 37C shows a state in which the shutter time has been changed to 1/500, as indicated by the segment 470B.

In this shutter time change mode, a change is interlocked with only rotation of the track ball 410 in the vertical direction 411. The rotational direction of the track ball 410 need not be the strict vertical direction. The rotational direction may include right areas 435U-1, 435U-2, and 435U-3 of the uppermost area 435U in FIG. 35, thereby coping with a rough operation of the photographer.

To change an exposure mode value, an F-number, an exposure correction value, or the like, the track ball 410 is simply rotated toward the corresponding segment. A change in value of each element perceptually coincides with the rotation operation direction of the track ball 410, thereby improving operability.

Figure 38:
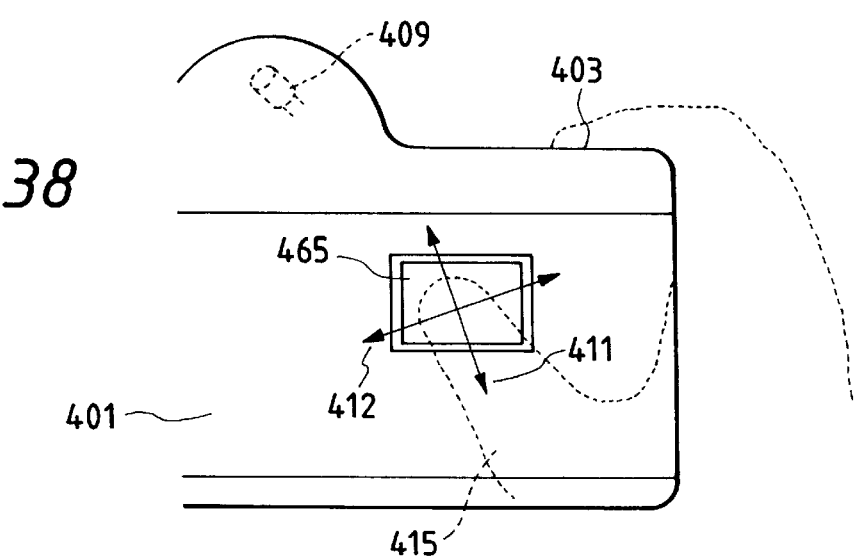
FIG. 38 is a view showing the outer appearance of a camera according to the ninth embodiment of the present invention.

FIG. 38 is a view showing the outer appearance of a camera according to the ninth embodiment of the present invention. A camera 401 according to the ninth embodiment employs a touch panel 465 in place of the track ball 410. A designated direction can be detected by moving the tip of a finger in vertical and horizontal directions 411 and 412 while bringing the tip of the finger into contact with the surface of the touch panel 465.

A designated direction detection scheme of the touch panel 465 includes a switch scheme for mechanically detecting depression of a finger and a scheme for detecting the touch of a finger by electrostatic induction. In either case, the vertical and horizontal directions 411 and 412 are inclined with respect to the outer shape of the camera 401, as shown in FIG. 38, and the degrees of inclination vary due to individual differences.

The above-described manual operation correction scheme of the present invention can also be applied to the camera 401 employing the touch panel 465, and the same effect can be obtained.

Figure 39:
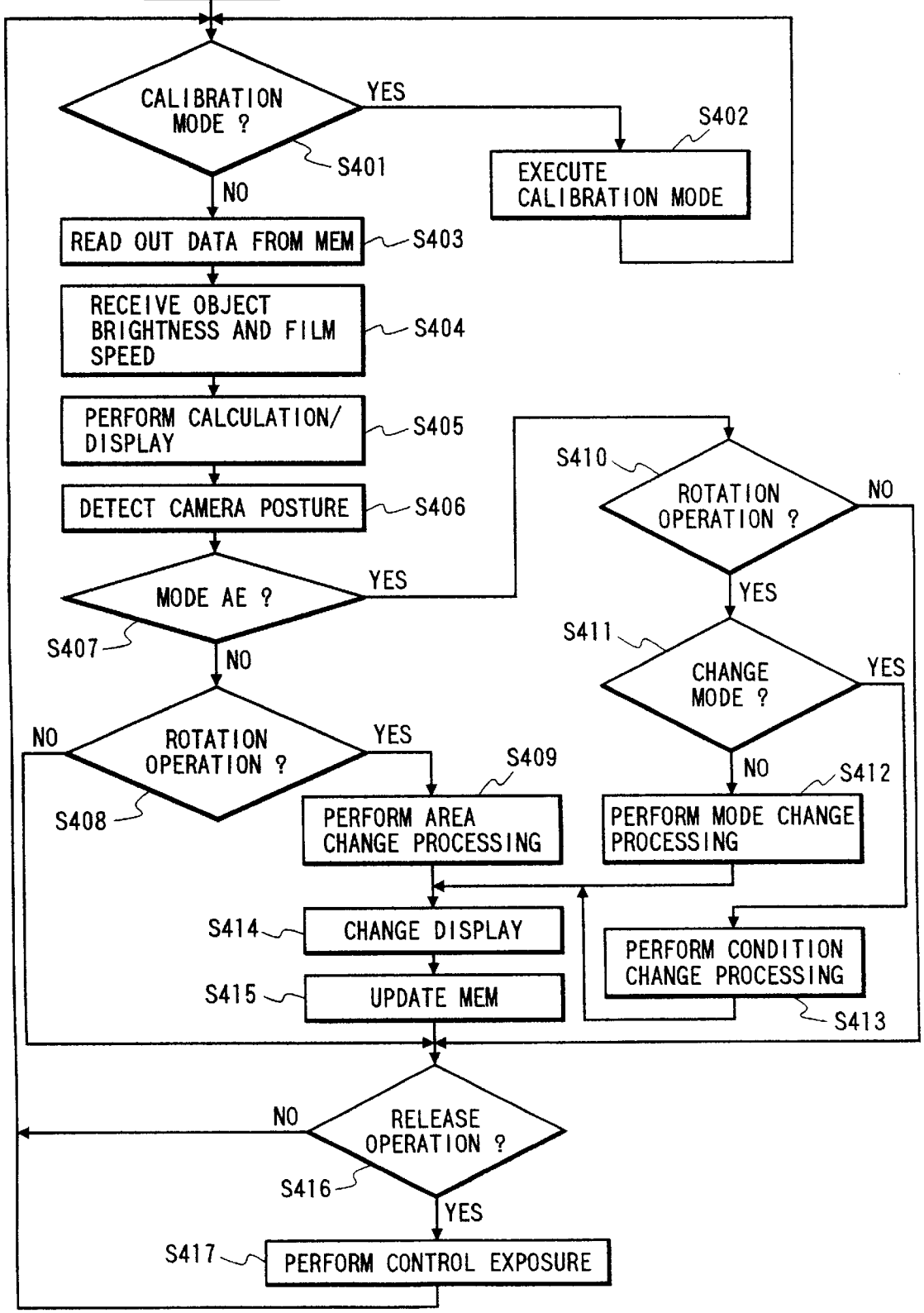
FIG. 39 is a flow chart showing a manual operation correction operation.
Figure 40:
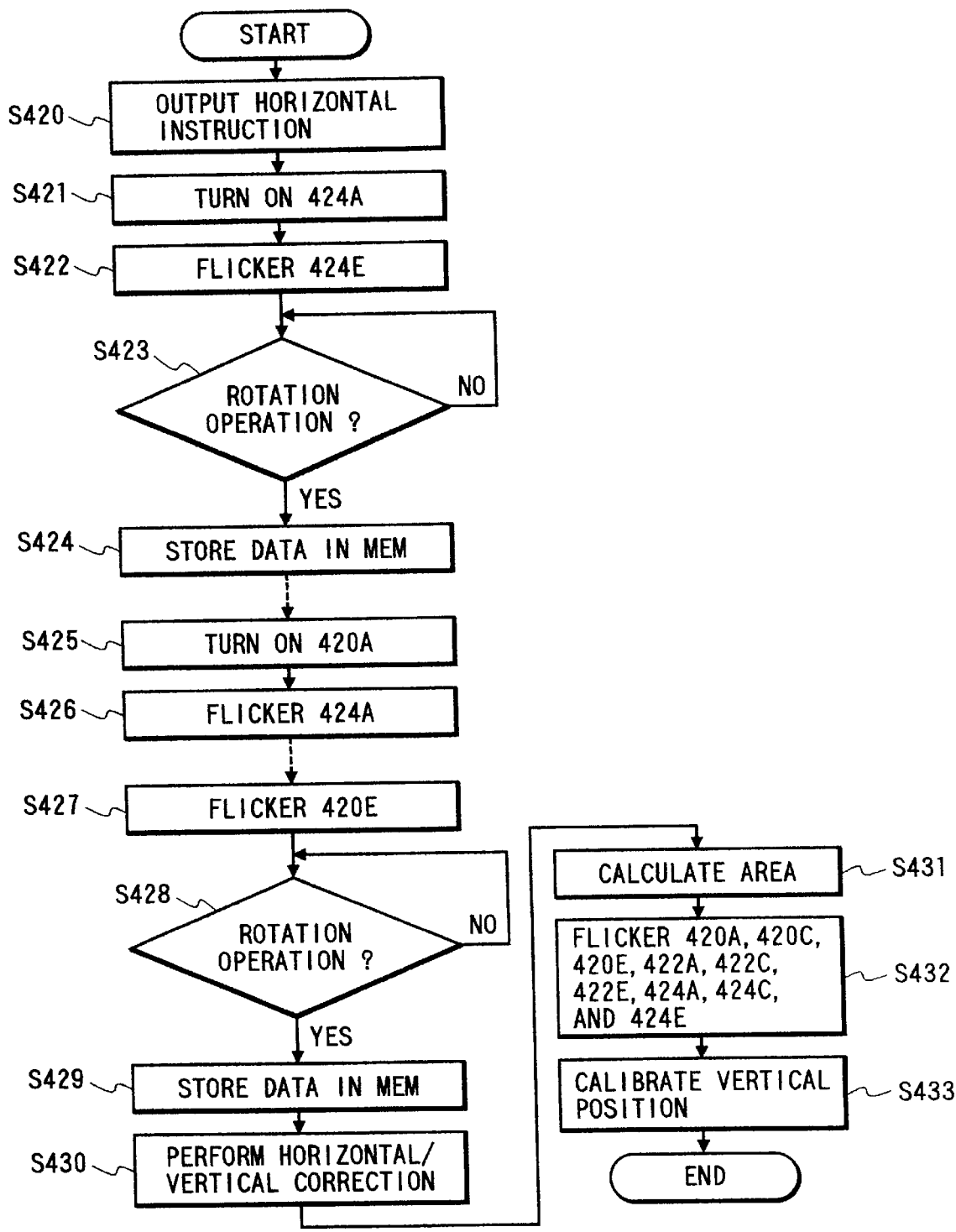
FIG. 40 is a flow chart showing an operation in the calibration mode.

The operation of the above-mentioned manual operation correction scheme of the present invention will be described below with reference to FIGS. 39 and 40. FIG. 39 is a flow chart showing an operation according to this embodiment of the present invention. FIG. 40 is a flow chart showing an operation in the calibration mode.

Processing shown in FIG. 39 is started when a battery is connected and a power switch is turned on upon depression of a shutter button 403 (404) to the first stage. This processing is repeatedly executed while power supply continues by a power supply timer or the like.

Referring to FIG. 39, it is determined in step S401 whether a calibration button 408 is operated to designate the calibration mode. If the calibration button 408 is operated, determination becomes affirmative (YES). In step S402, calibration mode processing is executed, and the flow returns to step S401. The calibration mode processing in step S402 will be described later (FIG. 40).

If the calibration button 408 is not operated in step S401, determination becomes negative (NO), and the flow advances to step S403. Previously set various conditions such as set conditions previously displayed on a display 405 are read out from a MEM 458, and the flow advances to step S404.

In step S404, an object brightness signal and a film speed signal are received from a photometric sensor 450 and a film speed detector 453, respectively, and the flow advances to step S405.

In step S405, the object brightness signal and the film speed signal received in step S404 are calculated on the basis of the various conditions read out in step S403, thereby calculating an optimal exposure condition. A shutter time and an F-number are then determined. The results are displayed on the display 405, and the flow advances to step S406.

In step S406, the photographic posture of the camera 401 is determined by a posture sensor 409, and the flow advances to step S407. Note that this processing in step S406 may be performed prior to processing in step S405 to use the photographic posture of the camera 401 as a condition for exposure condition calculation.

In step S407, it is determined whether the switched state of a mode switch 407 is the AE mode (exposure mode) or the distance measurement mode. As described above, the display 405 has the display screen shown in FIG. 31B in the distance measurement mode, and the display screen shown in FIG. 36 in the exposure mode.

If the switched state is not the AE mode in step S407, i.e., it is the distance measurement mode, determination becomes negative (NO), and the flow advances to step S408. If the switched state is the AE mode, determination becomes affirmative (YES), and the flow advances to step S410.

In step S408, it is detected whether the track ball 410 is operated. If the track ball 410 is operated, determination becomes affirmative (YES). Respective processes in steps S409, S414, and S415 are performed, and the flow advances to step S416 to prepare for a release operation. To the contrary, if the track ball 410 is not operated, determination becomes negative (NO), and the flow directly advances to step S416 to prepare for a release operation.

The following processes are executed in steps S409, S414, and S415. That is, the rotation operation direction and amount of the track ball 410 are obtained and compared with area division (see FIG. 35) stored in the MEM 458 to derive an operation direction truly desired by the photographer (step S409). The display contents of the display 405 are changed in accordance with the result (step S414). The result is updated and stored in the MEM 458 (step S415).

If the switched state is determined to be the AE mode in step S407, it is detected in step S410 whether the track ball 410 is operated. If the track ball 410 is operated, determination becomes affirmative (YES), and it is determined in step S411 whether a change button (not shown) is depressed.

If the change button is not depressed, determination in step S411 becomes negative (NO), and mode change processing described with reference to FIGS. 37A and 37B is performed in step S412. If the change button is depressed, determination in step S411 becomes affirmative (YES), and condition change processing described with reference to FIGS. 37C and 37D is performed in step S413. The results of the respective processes in steps S412 and S413 are displayed and stored (steps S414 and S415) to prepare for a release operation (step S416).

If the track ball 410 is not operated in step S410, determination becomes negative (NO), and the flow directly advances to step S416 to prepare for a release operation.

In step S416, it is determined whether the shutter button 403 (404) is deeply depressed to the second stage and an exposure start instruction, i.e., a release instruction is generated. If the shutter button 403 (404) is not deeply depressed to the second stage, an exposure operation is unnecessary, and determination becomes negative (NO). The flow returns to step S401 to repeatedly execute the above-described processing.

If the shutter button 403 (404) is deeply depressed to the second stage in step S416, determination becomes affirmative (YES), and the flow advances to step S417 to execute a predetermined exposure sequence. More specifically, a stop 461 is controlled to a predetermined value calculated in step S405, a shutter 460 is kept open for a predetermined period of time in accordance with the value obtained in step S405, and then a film feed motor 462 is driven to wind the film by one frame. Thereafter, the flow returns to step S401 to prepare for the next exposure.

Next, a calibration mode operation described with reference to FIGS. 33A, 33B, 33C, 33D, 33E, 33F, 34 and 35 will be described with reference to FIG. 40. Referring to FIG. 40, to set the camera 401 at the normal horizontal position, "display an instruction for causing the photographer to hold the camera 401 at the horizontal position" is performed on a predetermined segment arranged on the display 405. The posture of the camera 401 can be determined by the posture sensor 409. If the photographer does not follow the instruction, a proper warning is given.

When the camera 401 is held at the horizontal position, a distance measurement area 424A is kept on (step S421), and a distance measurement area 424E is flickered (step S422). That is, an operation instruction shown in FIG. 33A is displayed.

A rotation operation of the track ball 410 in accordance with the instruction is monitored in step S423. If the track ball 410 is rotated in accordance with the instruction, determination in step S423 becomes affirmative (YES), and an operation locus in an operation direction 430 shown in FIG. 33B is stored in the MEM 458 (step S424).

Operation loci in eight rotation operation directions using the distance measurement area 424A as the start point are sequentially stored in the same manner. Operation loci in respective rotation operation directions using distance measurement areas 424D and 420E as the start points are stored in the same manner.

A distance measurement area 420A is kept on (step S425), and the distance measurement area 424A is flickered (step S426). An operation locus is stored in the MEM 458 in the same manner. Flickered distance measurement areas are sequentially switched, and operation loci in respective directions are stored in the MEM 458. Finally, the distance measurement area 420E is flickered (step S427), and the rotation operation of the track ball 410 is monitored (step S428). If the track ball 410 is rotated in accordance with the instruction, determination in step S428 becomes affirmative (YES), and an operation locus is stored in the MEM 458 (step S429).

Overlapping horizontal and vertical operation loci are corrected into one operation locus by calculating an arithmetic average or the like (step S430). Area boundaries are calculated using respective operation loci (step S431) to determine 32 determination areas shown in FIG. 35.

Of distance measurement areas located at the periphery, every other distance area (420A, 420C, 420E, 422a, 422C, 422E, 424A, 424C, 424E) is flickered for a predetermined period of time (step S432) to inform the photographer of completion of calibration in the horizontal state.

The photographer sees this notice and holds the camera 401 at the vertical position. When the photographer holds the camera 401 at the vertical position, processing equivalent to the above-described processing in steps S421 to S432 is executed (step S433).

In the above embodiments, the present invention is applied to a camera. If, for example, the manual operation correction device of the present invention is provided to a so-called personal computer, the operational habits of an operator can be corrected in manipulating a mouse, thereby improving operability.

Figure 41A:
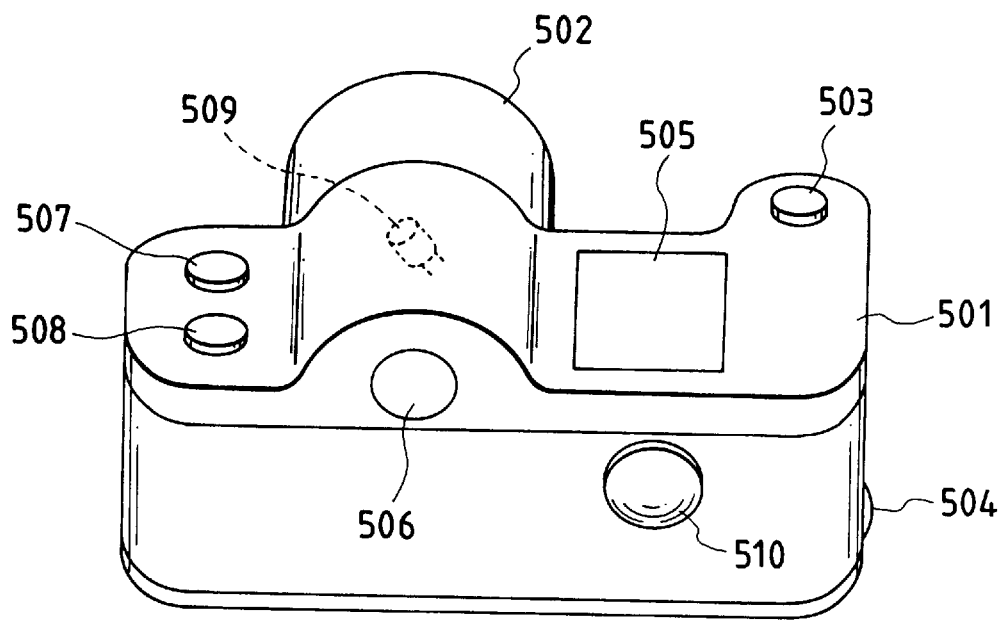
FIG. 41A is a perspective view showing the outer appearance of a camera according to the tenth embodiment of the present invention.

FIG. 41A is a perspective view showing the outer appearance of a camera according to the tenth embodiment of the present invention. Referring to FIG. 41A, a lens 502 is mounted on the front surface (rear side in FIG. 41A) of a camera 501 at the normal horizontal position. A finder 506 is arranged on the rear surface (front side in FIG. 41A) of the camera 501. A user can visually check through the finder 506 an object image passing through the lens 502.

Figure 41B:
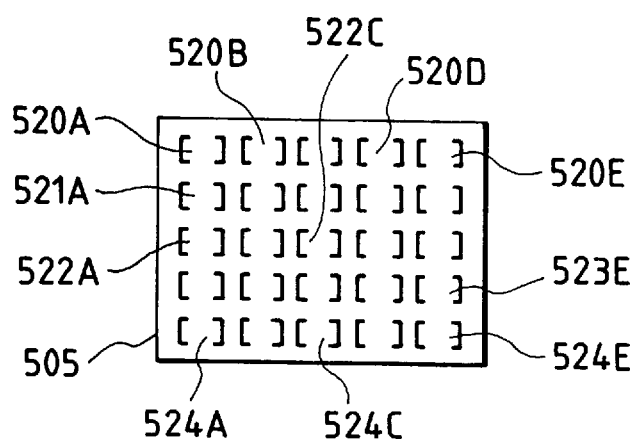
FIG. 41B is a view showing a display example of the distance measurement areas of the display.

A display 505 is arranged on the right side of the upper surface of the camera 501 when viewed from the rear side. This display 505 may be arranged in the finder 506. The set contents of various modes of exposure, photometry, distance measurement, and the like can be visually checked on the display 505. FIG. 41B shows 25 distance measurement areas 520A to 520E, 521A to 521E, 522A to 522E, 523A to 523E, and 524A to 524E displayed on the display 505 in the distance measurement mode.

A shutter button 503 is disposed at a portion extending toward the lower sheet surface in FIG. 41A and located on the right side of the upper surface of the camera 501 when viewed from the rear side. Another shutter button 504 is disposed on the side portion of the extended portion. This shutter button is used when the camera 501 is held at the vertical position.

As is known well, in the operations of the shutter buttons 503 and 504, the internal circuit is powered on upon half depression to the first stage and exposure to a loaded film is performed upon full depression to the second stage.

A track ball 510 serving as one operation unit of the present invention is disposed on the rear surface (front side in FIG. 41A) of the camera 501. The track ball 510 is disposed such that the tip of the thumb of the right hand is naturally placed when the camera 501 is supported and held with the right hand. The track ball 510 is used to select a distance measurement area, generate the first to fourth signals described above in the calibration mode, and select and set elements such as a shutter time and an F-number for the exposure mode.

A mode switch 507 and a calibration button 508 are disposed on the left side of the upper surface of the camera 501 when viewed from the rear side. Although not shown, a change button is also disposed. In this embodiment, the mode switch 507 is used for switching the current mode between the distance measurement mode and the exposure mode. The change button is used for changing a shutter time value, an F-number, or the like in the exposure mode.

The calibration button 508 is used to set the camera in the calibration mode. In the calibration mode, the photographer is caused to operate the track ball 510, thereby generating and storing the first to fourth signals described above.

A posture sensor 509 is arranged in the camera body to detect the posture of the camera 501 when the camera 501 is held. The posture sensor 509 is provided to reflect the posture of the camera 501 on data obtained in the calibration mode because its posture influences an operation of the photographer.

Figure 42:
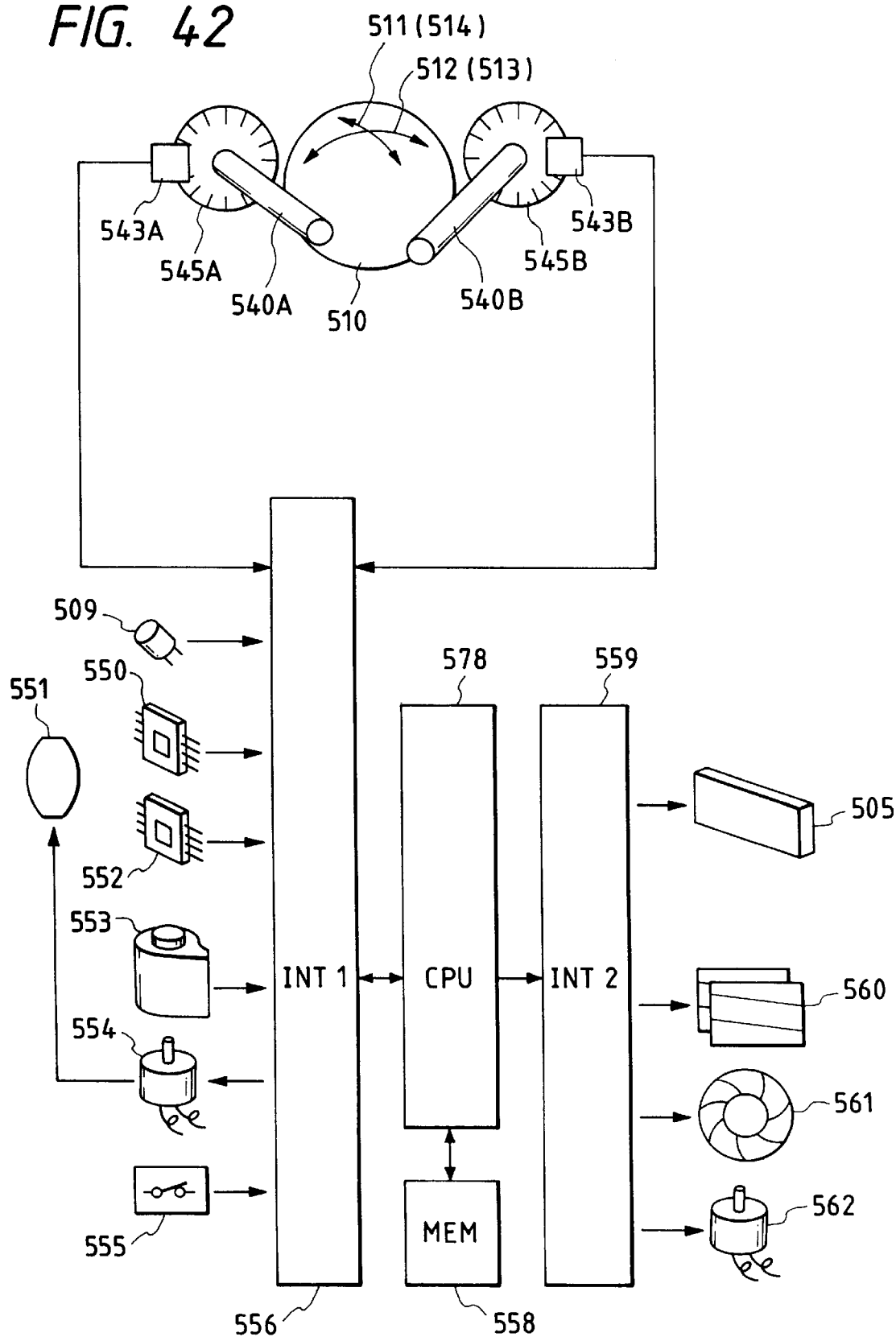
FIG. 42 is a view showing the arrangement of the camera according to the tenth embodiment of the present invention.

FIG. 42 is a view showing the arrangement of the camera according to the tenth embodiment of the present invention. Referring to the upper portion of FIG. 42, two rollers 540A and 540B are arranged around the track ball 510 with their one-end portions being in contact with the side surfaces of the track ball 510.

That is, when the track ball 510 is rotated in vertical and horizontal directions 511 and 512 (in directions 513 and 514 in photography at a vertical position, respectively), the two rollers 540A and 540B are rotated together with the track ball 510. Needless to say, rotation in an oblique direction is shared and transmitted to the two rollers 540A and 540B.

Disk-like sectors 545A and 545B are fixed to the other-end portions of the rollers 540A and 540B, respectively. Slits in the radial direction are formed on the outer surfaces of the sectors 545A and 545B at the same pitch, as shown in FIG. 42.

Photocouplers 543A and 543B are arranged at the peripheral edge portions of the disk-like sectors 545A and 545B, respectively. The photocouplers 543A and 543B generate pulses representing the number of slits through which light passes, i.e., the rotation amount of the track ball 510, and a slit passing direction, i.e., the rotational direction of the track ball 510.

These pulses are input to a central processing unit (to be referred to a CPU hereinafter) 578 through an interface circuit (to referred to as an INT hereinafter) 556 shown in the lower portion of FIG. 42, and are detected as the rotation amount and rotational direction of the track ball 510.

The CPU 578 in the lower portion of FIG. 42 is the main component for camera operation control, and executes input and control of information through the INT 556 and an INT 559. The CPU 578 directly exchanges data with a memory circuit (to be referred to as a MEM hereinafter) 558.

More specifically, the MEM 558 stores various data about the operation of the track ball 510 in the calibration mode and an actual operation.

As for the INTs 556 and 559, the above-described output pulse signals from the photocouplers 543A and 543B, and a posture signal from the posture sensor 509 are received through the INT 556.

An object image input to a photometric sensor 550 and a distance measuring sensor 552 through an optical system 551 including the lens 502 is received from the photometric sensor 550 and the distance measuring sensor 552 through the INT 556. A signal representing an in-focus state of the object is received from the distance measuring sensor 552. The film speed of the loaded film is received from a film speed detector 553 to drive a focus motor 554, thereby realizing an in-focus state. Various signals representing the sequence states in the camera 501 are received from various switches of a switch group 555 through the INT 556.

The display 505 is driven through the INT 559 to display an exposure condition, a distance measurement condition, and the like. A shutter 560 is opened/closed to control the exposure time of the film. An opening amount of a stop 561 is controlled to control the object light amount reaching the film. A film feed motor 562 is driven to control winding and rewinding of the film.

FIGS. 43A, 43B, 43C, 43D, 43E, and 43F are views for explaining display examples and operation sequences in the calibration mode. The calibration mode according to the present invention is realized as follows. The calibration button 508 is depressed, the CPU 578 inhibits all the operations associated with exposure, and a calibration mode program is executed.

Figure 43A:
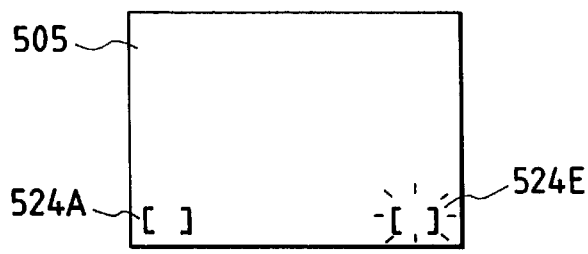
FIGS. 43A, 43B, 43C, 43D, 43E, and 43F are views for explaining display examples and operation sequences in the calibration mode.
Figure 43B:
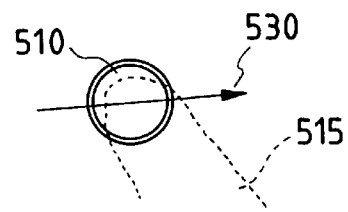
Figure 43C:
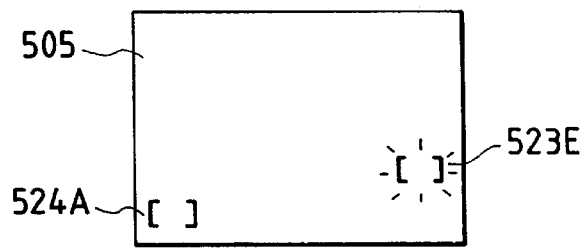
Figure 43D:
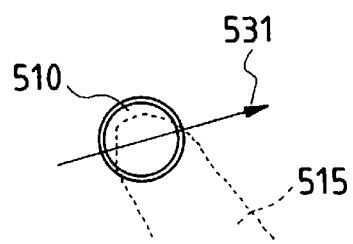
Figure 43E:
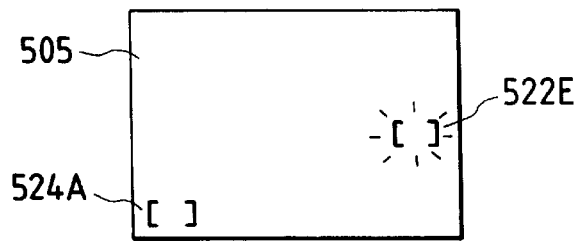
Figure 43F:
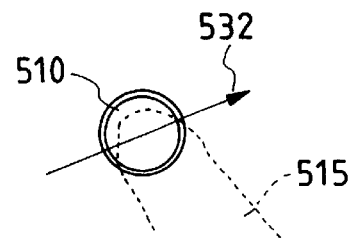

More specifically, the CPU 578 displays operation direction instructions on the display screen of the display 505, as shown in FIGS. 43A, 43C, and 43E, to cause the photographer to perform operations shown in FIGS. 43B, 43D, and 43F in accordance with the instruction display. The CPU 578 obtains the relationship between the "operation direction instructions" and the "rotation operation locus of the track ball 510" in accordance with the posture of the camera 501. The CPU 578 then generates direction signal formation data associated with the first to fourth signals described above on the basis of the obtained relationship, and stores it in the MEM 558. In actual photography, an area to be designated by the operation is specified on the basis of the storage contents.

A method of obtaining detailed data will be described with reference to FIGS. 43A, 43B, 43C, 43D, 43E, and 43F. For the descriptive convenience, as the calibration mode display screen of the present invention, FIGS. 43A, 43B, 43C, 43D, 43E, and 43F show a case using the display screen of the distance measurement areas shown in FIG. 41B. Therefore, a description will be made using the same names as the distance measurement area 524A and the like.

FIG. 43A shows a case in which the distance measurement area 524A at the lower left corner is kept on as the start point, a distance measurement area 524E at the lower right corner is flickered as the end point, and an instruction is made for horizontal movement from the left to the right.

FIG. 43B shows a state in which the photographer rotates the track ball 510 with a thumb 515 in a right direction 530 in accordance with the operation instruction shown in FIG. 43A. The photographer rotates the track ball 510 to change the distance measurement area 524A to the distance measurement area 524E while observing the display on the display 505. This rotation operation is stored in the MEM 558 in association with the operation instruction in the form of an operation locus defined by horizontal and vertical vector components.

FIG. 43C shows the following case. The storage operation of the MEM 558 is completed. In order to obtain the next data, the distance measurement area 524A at the lower left corner is kept on as the start point, and a distance measurement area 523E immediately above the distance measurement area 524E at the lower right corner is flickered as the end point, and an instruction is made for left-to-right movement from the horizontal direction to a slightly upper right direction.

FIG. 43D shows a state in which the photographer rotates the track ball 510 with the thumb 515 in an upper right direction 531 in accordance with the operation instruction shown in FIG. 43C. The photographer rotates the track ball 510 to change the distance measurement area 524A to the distance measurement area 523E while observing the display on the display 505. This rotation operation is stored in the MEM 558 in association with the operation instruction in the form of an operation locus defined by horizontal and vertical vector components.

FIG. 43E shows the following case. The storage operation of the MEM 558 is completed. In order to obtain the next data, the distance measurement area 524A at the lower left corner is kept on as the start point, and the distance measurement area 522E at the lower right corner is flickered as the end point, and an instruction is made for left-to-right movement from the horizontal direction to a slightly upper right direction.

FIG. 43F shows a state in which the photographer rotates the track ball 510 with the thumb 515 in an upper right direction 532 in accordance with the operation instruction shown in FIG. 43E. The photographer rotates the track ball 510 to change the distance measurement area 524A to the distance measurement area 522E while observing the display on the display 505. This rotation operation is stored in the MEM 558 in association with the operation instruction in the form of an operation locus defined by horizontal and vertical vector components.

In the same manner as described above, the distance measurement area 524A at the lower left corner is kept on as the start point, operation loci in nine directions towards distance measurement areas 521E, 520E, 520D, 520C, 520B, and 520A as the end points are stored in the MEM 558, and all operation loci are obtained using a distance measurement area 524D and the distance measurement areas 520D and 520A as the start points.

A total of 36 locus data are obtained. Note that locus data in the horizontal and vertical directions overlap, and the overlapping locus data are eliminated from the 36 locus data, thereby finally obtaining 32 locus data.

In addition, the camera 501 is held at the vertical position, and the same operations as described above are performed.

The data at the vertical position and the data at the horizontal position are separately stored. The operation locus obtained in this manner serves as the first signal described above.

When the CPU 578 stores the locus data directly expressing the rotation operation directions including the photographer's habits as described above, processing shown in FIG. 44 is performed to obtain a boundary line for distinguishing originally required rotation operation directions from each other.

Figure 44:
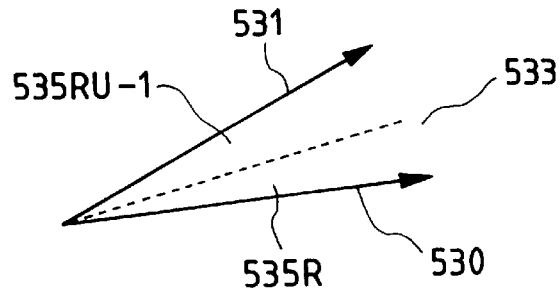
FIG. 44 is a conceptual view for boundary line calculation.

FIG. 44 is a conceptual view for boundary line calculation. In this case, a boundary line 533 is calculated on the basis of the operation loci in the rotation operation directions 530 and 531, which are obtained in the sequences in FIGS. 43A, 43B, 43C, 43D, 43E, and 43F.

The operation loci of the rotation operation directions 530 and 531 which are stored in the MEM 558 are separated into the horizontal and vertical components by the photocouplers 543A and 543B. The CPU 578 obtains the boundary line 533 by arithmetically averaging the center values of the horizontal and vertical components. In this manner, the adjacent operation loci are halved to obtain each boundary line.

In this case, the CPU 578 corrects the overlapping locus data in the horizontal and vertical directions. That is, as described above, a total of 36 locus data are obtained, but two locus data overlap in each of the horizontal and vertical directions.

More specifically, locus data of the distance measurement area 520A→520E and locus data of the distance measurement area 524A→524E, locus data of the distance measurement area 524A→520A and locus data of the distance measurement area 524E→520E, locus data of the distance measurement area 520E→520A and locus data of the distance measurement area 524E→524A, and locus data of the distance measurement area 520A→524A and locus data of the distance measurement area 520E→524E represent the same directions. Therefore, the CPU 578 averages these values to obtain average values.

Figure 45:
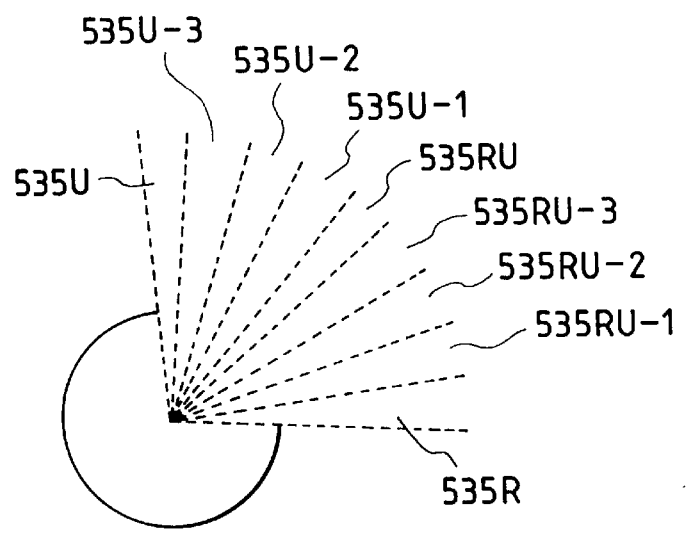
FIG. 45 is a view showing the relationship between boundary lines and areas therebetween.

By the above boundary line calculation processing, 32 boundary lines, i.e., boundary lines for dividing the total area into 32 areas are obtained. As shown in FIG. 44, a counterclockwise area of the boundary line 533 is defined as an area 535RU-1 and a clockwise area is defined as an area 535R, the relationship between the boundary lines and an area interposed therebetween is shown in FIG. 45.

In FIG. 44, the directions 530 and 531 are explained as operation loci upon the rotation operation of the track ball 510. The directions 530 and 531 can be considered to be generated in accordance with operation instructions represented by the directions of connected discrete values, like the distance measurement area 524A→524E. Therefore, the directions 530 and 531 correspond to the second and third signals described above, respectively, and the boundary line 533 corresponds to the fourth signal described above.

In short, in the calibration mode, the second, third, and fourth signals are generated using the track ball 510, and the first signal described above is generated in an actual photography operation. As can be readily understood, when the operation locus (first signal) of the track ball 510 falls within an area between the second and third signals, i.e., the area 535R or 535RU-1 between the directions 530 and 531 in FIG. 44, the boundary line 533 serving as the fourth signal is always generated. The designation direction of the fourth signal 533 is set as the operation direction of the track ball 510. The fourth signal 533 serves as a selection signal for designating an area.

In this manner, when a plurality of distance measurement areas are discretely arranged, as shown in FIG. 41B, a target distance measurement area can be almost reliably designated even if an actual operation direction falls out of the target distance measurement area due to the photographer's operational habits.

FIG. 45 is a view partially showing the boundary lines obtained as described above and areas interposed therebetween. When an actual rotational direction of the track ball 510 enters, e.g., the area 535R, the rotational direction is determined as the horizontal right direction, and a direction which halves the area 535R is an actual designation direction.

It should be noted that an upper right half area is divided into small areas having different sizes in FIG. 45 because the area division reflects the photographer's habits so as to follow signals input in accordance with the operation instructions described with reference to FIGS. 43A, 43B, 43C, 43D, 43E, and 43F.

An area division different from that in FIG. 45 is employed in photography at the vertical position of the camera. The area divisions are switched in accordance with a signal from the posture sensor 509.

Figure 46:
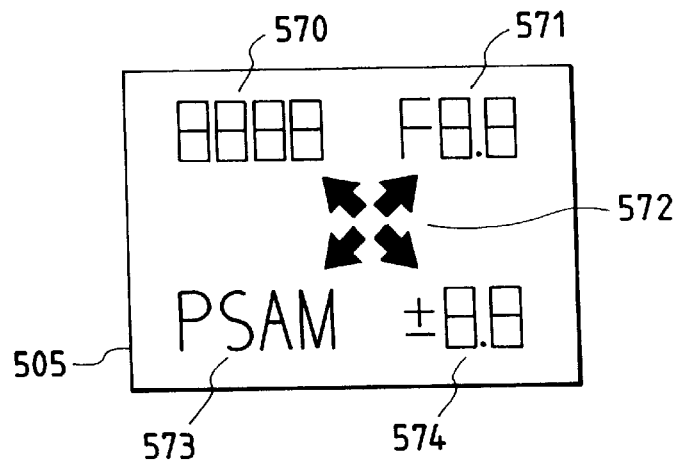
FIG. 46 is a view showing a display example of exposure conditions on the display.

An example for changing the exposure conditions with the operations of the track ball 510 will be described with reference to FIG. 46 and FIGS. 47A, 47B, 47C, and 47D. FIG. 46 shows a display example associated with exposure conditions on a display. FIG. 46 is a view for explaining a display example and an operation sequence in a change mode.

Referring to FIG. 46, a shutter time segment 570, an F-number segment 571, an exposure mode segment 573, and an exposure correction value segment 574 are arranged in the peripheral portion on the display screen of the display 505. An instruction segment 572 for designating one of the four peripheral segments which serves as a change target is arranged at the center of the display screen.

In this case, four peripheral portions on the display screen of the display 505 are selected. Therefore, the fourth signal (selection signal) to be generated is replaced with a discrete signal having an interval wider than that of the fourth signal (selection signal) used in a selection operation for a distance measurement area.

The exposure mode segment 573 displays one of P, S, A, and M. P represents a program priority exposure mode; S, a shutter priority exposure mode; A, an aperture priority exposure mode; and M, a manual exposure mode.

Figure 47A:
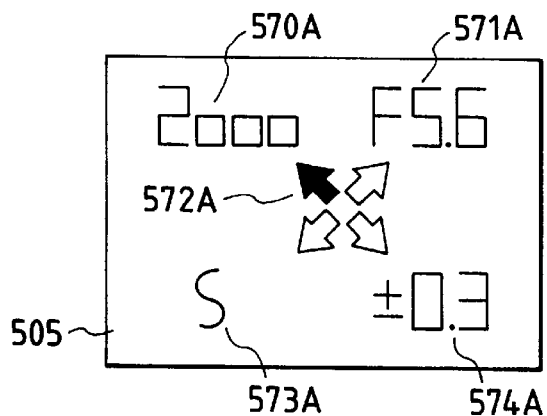
FIGS. 47A, 47B, 47C, and 47D are views for explaining display examples and operation sequences in the change mode.

FIG. 47A shows a state display example in which the contents of the shutter priority mode S can be changed. The segment 570 represents a shutter time of 1/2000 as a segment 570A, the segment 571 represents an F-number of F5.6 as a segment 571A, the segment 573 represents the shutter priority mode S as a segment 573A, the segment 574 represents an exposure correction value of ±0.3 as a segment 574A, and the segment 572 represents a segment 570A as a segment 572A, indicating that a shutter time can be changed.

Figure 47B:
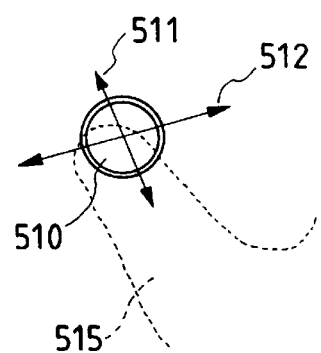

FIG. 47B is a view for explaining a mode change operation. When the track ball 510 is rotated in the illustrated vertical direction 511 and the illustrated horizontal direction, the designation direction of the segment 572 is changed to four directions accordingly. The value of an element designated by the segment 572 can be changed. The rotation operation direction of the track ball 510 perceptually coincides with the change designation direction of the segment 572, which is an effect of the above-mentioned calibration processing.

FIG. 47A shows a state in which the shutter time value can be changed, as described above. As shown in FIG. 47A, in the shutter priority mode, the F-number is automatically decided. To prevent contradiction, the display for causing the segment 572A to designate the segment 571A should be disabled. Therefore, designation of the segment 571A upon rotation of the track ball 510 is disabled, and this operation is automatically skipped.

Figure 47C:
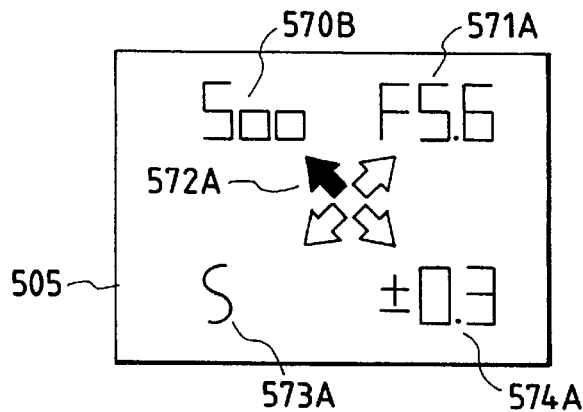
Figure 47D:
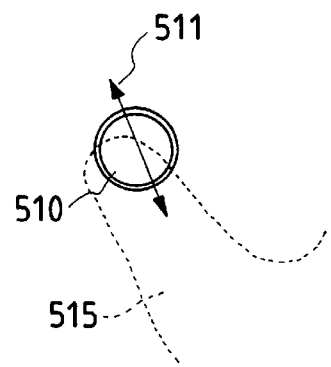

FIG. 47C shows a display example in which the contents of the shutter priority mode S are changed. FIG. 47D is a view for explaining an operation for changing the contents of the shutter time S. As described above, if the segment 572A designates the segment 570B serving as the segment 570 representing the shutter time to change a shutter time, the track ball 510 is rotated in the vertical direction 511, as shown in FIG. 47D while depressing a change button (not shown), thereby changing the shutter time value. FIG. 47C shows a state in which the shutter time has been changed to 1/500, as indicated by the segment 570B.

In this shutter time change mode, a change is interlocked with only rotation of the track ball 510 in the vertical direction 511. The rotational direction of the track ball 510 need not be the strict vertical direction. The rotational direction may include right areas 535U-1, 535U-2, and 535U-3 of the uppermost area 535U in FIG. 45, thereby coping with a rough operation of the photographer.

To change an exposure mode value, an F-number, an exposure correction value, or the like, the track ball 510 is simply rotated toward the corresponding segment. A change in value of each element perceptually coincides with the rotation operation direction of the track ball 510, thereby improving operability.

Figure 48:
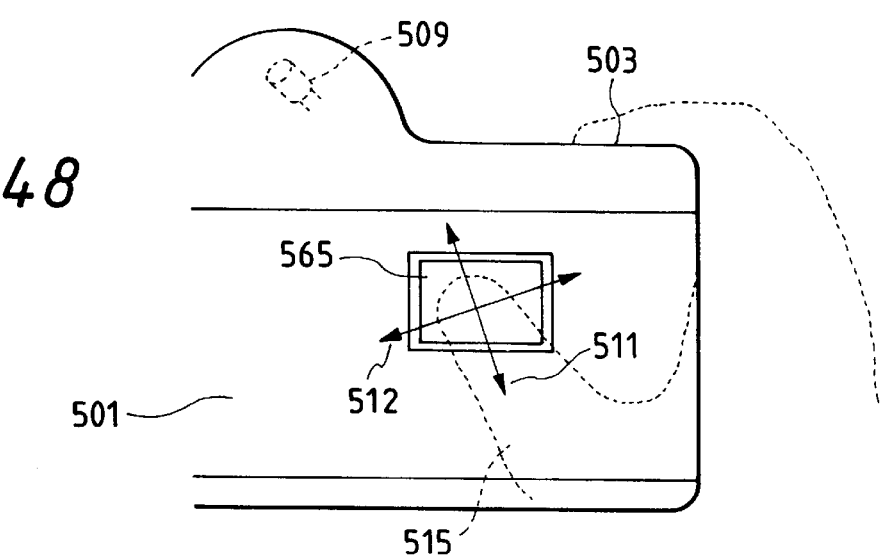
FIG. 48 is a view showing the outer appearance of a camera according to the eleventh embodiment of the present invention.

FIG. 48 is a view showing the outer appearance of a camera according to the eleventh embodiment of the present invention. A camera 501 according to the eleventh embodiment employs a touch panel 565 in place of the track ball 510. A designated direction can be detected by moving the tip of a finger in, e.g., vertical and horizontal directions 511 and 512 while bringing the tip of the finger into contact with the surface of the touch panel 565.

A designated direction detection scheme of the touch panel 565 includes a switch scheme for mechanically detecting depression of a finger and a scheme for detecting the touch of a finger by electrostatic induction. In either case, the vertical and horizontal directions 511 and 512 are inclined with respect to the outer shape of the camera 501, as shown in FIG. 48, and the degree of inclination varies due to individual differences.

The above-described manual operation correction scheme of the present invention can also be applied to the camera 501 employing the touch panel 565, and the same effect can be obtained.

Figure 49:
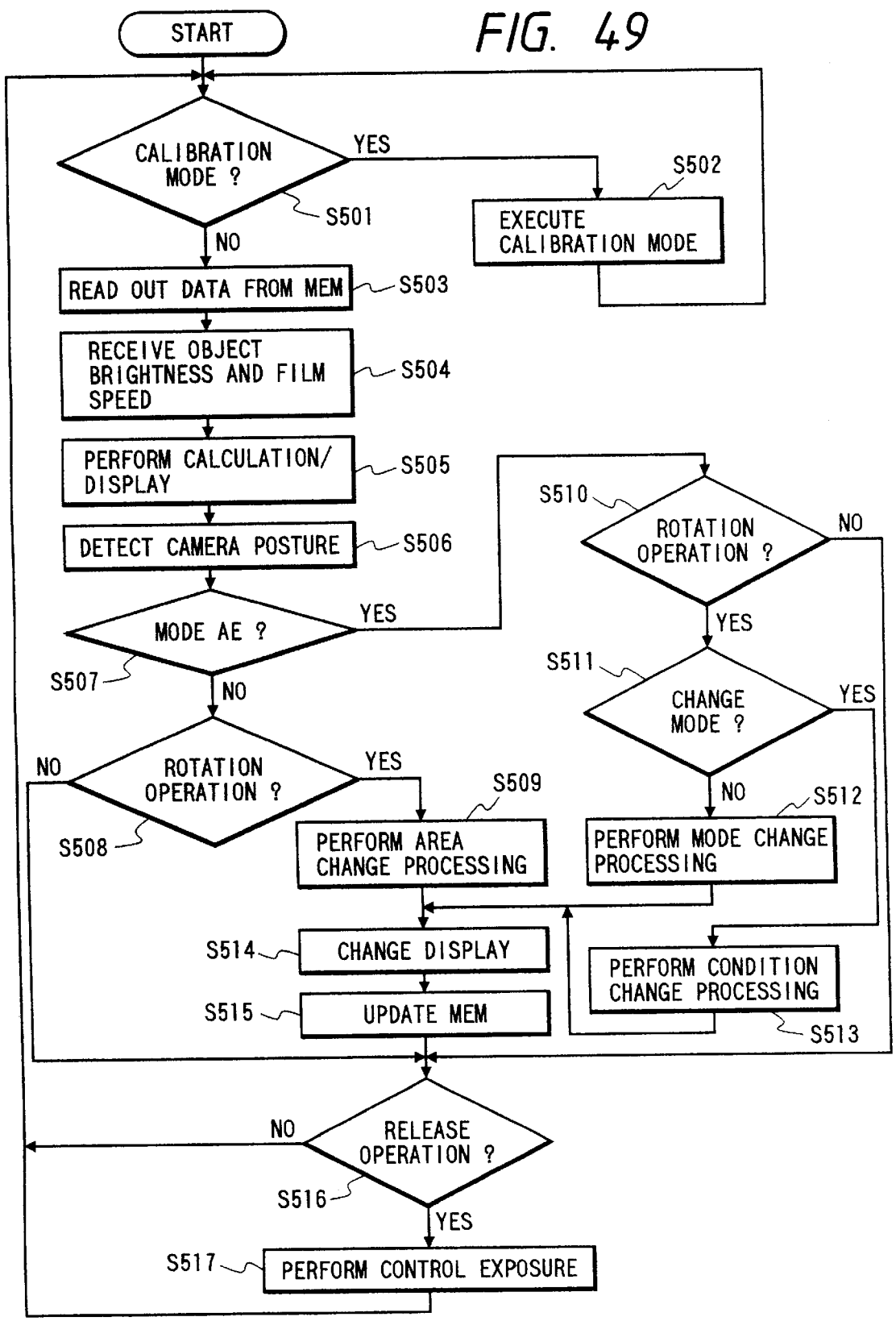
FIG. 49 is a flow chart showing a manual operation area designation operation.
Figure 50:
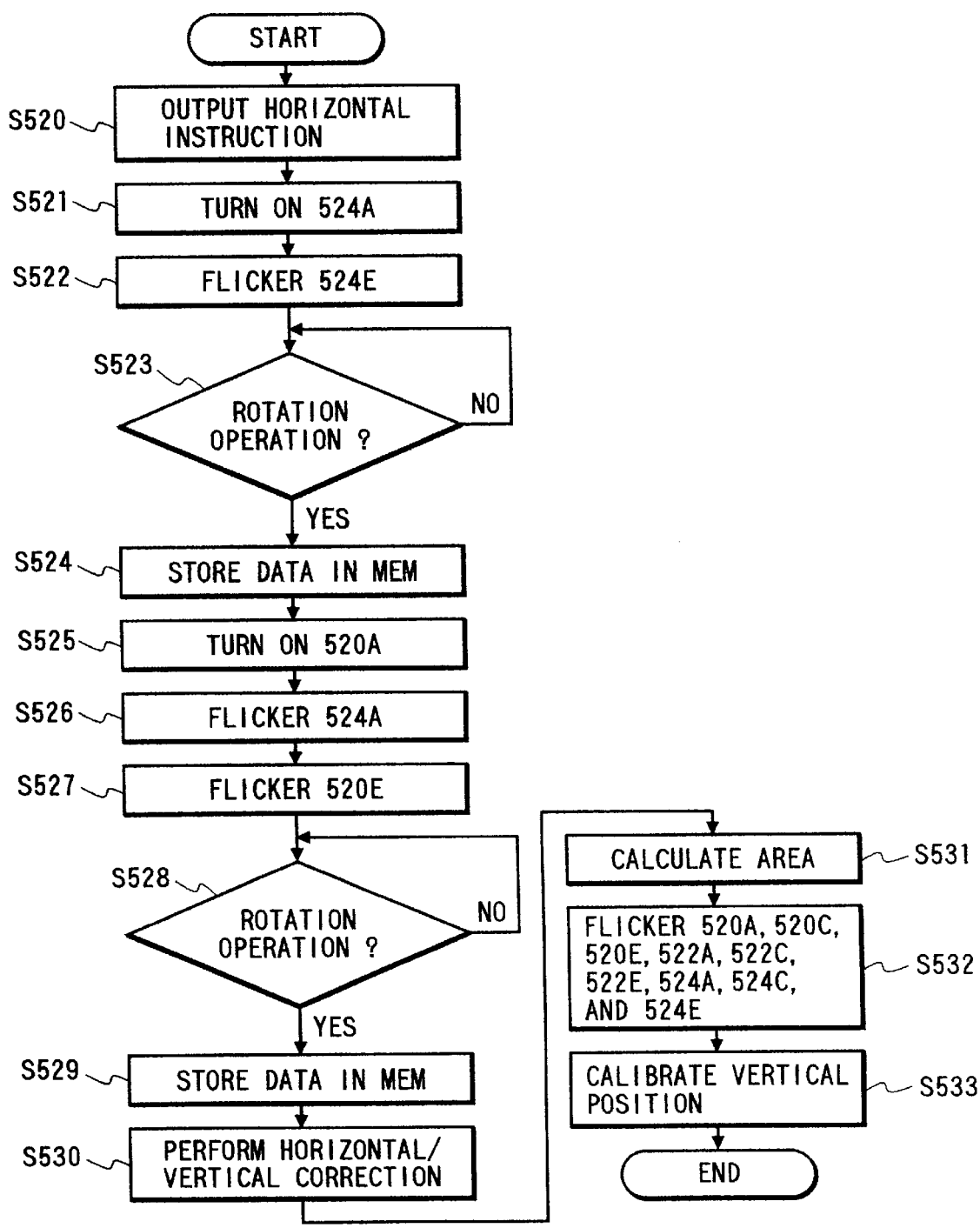
FIG. 50 is a flow chart showing an operation in the calibration mode.

The operation of the above-mentioned manual operation correction scheme of the present invention will be described below with reference to FIGS. 49 and 50. FIG. 49 is a flow chart showing an operation according to this embodiment of the present invention. FIG. 50 is a flow chart showing an operation in the calibration mode.

Processing shown in FIG. 49 is started when a battery (not shown) is connected and a power switch is turned on upon depression of a shutter button 503 (504) to the first stage. This processing is repeatedly executed while power supply continues by a power supply timer (not shown) or the like.

Referring to FIG. 49, it is determined in step S501 whether a calibration button 508 is operated to designate the calibration mode. If the calibration button 508 is operated, determination becomes affirmative (YES). In step S502, calibration mode processing is executed, and the flow returns to step S501. The calibration mode processing in step S502 will be described later (FIG. 50).

If the calibration button 508 is not operated in step S501, determination becomes negative (NO), and the flow advances to step S503. Previously set various conditions such as set conditions previously displayed on a display 505 are read out from a MEM 558, and the flow advances to step S504.

In step S504, an object brightness signal and a film speed signal are received from a photometric sensor 550 and a film speed detector 553, respectively, and the flow advances to step S505.

In step S505, the object brightness signal and the film speed signal received in step S504 are calculated on the basis of the various conditions read out in step S503, thereby calculating an optimal exposure condition. A shutter time and an F-number are then determined. The results are displayed on the display 505, and the flow advances to step S506.

In step S506, the photographic posture of the camera 501 is determined by a posture sensor 509, and the flow advances to step S507. Note that this processing in step S506 may be performed prior to processing in step S505 to use the photographic posture of the camera 501 as a condition for exposure condition calculation.

In step S507, it is determined whether the switched state of the mode switch 507 is the AE mode (exposure mode) or the distance measurement mode. As described above, the display 505 has the display screen shown in FIG. 41B in the distance measurement mode, and the display screen shown in FIG. 46 in the exposure mode.

If the switched state is not the AE mode in step S507, i.e., it is the distance measurement mode, determination becomes negative (NO), and the flow advances to step S508. If the switched state is the AE mode, determination becomes affirmative (YES), and the flow advances to step S510.

In step S508, it is detected whether the track ball 510 is operated. If the track ball 510 is operated, determination becomes affirmative (YES). Respective processes in steps S509, S514, and S515 are performed, and the flow advances to step S516 to prepare for a release operation. To the contrary, if the track ball 510 is not operated, determination becomes negative (NO), and the flow directly advances to step S516 to prepare for a release operation.

The following processes are executed in steps S509, S514, and S515. That is, the operation direction and amount of the track ball 510 are obtained and compared with area division (see FIG. 45) stored in the MEM 558 to derive an operation direction truly desired by the photographer (step S509). The display contents of the display 505 are changed in accordance with the result (step S514). The result is updated and stored in the MEM 558 (step S515).

If the switched state is determined to be the AE mode in step S507, it is detected in step S510 whether the track ball 510 is operated. If the track ball 510 is operated, determination becomes affirmative (YES), and it is determined in step S511 whether a change button (not shown) is depressed.

If the change button is not depressed, determination in step S511 becomes negative (NO), and mode change processing described with reference to FIGS. 47A and 47B is performed in step S512. If the change button is depressed, determination in step S511 becomes affirmative (YES), and condition change processing described with reference to FIGS. 47C and 47D is performed in step S513. The results of the respective processes in steps S512 and S513 are displayed and stored (steps S514 and S515) to prepare for a release operation (step S516).

If the track ball 510 is not operated in step S510, determination becomes negative (NO), and the flow directly advances to step S516 to prepare for a release operation.

In step S516, it is determined whether the shutter button 503 (504) is deeply depressed to the second stage and an exposure start instruction, i.e., a release instruction is generated. If the shutter button 503 (504) is not deeply depressed to the second stage, an exposure operation is unnecessary, and determination becomes negative (NO). The flow returns to step S501 to repeatedly execute the above-described processing.

If the shutter button 503 (504) is deeply depressed to the second stage in step S516, determination becomes affirmative (YES), and the flow advances to step S517 to execute a predetermined exposure sequence. More specifically, a stop 561 is controlled to a predetermined value calculated in step S505, a shutter 560 is kept open for a predetermined period of time in accordance with the value obtained in step S505, and then a film feed motor 562 is driven to wind the film by one frame. Thereafter, the flow returns to step S501 to prepare for the next exposure.

Next, a calibration mode operation described with reference to FIGS. 43A to 45 will be described with reference to FIG. 50. Referring to FIG. 50, to set the camera 501 at the normal horizontal position, "instruction display for causing the photographer to hold the camera 501 at the horizontal position" is performed on a predetermined segment arranged on the display 505. The posture of the camera 501 can be determined by the posture sensor 509. If the photographer does not follow the instruction, a proper warning is given.

When the camera 501 is held at the horizontal position, a distance measurement area 524A is kept on (step S521), and a distance measurement area 524E is flickered (step S522). That is, an operation instruction shown in FIG. 43A is displayed.

A rotation operation of the track ball 510 in accordance with the instruction is monitored in step S523. If the track ball 510 is rotated in accordance with the instruction, determination in step S523 becomes affirmative (YES), and an operation locus in an operation direction 530 shown in FIG. 43B is stored in the MEM 558 (step S524).

Operation loci in eight rotation operation directions using the distance measurement area 524A as the start point are sequentially stored in the same manner. Operation loci in respective rotation operation directions using distance measurement areas 524D and 520E as the start points are stored in the same manner.

A distance measurement area 520A is kept on (step S525), and the distance measurement area 524A is flickered (step S526). An operation locus is stored in the same manner. Flickered distance measurement areas are sequentially switched, and operation loci in respective directions are stored.

Finally, the distance measurement area 520E is flickered (step S527), and the rotation operation of the track ball 510 is monitored (step S528). If the track ball 510 is rotated in accordance with the instruction, determination in step S528 becomes affirmative (YES), and an operation locus is stored in the MEM 558 (step S529).

Overlapping horizontal and vertical operation loci are corrected into one operation locus by calculating an arithmetic average or the like (step S530). Area boundaries are calculated using respective operation loci (step S531) to determine 32 determination areas shown in FIG. 45.

Of distance measurement areas located at the periphery, every other distance area (520A, 520C, 520E, 522A, 522C, 522E, 524A, 524C, 524E) is flickered for a predetermined period of time (step S532) to inform the photographer of completion of calibration in the horizontal state.

The photographer sees this notice and holds the camera 501 at the vertical position. When the photographer holds the camera 501 at the vertical position, processing equivalent to the above-described processing in steps S521 to S532 is executed (step S533).

In the above embodiment, the present invention is applied to a camera. If, for example, the manual operation correction device of the present invention is provided to a so-called personal computer in manipulating a mouse, the contents of continuous operations of an operator need not be sequentially subjected to processing, resulting in an increase in processing speed and the like.

The second, third, and fourth signals are generated using the track ball. Alternatively, these signals may be stored in advance, and the fourth signal may be output upon an actual operation of the track ball, and used as a selection signal.

As described above, the manual operation area designation device of the present invention converts an operation locus into a signal indicating a uniformly determined direction even if the operation locus continuously changes within an area defined by the second and third signals. Areas are defined by a plurality of pairs of second and third signals, and a direction signal is discretely generated in each defined area. That is, the operation locus is a continuous direction signal, which is converted into a discrete signal indicating a uniformly determined direction.

The present invention therefore has an advantage of eliminating extra data processing in not only an image pickup device but also a so-called personal computer if designation on the display screen may be discrete.

Since the direction signal for selecting and designating an area is generated in consideration of the operational habits of the operator, operability can be improved in a device operated in his hand, such as an image pickup device, a device at which a user does not fix his posture, such as an image pickup device and a so-called personal computer, and a device used by an unspecified user.

Figure 51:
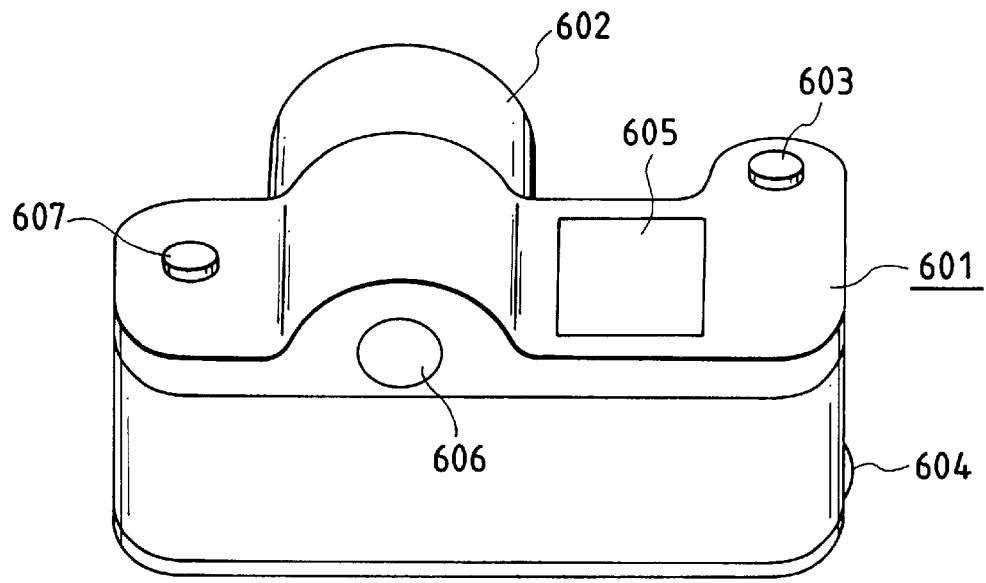
FIG. 51 is a perspective view showing the outer appearance of a camera according to the twelfth embodiment of the present invention.

FIG. 51 is a perspective view showing the outer appearance of a camera according to the twelfth embodiment of the present invention. Referring to FIG. 51, a lens 602 is mounted on the front surface (rear side in FIG. 51) of a camera 601. A finder 606 is arranged on the rear surface (front side in FIG. 51) of the camera 601. A user can visually check through the finder 606 an object image passing through the lens 602.

A display 605 is arranged on the right side of the illustrated upper surface when viewed from the rear side when the camera 601 is held at a horizontal position. This display 605 may be arranged in the finder 606. The set contents of various modes of exposure, photometry, distance measurement, and the like can be visually checked on the display 605.

Figure 52:
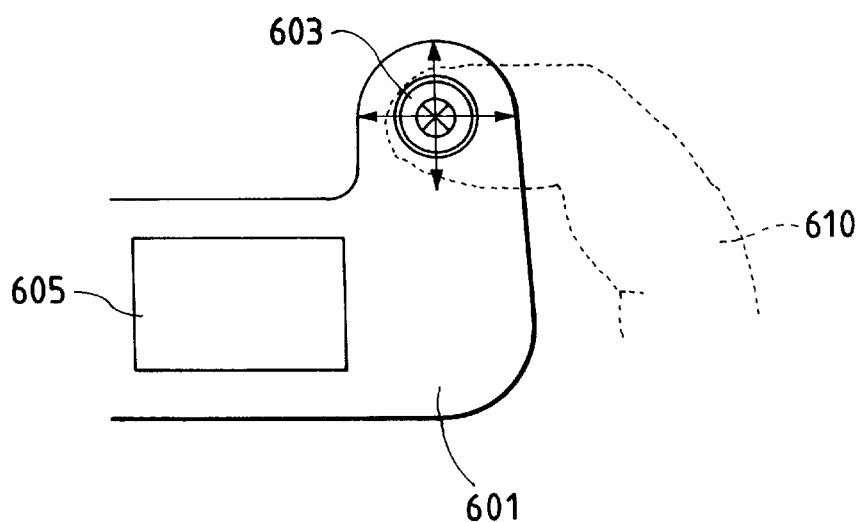
FIG. 52 is an enlarged view showing a release operation position.

A ball 603 is disposed at a portion extending toward the rear surface of the drawing in FIG. 51 and located on the right side of the upper surface when viewed from the rear side when the camera 601 is held at the horizontal position. FIG. 52 is an enlarged view showing a portion around a release operation position. As shown in FIG. 52, the ball 603 is disposed such that an index finger 610 of the right hand is naturally placed when the camera 601 is held.

Another ball 604 is disposed on the side portion of the same portion extending toward the lower sheet surface in FIG. 51 and located on the right side when viewed from the rear side. This ball is used when the camera 601 is held at the vertical position. The ball 603 will be described below, and this description also applies to the ball 604.

As shown in FIG. 52, the ball 603 is rotated in a back and forth direction (vertical direction in FIG. 52) and a lateral direction (horizontal direction in FIG. 52). The ball 603 is depressed from the front surface of the drawing to the rear surface of the drawing in FIG. 52, as indicated by a cross.

Figure 54:
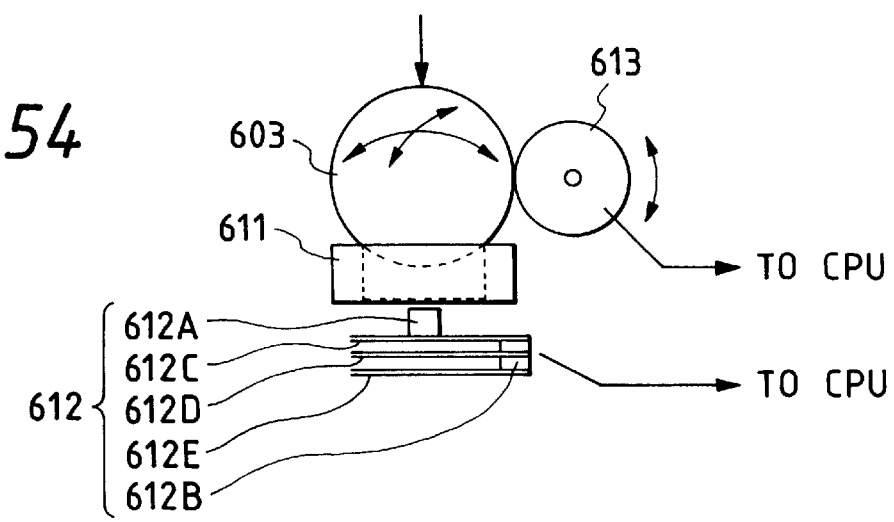
FIG. 54 is a view showing the detailed structure of a release operation mechanism.

The detailed structure (release operation mechanism) will be described later (FIG. 54). The ball 603 is equivalent to a conventional camera release button in that it has a function of starting power supply to an internal circuit of the camera 601 upon depression to the first stage, and starting an exposure operation upon deeper depression to the second stage. In the present invention, the ball 603 further has a function of changing and adjusting a mode by a rotation operation.

In this embodiment, two modes, i.e., the distance measurement mode and the exposure mode can be changed and adjusted. For this purpose, a mode button 607 is disposed on the left side of the upper surface of the camera 601 when viewed from the rear side when the camera 601 is held at the horizontal position. The mode button 607 enables designation of a mode to be changed and adjusted by the ball 603 to the "distance measurement mode" or the "exposure mode".

A mode change operation using the ball 603 is performed in a stage in which the ball 603 is not depressed to the second stage, i.e., the first stage in which power supply to an internal circuit starts. In this embodiment, the mode change operation is performed as follows.

More specifically, the first mode, i.e., a distance measurement position is changed by rotating the ball 603 without depressing the mode button 607. The second mode, i.e., the exposure mode is changed and adjusted by depressing the mode button 607 and rotating the ball 603.

Figure 53:
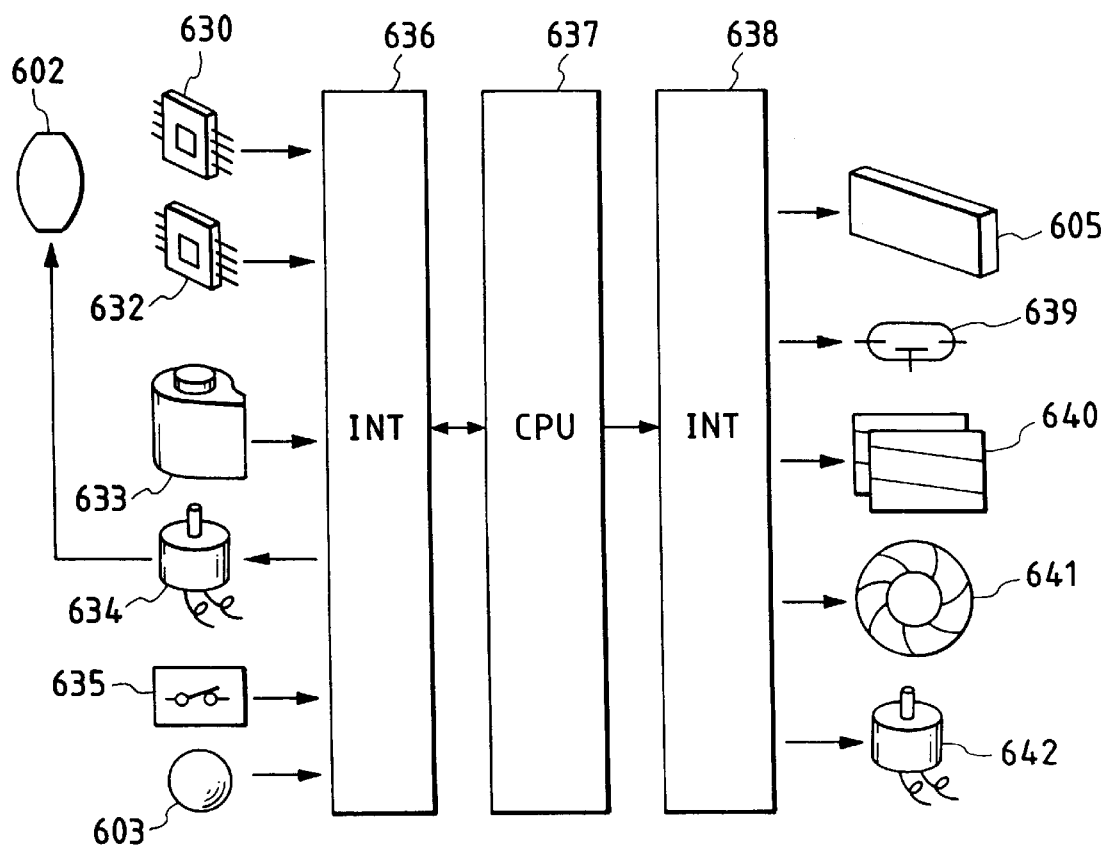
FIG. 53 is a view showing the electrical arrangement of a camera according to the twelfth embodiment of the present invention.

FIG. 53 is a view showing the electrical arrangement of the camera of this embodiment. Referring to FIG. 53, a central processing unit (to be referred to as a CPU hereinafter) 637 is the main component for camera operation control. The CPU 637 executes input and control of information through interface circuits (to be referred to as INTs hereinafter) 636 and 638.

More specifically, a signal representing an in-focus state of the object is received from a distance measuring sensor 632 through the INT 636. The film speed of the loaded film is received from a film speed detector 633 through the INT 636. An object image input to a photometric element 630 and a distance measuring element 632 through an optical system including the lens 602 is received through the INT 636 to drive a focus motor 634, thereby realizing an in-focus state.

Signals representing the states of various switches, i.e., a manual operation signal for, e.g., the above-described mode button 607, a switch signal representing the sequence state in the camera 601, and the like are received from a switch group 635 through the INT 636.

A signal (to be described later in FIG. 54) associated with the ball 603 is received to detect the rotational direction of the ball 603 or a depression operation to the first or second stage to generate a power supply start signal or an exposure start signal.

The display 605 is driven through the INT 638 to display a distance measurement condition and the like. An electronic flash device 639 is operated, and a shutter 640 is opened/closed to control the exposure time of the film. An opening amount of a stop 641 is controlled to control the object light amount reaching the film. A film feed motor 642 is driven to control winding and rewinding of the film.

FIG. 54 is a view showing the detailed structure of the release operation mechanism. Referring to FIG. 54, the ball 603 is rotatably placed in an annular opening of a cylindrical elastic packing 611 with a bottom. When the ball 603 is depressed, the elastic packing 611 is moved downward by a distance corresponding to the depression force.

A switch 612 is arranged below the bottom portion of the elastic packing 611. The switch 612 has a three-layered structure of three contact pieces 612C, 612D, and 612E. Each of the three contact pieces consists of a conductive plate. One-end portions of these contact pieces are properly spaced apart from each other by spacers 612B. The other-end portions of the two upper contact pieces 612C and 612D are free end portions.

The uppermost contact piece 612C is a ground contact piece to be grounded. A projection 612A is formed on the upper surface of the contact piece 612C and engages with the bottom portion of the elastic packing 611 which moves downward, thereby realizing a required switch operation.

More specifically, when the projection 612A is pressed by the bottom portion of the elastic packing 611 which moves downward, the free end portion of the contact piece 612C flexes downward to come into contact with the middle contact piece 612D. If the downward movement amount of the elastic packing 611 is large, the free end portion of the contact piece 612C further flexes downward to flex the free end of the contact piece 612D downward and bring it into contact with the lowermost contact piece 612E.

The CPU 637 receives contact between the uppermost contact piece 612C and the middle contact piece 612D as a first stage depression detection signal, and contact between the three contact pieces as a second stage depression detection signal.

The CPU 637 generates a power supply start signal upon reception of the first stage depression detection signal, and a power supply start signal upon reception of the second stage depression detection signal. Therefore, the middle contact piece 612D serves as a power supply contact piece, and the lowermost contact piece 612E serves as an exposure contact piece.

A rotation detection roller 613 is disposed in contact with the side portion of the ball 603. For illustrative convenience, only one rotation detection roller 613 is illustrated. However, in practice, the two rotation detection rollers 613 are disposed to be spaced apart from each other by about 90° in contact with the side surface portions of the ball 603.

More specifically, when the ball 603 is rotated, one or both of the rotation detection rollers 613 are rotated together with the ball 603 to detect rotation of the ball 603. Rotation detection outputs from the two rotation detection rollers 613 are converted into electrical signals which are then input to the CPU 637.

The CPU 637 calculates the vectors of the rotation detection contents of the two rotation detection rollers 613 to determine a rotational direction, i.e., the "back and forth direction", or "lateral direction". The CPU 637 determines the contents of a mode change/adjustment operation on the basis of the detected rotational direction and the detected rotation amount.

Note that the elastic packing 611 has an elasticity free from deformation against a force for rotating the ball 603.

That is, the switch 612 is not operated in the change/adjustment operation for various modes.

The operation of the twelfth embodiment will be described with reference to FIGS. 55, 56, 57, and 58.

Figure 55:
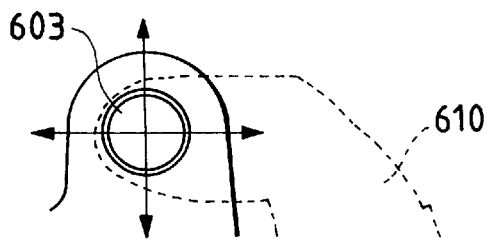
FIG. 55 is a view for explaining a distance measurement position change operation.
Figure 56:
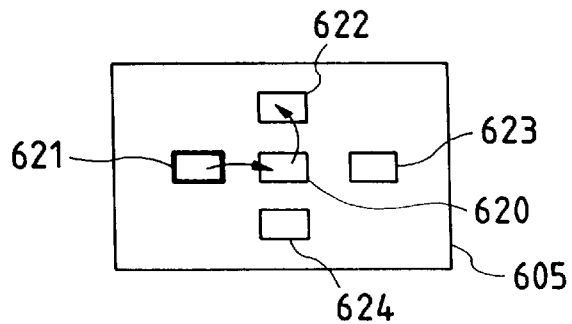
FIG. 56 is a view showing an example of a distance measurement position change display.

FIG. 55 is a view for explaining a distance measurement position change operation. FIG. 56 is a view showing an example of a distance measurement position change display. Referring to FIG. 55, the ball 603 is rotated by the index finger 610 of the right hand in a back and forth direction (vertical direction in FIG. 55) and a lateral direction (horizontal direction in FIG. 55), as indicated by arrows. Even if the back and forth direction and the lateral direction are not perpendicular to each other, the direction of this rotation operation is determined on the basis of the relationship between direction component magnitudes. This operation is performed in the first stage depression state wherein power is supplied to an internal circuit by slightly depressing the ball 603.

As shown in FIG. 56, five distance measurement positions, i.e., a central frame 620, a left frame 621, an upper frame 622, a right frame 623, and a lower frame 624 are set within the rectangular screen of the display 605 arranged outside the camera 601 or inside the finder 606. These five distance measurement positions can be set by rotating the ball 603. In the example shown in FIG. 56, the set left frame 621 is displayed at a higher density to distinguish it from remaining frames.

Note that the distance measuring sensor 632 can detect the focus state of an object to be photographed in correspondence with these five distance measurement positions. Conventionally, a distance measurement position is only a central position, and photographic conditions are limited in many cases, which can be solved in this embodiment.

Figure 57:
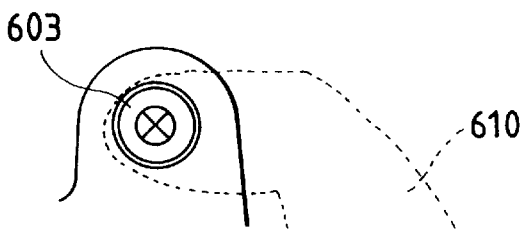
FIG. 57 is a view for explaining an exposure start operation.

FIG. 57 is a view for explaining an exposure start operation. This exposure start operation is performed at the start of an exposure operation subsequent to selection of a distance measurement position in FIG. 55. When the index finger 610 of the right hand applies a depression force stronger than a first stage depression force to the ball 603, the three contact pieces of the switch 612 are brought into contact with each other to form a second stage depression signal, and the CPU 637 executes the exposure operation.

Figure 58:
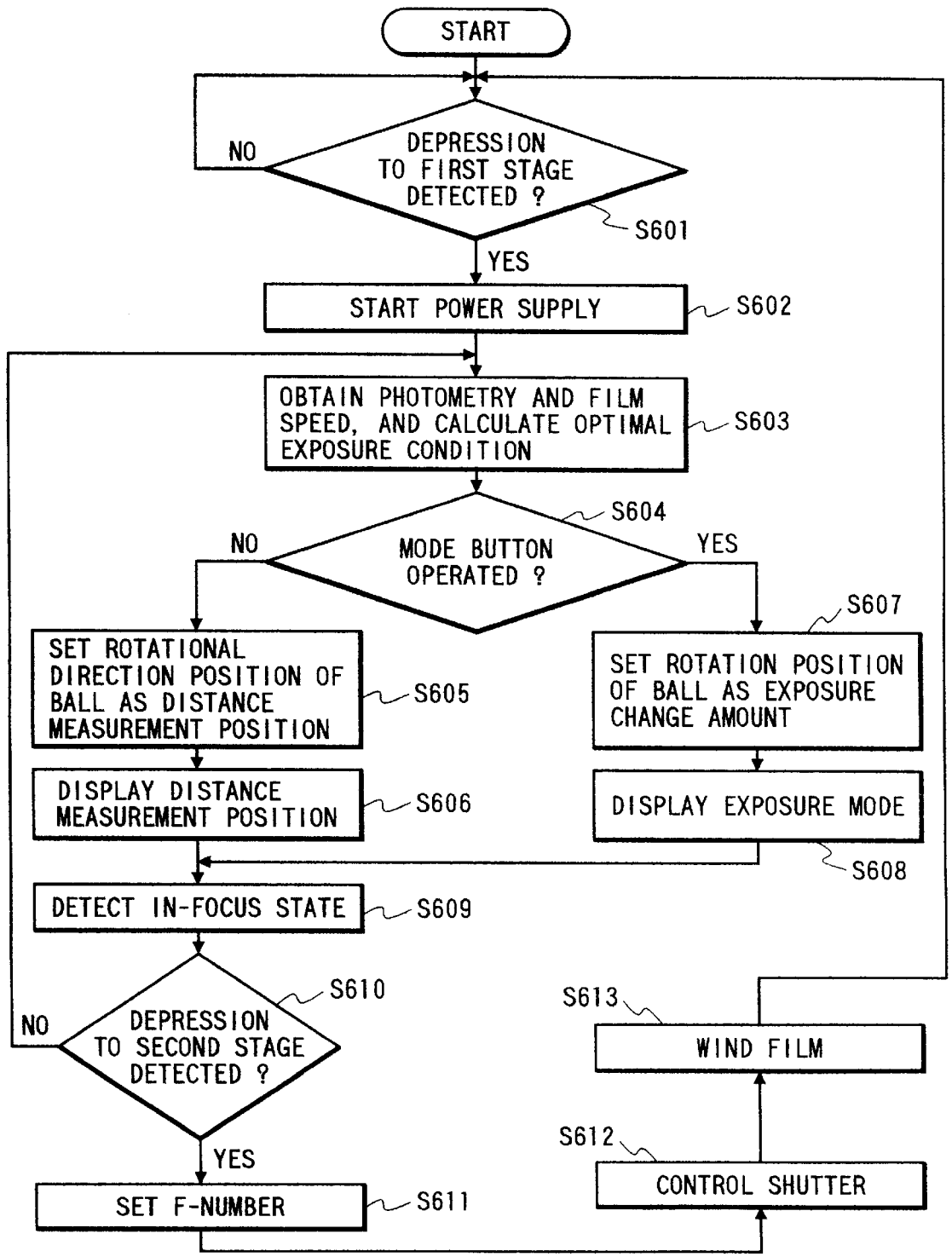
FIG. 58 is a flow chart showing a release operation.

FIG. 58 is a flow chart showing an operation according to this embodiment of the present invention. In step S601, the flow waits for depression of the ball 603 to the first stage. During waiting, remaining circuits are kept in a power-saving state. If the ball 603 is depressed to the first stage, determination in step S601 becomes affirmative (YES), and the flow advances to step S602. In step S602, power supply to all circuits starts to perform processing required for camera operation control.

In the next step S603, an object brightness signal is received from the photometric element sensor 630. The film speed signal of the loaded film is received from the film speed detector 633. The two signals are calculated to obtain an optimal exposure condition and determine a shutter time and an F-number. Note that the calculation results are displayed on the display 605, together with various data including a previously set distance measurement position.

In step S604, it is determined whether the mode button 607 is operated. If the mode button 607 is not operated, the determination result becomes negative (NO), and processes in steps S605 and S606 are executed; if it is operated, the determination result becomes affirmative (YES), and processes in steps S607 and S608 are executed.

In step S605, the current mode is interpreted as the distance measurement position change mode because the mode button 607 has not been operated. The rotation signals of the ball 603 are received from the rotation detection rollers 613 to obtain a distance measurement change position from the rotational direction positions. In the next step S606, the obtained distance measurement change position is displayed on the display 605, as shown in FIG. 58, and the flow advances to step S609.

To the contrary, in step S607, the current mode is interpreted as the exposure mode change mode because the mode button 607 has been operated. The rotation signals of the ball 603 are received from the rotation detection rollers 613 to obtain a change exposure amount from the rotation positions. In the next step S608, the obtained change exposure amount is displayed on the display 605, and the flow advances to step S609.

In step S609, an in-focus state by the photometric sensor 632 is detected at the distance measurement position having already been set or a newly set distance measurement position. A focusing operation is performed by driving the focus motor 634 in accordance with the detection result, as needed. The flow advances to step S610.

In step S610, it is determined whether the ball 603 is depressed to the second stage. If the ball 603 is not depressed to the second stage, the mode has not been changed yet. The determination result in step S610 becomes negative (NO), and the flow returns to step S603 to repeatedly execute the above-described processing operation. If the ball 603 is depressed to the second stage, the mode change/adjustment operation is completed. The determination result in step S610 becomes affirmative (YES), respective processes in steps S611, S612, and S613 are executed, and the flow returns to step S601 to prepare for the next exposure.

In step S611, the stop 641 is controlled to a predetermined value calculated in step S603. In step S612, the shutter 640 is kept open for a predetermined period of time in accordance with the value obtained in step S603. In step S613, the film feed motor 642 is driven to wind the film by one frame.

As is apparent from the above description, if no mode button 607 is arranged, the distance measurement mode is preferably changed and set.

The respective modes may be assigned to two rotational directions of the ball 603 and designated by the mode button 607. For example, one of the two rotational directions of the ball 603 is assigned with zooming, and the other is assigned with focusing. A mode change/adjustment operation for, e.g., a shutter time, a stop, and photometry can be performed by arranging two or more mode buttons 607.

Figure 59:
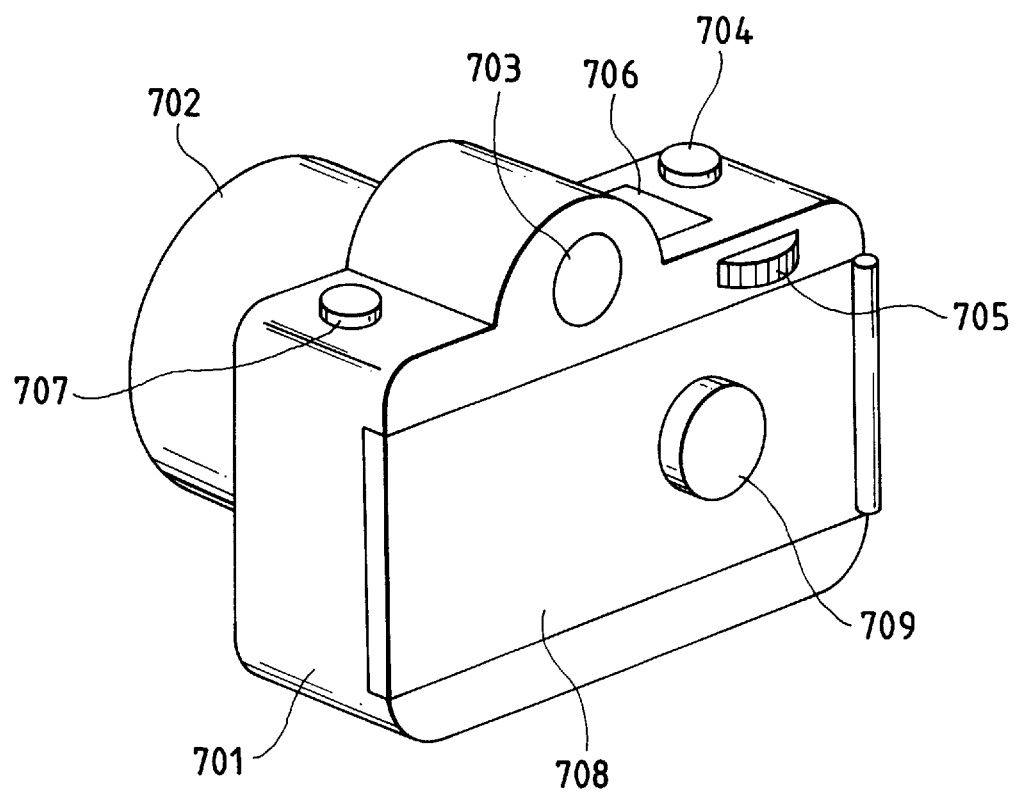
FIG. 59 is a perspective view showing the outer appearance of a camera according to the thirteenth embodiment of the present invention.

FIG. 59 is a perspective view showing a camera according to the thirteenth embodiment of the present invention. Referring to FIG. 59, a user can visually check through a finder 703 an object image passing through a lens 702 mounted on a camera 701. A film inside a rear cover 708 is exposed under set conditions by depressing a shutter button 704. Exposure modes, e.g., a manual mode and a shutter priority mode can be selected and switched by a dial 707. A shutter time which should be selected in the above mode can be selected by rotating a command dial 705 while confirming a value displayed on a display 706. The command dial 705 is constituted by an endless rotation operation member, and its rotational direction and rotation amount can be detected by an internal circuit on the basis of interlocking contacts. Conditions set by the above operation are displayed on the display 706.

A selector 709 mounted on the rear cover 708 is constituted by an operation member for arbitrarily selecting a distance measurement area in this embodiment. Although details will be described later, a distance measurement area at a desired position can be arbitrarily selected and designated by depressing the right, left, upper, or lower side of the selector 709 while observing the display through the finder 703.

Figure 60:
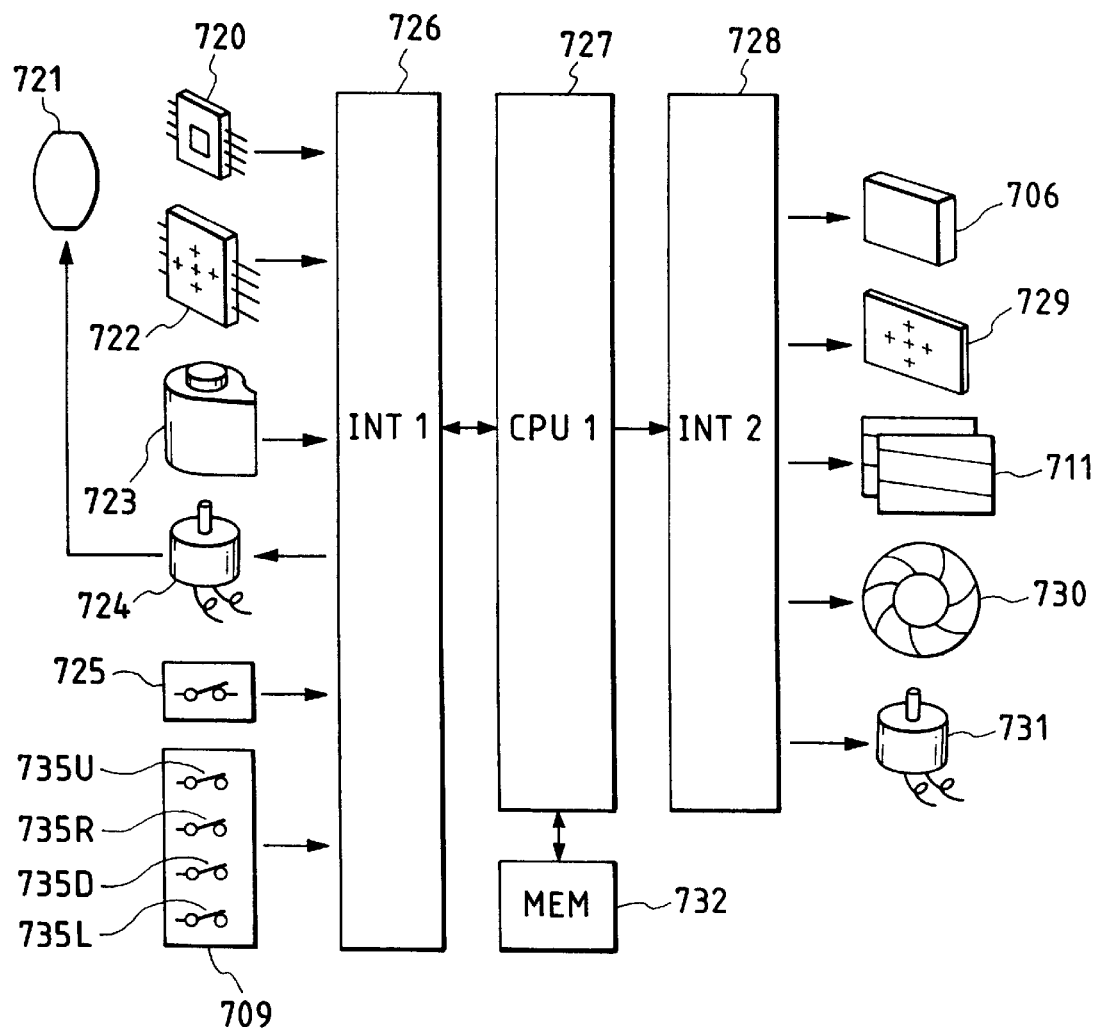
FIG. 60 is a view showing the electrical arrangement of the camera according to the thirteenth embodiment of the present invention.

FIG. 60 is a block diagram showing an electrical circuit of the camera 701. A battery required for operating the circuit, and the power supply circuit are not illustrated. Control of the camera 701 is entirely executed by a CPU 727. The CPU 727 receives through an interface circuit 726 an object brightness signal from a photometric circuit 720, an in-focus state signal from a distance measuring circuit 722, a film speed signal from a film speed detector 723, and a state signal from a state detector 725 for various switches. The distance measuring circuit 722 measures the focus state of an object to be photographed, and measures distances to five discrete points, i.e., central, upper, lower, right, and left points in this embodiment.

The switch detector 725 comprises internal switches representing sequence states, in addition to a power supply switch which interlocks with the above-described shutter button 704, a release switch, the dial 707, and the command dial 705. The situations of switches 735U, 735R, 735D, and 735L disposed at four portions on the selector 709 are also transmitted to the CPU 727 through the interface circuit 726. The various pieces of information input to the CPU 727 are periodically stored in a memory circuit 732 as latest information, and read out, as needed.

The CPU 727 rotates a motor 724 through the interface circuit 726 to move an in-focus lens 721 and focus the object. The CPU 727 performs display of an exposure condition or the like on the display 706 through an interface circuit 728. A distance measurement position is displayed on a display 729. A shutter 711 is opened/closed to perform exposure for a predetermined period of time. The aperture of a stop 730 is changed to control a transmission light amount. A motor 731 is rotated to wind/rewind the film. The display 729 is a means for displaying a distance measurement position which can be visually checked through the finder 703 in FIG. 59 in an overlapping manner with the object. The display 729 displays cross marks which coincide with the distance measurement points of the distance measuring circuit 722, as shown in FIG. 60.

Figure 61:
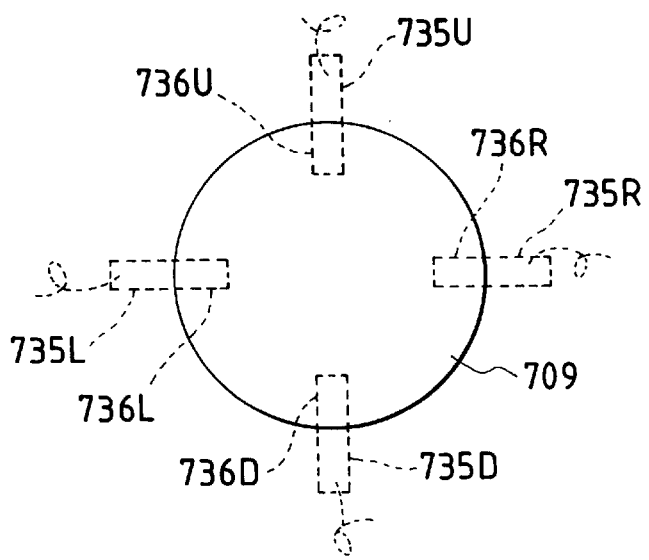
FIG. 61 is a view for explaining the periphery of a selector.

FIG. 61 is a view for explaining the periphery of the selector 709. The four switches 735U, 735R, 735D, and 735L are set at lower portions of the upper, right, lower, and left sides (FIG. 61) of the selector 709. When the upper side 736U, the right side 736R, the lower side 736D, or the left side 736L of the selector 709 is depressed, a corresponding switch 735U, 735R, 735D, or 735L is turned on.

Figure 62:
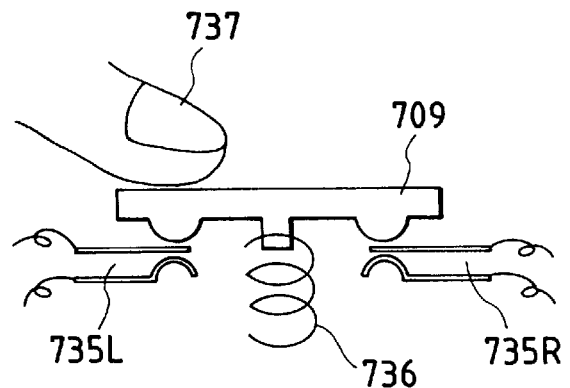
FIG. 62 is a sectional view showing the selector shown in FIG. 61.

FIG. 62 is a horizontal sectional view showing the selector 709 shown in FIG. 61. The selector 709 is supported by a spring 736 at the central portion. When the peripheral portion is depressed by a finger 737, the selector is inclined in the depressed direction and then restored. The switches 735L and 735R arranged below the selector 709 are constituted by two pieces. Upon depression of the selector 709, either piece becomes conductive to switch an electrical signal.

FIGS. 63, 64, 65, 66, and 67 are front views for explaining the relationship between display of the display 729 and the selector 709 according to the present invention. The display 729 displays a distance measurement area selected from the five points, and also exhibits an area subjected to distance measurement by the distance measuring circuit 722. The operation will be described below. Assume that a central portion on the screen is selected as a distance measurement area.

Figure 63:
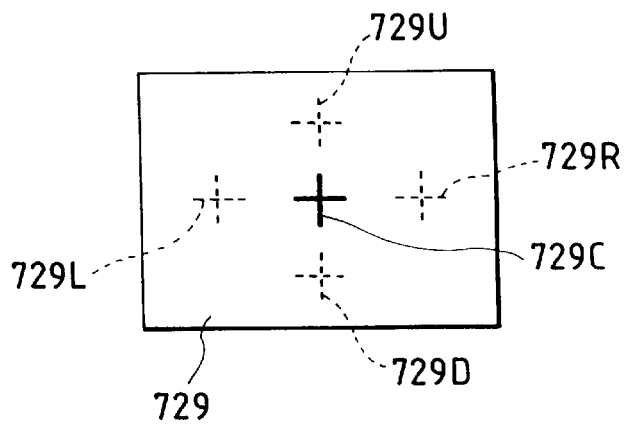
FIG. 63 is a view showing a display example on the display.
Figure 64:
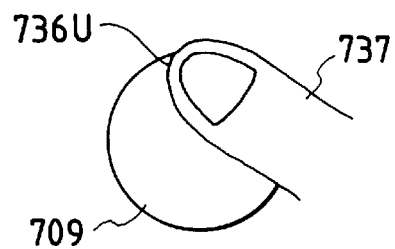
FIG. 64 is a view for explaining a selection operation.
Figure 65:
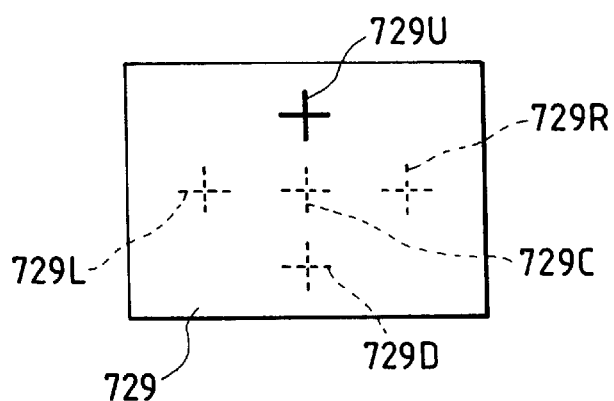
FIG. 65 is a view showing a display example on the display.
Figure 66:
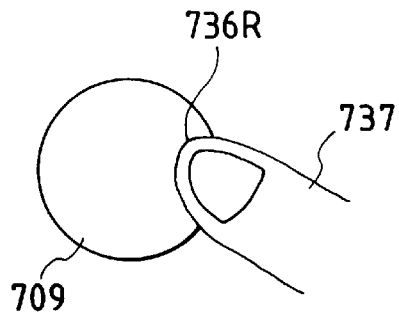
FIG. 66 is a view for explaining a selection operation.

As shown in FIG. 63, only a central segment 729C is ON on the display 729, and remaining segments 729U, 729R, 729D, and 729L are kept OFF. In this state, the upper side 736U of the selector 709 is depressed with the finger 737, as shown in FIG. 64. Then, the upper segment 729U is turned on on the selector 729, and the central segment 729C which has been ON is turned off, as shown in FIG. 65. Next, the right side 736R of the selector 709 is depressed, as shown in FIG. 66. Then, the right segment 729R is turned on on the display 729, and the upper segment 729U which has been ON is turned off, as shown in FIG. 67.

As described above, when the current segment is to be moved from the upper segment 729U to the right segment 729R, the current segment can be directly changed to the right segment 729R without temporarily passing through the central segment 729C. To turn on the left segment 729L in a state wherein the segment 729U is ON, only the left portion 736L of the selector 709 is depressed. In the same manner, only a peripheral portion of the selector 729 corresponding to a desired direction is depressed once without passing through the central segment 729C in order to change the right segment 729R to the upper segment 729U or the lower segment 729D, to change the lower segment 729D to the right segment 729R or the left segment 729L, or to change the left segment 729L to the lower segment 729D or the upper segment 729U.

Figure 67:
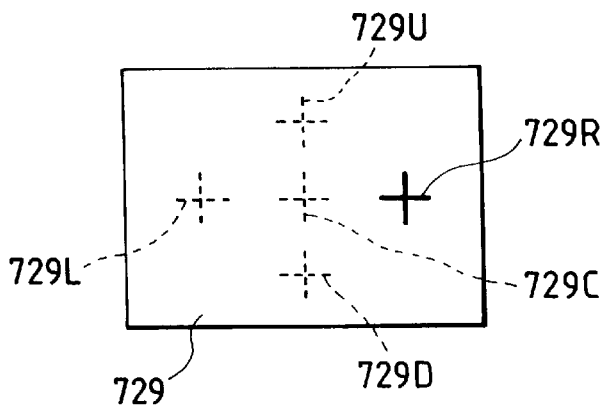
FIG. 67 is a view showing a display example on the display.

In this embodiment, nonselected areas, i.e., segments indicated by wavy lines in FIGS. 63, 65, and 67 are kept off. The present invention is not limited to this setting. A selected segment may be ON deeply, and nonselected segments may be ON thinly.

Figure 68:
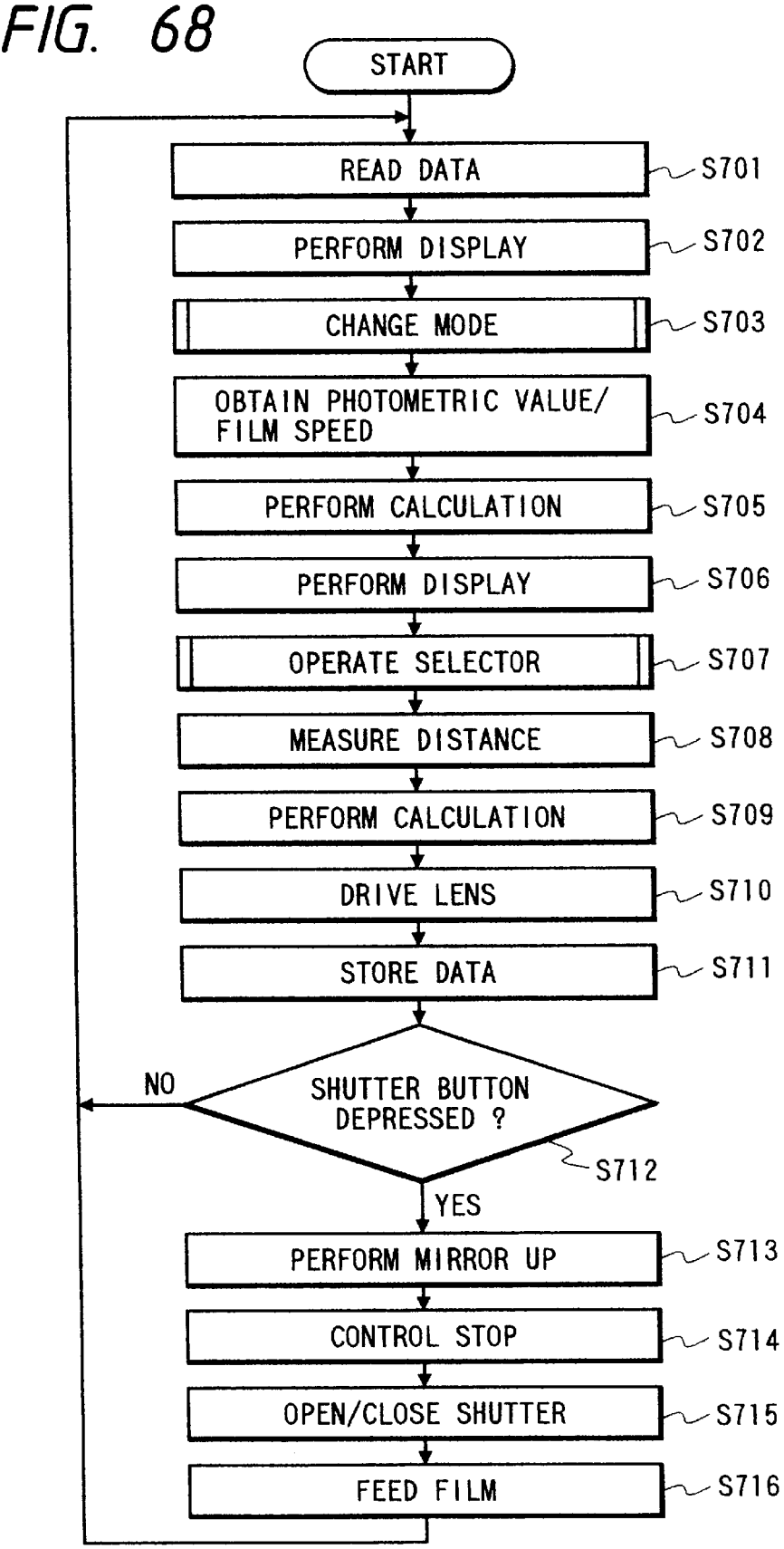
FIG. 68 is a flow chart showing the processing routine of a measurement area selection operation.

FIG. 68 is a flow chart showing a processing routine of the CPU 727 in the camera 701 shown in FIG. 60. This routine is repeatedly executed while power supply to the CPU 727 continues.

In step S701, various conditions such as a previously set exposure mode are read out from the memory circuit 732. In step S702, the conditions are displayed on the displays 706 and 729. In step S703, a desired exposure mode is set in accordance with an operation instruction by the dial 707. In step S704, an object brightness signal is received from the photometric means 720. A film speed signal is received from the film speed detection means 723. In step S705, the object brightness signal and the film speed signal are calculated. In the shutter priority mode, an F-number which should be controlled is calculated to obtain proper exposure. In the manual mode, e.g., a difference between an exposure amount obtained by a set shutter time and a set F-number, and an optimal exposure amount is calculated.

In step S706, various conditions for exposure obtained in the above steps are displayed on the display 706. In step S707, processing is performed in accordance with an operation of the selector 709. Details will be described with reference to FIG. 69. In step S708, a distance measurement signal from a distance measurement area selected in step S707 is read. In step S709, the distance measurement signal is calculated to obtain the driving amount of the lens 721 required for realizing an in-focus state. In step S710, the lens 721 is driven to focus a desired object to be photographed. In step S711, the exposure conditions and calculation results set in the above manner are temporarily stored in the memory circuit 732. In step S712, it is determined whether the release button 704 is depressed to designate exposure. If the release button 704 is not depressed, the flow returns to step S701 to repeatedly execute the above processing. If the release button 704 is depressed, the flow shifts to step S713.

In step S713, a reflecting mirror (not shown) is moved upward and retracted from a photographing optical path. In step S714, the stop 730 is controlled to a predetermined stop opening. In step S715, the shutter 711 (not shown) is kept open for a predetermined period of time determined in step S705, thereby exposing the film. In step S716, since all the operations are completed, the motor 731 is rotated clockwise to perform a film feed operation and a mechanism biasing operation. Thereafter, the flow returns to step S701 to repeatedly execute the above processing.

Figure 69:
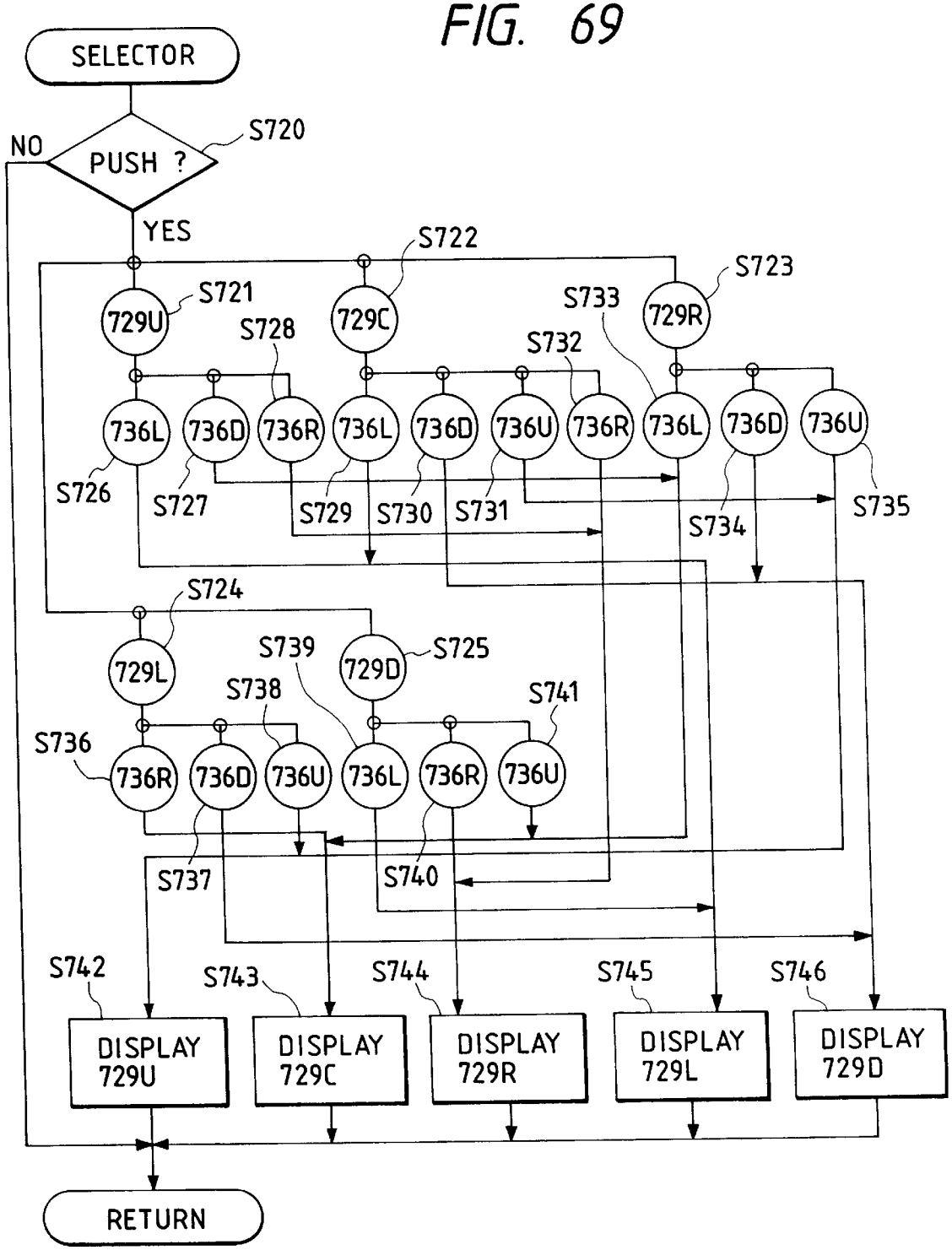
FIG. 69 is a flow chart showing step S707 in detail.
Figure 70:
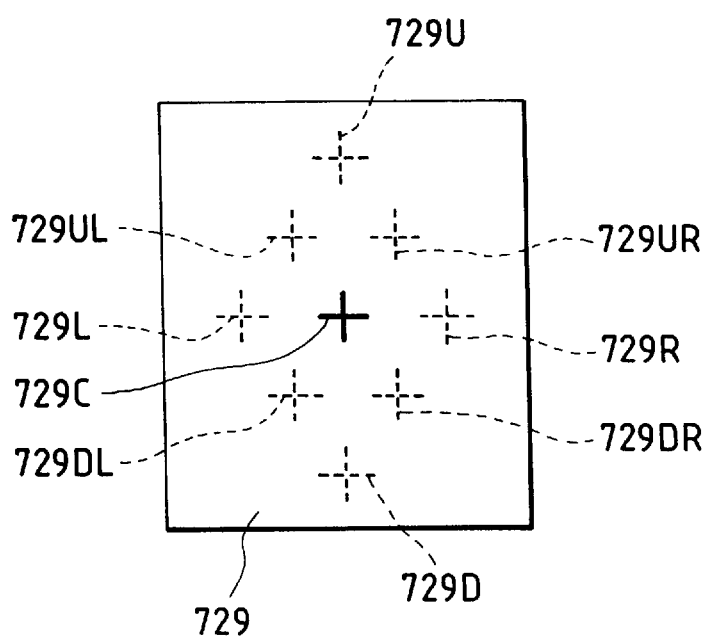
FIG. 70 is a view showing another display example on the display.

FIG. 69 is a flow chart showing details of step S707 in FIG. 68. FIG. 69 shows processing for representing an operation state of the selector 709 and a distance measurement area selection state on the display 729 which have been described with reference to FIGS. 63 to 67.

In step S720, it is determined whether the selector 709 is operated to turn on the switch 735U or the like. If the switch is kept off, the flow returns to step S708 in FIG. 68. If the switch is OFF, the flow shifts to steps S721 to S725. In steps S721 to S725, a step corresponding to a current segment selected on the display 729 is passed. Note that meaningless switch detection is not performed. For example, since the segment 729U is selected in step S721, detection of the switch 736U need not be performed. After the above steps are performed, any one of the segments 729U, 729C, 729R, 729L, and 729D is turned on, and a given segment which has been ON is turned off in steps S742 to S746. Thereafter, the flow returns to step S708 in FIG. 68 to continue the above-mentioned processing.

Note that the above-described embodiment has exemplified the four distance measurement areas (729U, 729R, 729D, and 729L) arranged radially. Alternatively, eight (729U, 729R, 729D, 729L, 729UR, 729DR, 729DL, and 729UL) or more distance measurement areas may be arranged radially.

Having described preferred embodiments of the present invention, it is to be understood that any variations will occur to those skilled in the art within the scope of the appended claims.

What is claimed is:

1. An information setting apparatus comprising:
   an operation mechanism reciprocally operable in a first direction and a second direction different from the first direction;
   first and second direction detection units to respectively detect an operation in the first and second directions;
   a first information setting unit to sequentially set first information in accordance with a detection output from said first direction detection unit; and
   a second information setting unit to sequentially set second information, different from said first information, in accordance with a detection output from said second direction detection unit, wherein said first information comprises mode information indicating exposure, photometry, and distance measurement, and the second information comprises detailed data from said mode information.

2. An information setting apparatus according to claim 1, wherein the operation mechanism is operable in a third direction different from the first and second directions, the information setting apparatus further comprising:
   a third direction detection unit to detect an operation in the third direction based on an operation of said operation mechanism; and
   an information confirmation unit to confirm said first and second information upon reception of a detection output from said third direction detection unit after said first and second direction detection units perform a detection operation.

3. An information setting apparatus according to claim 1, wherein the operation mechanism is operable in a third direction different from the first and second directions, the information setting apparatus further comprising:
   a third direction detection unit to detect an operation in the third direction based on an operation of said operation mechanism; and
   a reset unit to reset a previous detection of said first and second direction detection unit upon reception of a detection output from said third direction detection unit, and return to an initial state.

4. An information setting apparatus according to claim 3, wherein
   said second operation mechanism is a rotatably set ball,
   said first and second direction detection units detect rotational directions corresponding to the first and second directions applied to said ball, and
   said third direction detection unit detects a depression force applied to said ball in the third direction.

5. An information setting apparatus according to claim 3, wherein
   said second operation mechanism is a rotatably set ball,
   said first and second direction detection units detect rotational directions corresponding to the first and second directions applied to said ball, and
   said third direction detection unit detects a depression force applied to said ball in the third direction.

6. An information setting apparatus, comprising:
   a manual operation member;
   a first detection unit to detect an operation amount of said operation member operated in a first direction; and
   a second detection unit to detect an operation amount in a second direction different from the first direction,
   wherein said first detection unit has a detection resolution different from a detection resolution of said second detection unit.

7. An information setting apparatus according to claim 6, wherein said operation member is a rotatable track ball.

8. An information setting apparatus according to claim 6, wherein said operation member is a touch panel to detect a manually operated contact point.

9. An information setting apparatus according to claim 6, wherein
   said first and second detection units are pulse generation units, having a plurality of spaced pulses, to generate pulses in accordance with the operation amounts, wherein a space between said pulses on the first detection unit is not equal to a space between pulses on said second detection unit.

10. An information setting apparatus according to claim 6, further comprising:
    a posture detection unit so posture of said apparatus,
    wherein the detection resolutions of said first and second detection units are changed by a detection output from said posture detection unit.

11. An information setting apparatus, comprising:
    a manual operation member;
    a first detection unit to detect an operation amount of said operation member in a first direction;
    a second detection unit to detect an operation amount of said operation member in a second direction different from the first direction; and a control unit to detect an operation amount in an operation direction different from an operation direction detected by one of said first and second detection units based on an output from said one detection unit.

12. An information setting apparatus according to claim 11, wherein said control unit comprises:

a first control unit to detect an operation amount in a third direction different from the first direction based on an output from said first detection unit; and a second control unit to detect an operation amount in a fourth direction different from the second direction based on an output from said second detection unit.

13. An information setting apparatus according to claim 11, wherein said operation member is a rotatable track ball.

14. An information setting apparatus according to claim 11, wherein said operation member is a touch panel to detect a manually operated contact point.

15. An information setting apparatus according to claim 12, wherein the third and fourth directions are orthogonal along an outer shape of said information setting apparatus, and the first direction has a predetermined inclination angle with respect to the third direction and the second direction has a predetermined inclination angle with respect to the fourth direction.

16. An information setting apparatus according to claim 12, wherein said control unit shifts a predetermined value based on an output from one of said first and second detection units.

17. An information setting apparatus according to claim 12, further comprising:

a posture detection unit to detect a posture of said information setting apparatus, wherein said control unit corrects the operation amounts in the operation directions obtained by said control unit according to a detection output from said posture detection unit.

18. An information setting apparatus according to claim 11, wherein one of said first and second detection units is inclined with respect to an outer shape of said information setting apparatus.

19. An information setting apparatus, comprising:

a manual operation member;

a detection unit to detect an operation amount of said operation member in a predetermined direction; and a control unit to detect an operation amount in a direction different from the predetermined direction based on an output from said detection unit.

20. A manual operation correction device, comprising:

an operation unit to manually designate and move an arbitrary position on a display screen;

an operation locus acquisition unit to output an instruction for a movement operation direction of a position input on said display screen by said operation unit, and to acquire an operation locus of said operation unit operated in accordance with the instruction; and an area setting unit to set an operation determination area between two operation loci having the same start point as an acquired operation locus.

21. A manual operation correction device according to claim 20, further comprising:

a direction specifying unit having a first mode in which said operation locus acquisition unit and said area setting unit are started, and a second mode in which said operation unit is operated, wherein the direction specifying unit collates an operation locus indicated by an operation of said operation unit in the second mode with the operation determination area set by said area setting unit to specify an operator's intentional movement operation direction of the position input on said display screen.

22. A manual operation correction device according to claim 20, wherein said operation locus acquisition unit outputs an instruction for the movement operation direction of the input position by said operation unit on said display screen by arbitrarily designating start and end positions, and changes the start and end positions to acquire a plurality of numbers of times operation loci of said operation unit operated in accordance with the instruction.

23. A manual operation correction device according to claim 20, wherein said operation unit detects rotation of a rotatable ball.

24. A manual operation correction device according to claim 20, wherein said operation unit detects motion of a manually operated contact point.

25. A manual operation correction device according to claim 20, wherein said area setting unit sets operation determination areas having different contents in accordance with a posture of said device.

26. A manual operation correction device according to claim 21, wherein said operation locus acquisition unit designates a start and end position, and changes the start and end position to acquire a plurality of operation loci.

27. A manual operation correction device according to claim 21, wherein said operation unit detects rotation of a rotatable ball.

28. A manual operation correction device according to claim 21, wherein said operation unit detects motion of a manually operated contact point.

29. A manual operation correction device according to claim 21, wherein said area setting unit sets operation determination areas having different contents in accordance with a posture of said device.

30. A manual operation correction device according to claim 22, wherein said operation unit detects rotation of a rotatable ball.

31. A manual operation correction device according to claim 22, wherein said operation unit detects motion of a manually operated contact point.

32. A manual operation area designation device, comprising:

an operation unit to manually designate and move an arbitrary position on a display screen;

a signal generation unit to generate a first signal representing an operation locus of said operation unit;

a reference signal output unit to output second and third signals having different directions, the second and third signals having respective discrete values, wherein the directions of the second and third signals is generated by the discrete values; and a direction signal output unit to compare the first signal with the second and third signals, and uniformly output a fourth signal between the second and third signals when the first signal is between the second and third signals.

33. A manual operation area designation device according to claim 32, wherein said operation unit detects rotation of a rotatable ball.

34. A manual operation area designation device according to claim 32, wherein said operation unit detects motion of a manually operated contact point.

35. A manual operation area designation device according to claim 32, wherein said reference signal output unit varies and outputs the second and third signals according to a posture of said device.

36. A release operation device for a camera, comprising:
a rotatable ball set in said camera;
a rotation detection mechanism to detect rotation applied to said ball;
a rotational direction detection unit to calculate and detect a rotational direction of said ball upon reception of an output from said rotation detection mechanism;
a depression detection mechanism to detect depression applied to said ball; and
a camera operation control unit to start an operation upon reception of an output from said depression detection mechanism.

37. A release operation device for a camera according to claim 36, further comprising:
a distance measurement position setting unit to set as a distance measurement position an operation position in a rotational direction detected by said rotational direction detection unit.

38. A release operation device for a camera according to claim 36, further comprising:
a mode switch arranged on said camera; and
a mode setting unit to change and set a mode content of said mode switch in accordance with a direction detected by said rotational direction detection unit upon reception of an output from said mode switch and said rotational direction detection unit.

39. A release operation device for a camera according to claim 36, wherein said depression detection mechanism detects depression in first and second stages, and outputs a power supply start signal to the first stage in response to a detection of depression to the first stage, and outputs an exposure start signal to the second stage in response to a detection of depression to the second stage.

40. A measurement area selection device, comprising:
a plurality of measurement areas arranged respectively at a central portion and a radial portion;
a selection unit to perform a selection operation to select a measurement area; and
a control unit to select a measurement area in accordance with a selection operation state of said selection unit,
wherein said control unit selects a measurement area nearest to a selected position when a measurement area is not present at the selected position.

41. A measurement area selection device according to claim 40, further comprising:
a display unit,
wherein the measurement area selected by said control unit is displayed on said display unit.

42. A measurement area selection device according to claim 40, wherein four measurement areas are arranged at the radial portion.

43. A measurement area selection device according to claim 40, wherein eight measurement areas are arranged at the radial portion.

44. A distance area selection devices, comprising:
a plurality of measurement areas arranged respectively at a central portion and a radial portion;
a selection unit to select and operate a measurement area; and
a control unit to select a measurement area in accordance with a selection operation state of said selection unit,
wherein said control unit selects a measurement area nearest to a selected position where no measurement area is present at said selected position when selecting a measurement area at the radial portion.

45. An information setting apparatus, comprising:
an operation member operated in a first direction and a second direction different from the first direction;
first and second translation units in contact with said operation member, wherein an operation of said operation member is shared by the first and second translation units; and
first and second detection units in contact with said translation units, to respectively detect an operation of said operation member in the first and second directions, wherein the first detection unit has a detection resolution different from a detection resolution of the second detection unit.

46. An information setting apparatus according to claim 45, wherein said operation member is a rotatable track ball.

47. An information setting apparatus according to claim 45, wherein said operation member is a touch panel to detect a manually operated contact point.

48. An information setting apparatus according to claim 45, wherein a plurality of spaced pulses on said first detection unit are consecutively spaced at a distance not equal to a plurality of consecutively spaced pulses on said second detection unit.

49. An information setting apparatus according to claim 46, further comprising:
a posture detection unit to detect a posture of said information setting apparatus, wherein the detection resolutions of said first and second detection units are changed by a detection output from said posture detection unit.

50. A method for detecting an operation of an operation member in contact with a first detection unit and a second detection unit, comprising the steps of:
detecting an operation amount of said operation member in a first direction and a second direction different from the first direction;
detecting whether a correction switch is activated;
correcting the operation amount in the second direction based on an inclination amount of the first detection unit when the correction switch is activated; and
calculating a designated direction of the operation member based on the detected operation amount in the first direction and the corrected operation amount in the second direction when the correction switch is activated.

51. An information setting apparatus, comprising:
a manual operation member;
a first detection unit to detect an operation amount of said operation member in a first direction;
a second detection unit to detect an operation amount of said operation member in a second direction different from the first direction;
a first control unit to detect an operation amount in a third direction different from the first direction based on an output from said first detection unit; and
a second control unit to detect an operation amount in a fourth direction different from the second direction based on an output from said second detection unit.

52. An information setting apparatus according to claim 51, wherein
the third and fourth directions are orthogonal along an outer shape of said information setting apparatus, and the first direction has a predetermined inclination angle with respect to the third direction and the second direction has a predetermined inclination angle with respect to the fourth direction.

53. An information setting apparatus according to claim 51, wherein said control unit shifts a predetermined value based on an output from one of said first and second detection units.

54. An information setting apparatus according to claim 51, further comprising:

a posture detection unit to detect a posture of said information setting apparatus, wherein said control unit corrects the operation amounts in the operation directions obtained by said control unit according to a detection output from said posture detection unit.

55. An information setting apparatus, comprising:

an operation member operated in a first direction and a second direction different from the first direction;

first and second translation units in contact with said operation member, wherein an operation of said operation member is shared by the first and second translation units;

first and second detection units in contact with said translation units, to respectively detect an operation of said operation member in the first and second directions; and a posture detection unit to detect a posture of said information setting apparatus, wherein the first detection unit has a detection resolution different from a detection resolution of the second detection unit, and the detection resolutions of said first and second detection units are changed by a detection output from said posture detection unit.

* * * * *

UNITED STATES PATENT AND TRADEMARK OFFICE
CERTIFICATE OF CORRECTION

PATENT NO.: 5,832,323
DATED : November 3, 1998
INVENTOR(S): Tetsuro GOTO

It is certified that error appears in the above-identified patent and that said Letters Patent is hereby corrected as shown below:

Column 56, line 57, (claim 10), change "so" to --to detect a--.

Signed and Sealed this

Sixteenth Day of February, 1999

Attest:

*Acting Commissioner of Patents and Trademarks*

*Attesting Officer*